US010637115B2

(12) United States Patent
Licht

(10) Patent No.: US 10,637,115 B2
(45) Date of Patent: Apr. 28, 2020

(54) MOLTEN AIR RECHARGEABLE BATTERIES

(71) Applicant: C2CNT LLC, Leesburg, VA (US)

(72) Inventor: Stuart Licht, Leesburg, VA (US)

(73) Assignee: C2CNT LLC, Leesburg, VA (US)

( * ) Notice: Subject to any disclaimer, the term of this patent is extended or adjusted under 35 U.S.C. 154(b) by 322 days.

(21) Appl. No.: 14/766,430

(22) PCT Filed: Feb. 7, 2014

(86) PCT No.: PCT/US2014/015349
§ 371 (c)(1),
(2) Date: Aug. 6, 2015

(87) PCT Pub. No.: WO2014/124288
PCT Pub. Date: Aug. 14, 2014

(65) Prior Publication Data
US 2016/0006090 A1 Jan. 7, 2016

Related U.S. Application Data

(60) Provisional application No. 61/762,883, filed on Feb. 9, 2013.

(51) Int. Cl.
*H01M 12/08* (2006.01)
(52) U.S. Cl.
CPC ...... *H01M 12/08* (2013.01); *H01M 2300/006* (2013.01); *H01M 2300/0051* (2013.01)
(58) Field of Classification Search
CPC .................................................. H01M 12/08
See application file for complete search history.

(56) References Cited

U.S. PATENT DOCUMENTS

| 5,256,498 A * | 10/1993 | Ohzu | H01M 8/0295 |
| | | | 429/475 |
| 6,399,247 B1 * | 6/2002 | Kitayama | H01M 2/16 |
| | | | 252/182.1 |
| 7,396,612 B2 * | 7/2008 | Ohata | H01M 2/145 |
| | | | 429/129 |
| 7,790,327 B2 * | 9/2010 | Ham | H01M 8/142 |
| | | | 429/475 |
| 2002/0015877 A1 * | 2/2002 | Tao | H01M 8/1233 |
| | | | 429/428 |

(Continued)

FOREIGN PATENT DOCUMENTS

WO    WO 2012/138576 A1    10/2012

OTHER PUBLICATIONS

International Search Report for PCT/US2014/015349 dated May 27, 2014, 2 pgs.

*Primary Examiner* — Brian R Ohara
(74) *Attorney, Agent, or Firm* — Blank Rome LLP

(57) ABSTRACT

The present disclosure relates to rechargeable electrochemical battery cells (molten air batteries). The cells use air and a molten electrolyte, are quasi-reversible (rechargeable) and have the capacity for multiple electrons stored per molecule and have high intrinsic electric energy storage capacities. The present disclosure also relates to the use of such in a range of electronic, transportation and power generation devices, such as greenhouse gas reduction applications, electric car batteries and increased capacity energy storage systems for the electric grid.

30 Claims, 40 Drawing Sheets

(56) References Cited

U.S. PATENT DOCUMENTS

| | | | |
|---|---|---|---|
| 2007/0275302 A1* | 11/2007 | Sotowa | H01M 4/0433 429/217 |
| 2008/0003481 A1* | 1/2008 | Ecer | H01M 4/8605 429/480 |
| 2008/0261094 A1* | 10/2008 | Licht | H01M 4/06 429/403 |
| 2009/0017345 A1* | 1/2009 | Ganley | H01M 8/145 429/405 |
| 2010/0291443 A1* | 11/2010 | Farmer | H01M 4/133 429/304 |
| 2011/0033769 A1* | 2/2011 | Huang | H01M 12/005 429/465 |
| 2011/0200864 A1* | 8/2011 | Dai | H01M 4/48 429/152 |
| 2011/0256448 A1* | 10/2011 | Huang | H01M 4/582 429/213 |
| 2013/0115528 A1* | 5/2013 | Lu | H01M 8/145 429/405 |
| 2013/0134948 A1* | 5/2013 | Licht | H01M 4/5825 320/137 |
| 2014/0072836 A1* | 3/2014 | Mills | C25L 31/04 429/8 |
| 2014/0202874 A1* | 7/2014 | Elgammal | C25B 1/00 205/555 |

* cited by examiner

MOLTEN AIR RECHARGEABLE BATTERIES

RELATED APPLICATIONS

This application is a national phase of PCT/US2014/015349 filed on Feb. 7, 2014, which claims priority to Provisional Application No. 61/762,883 filed on Feb. 9, 2013. The contents of those applications are hereby incorporated by reference.

FIELD OF THE INVENTION

The present invention relates to rechargeable electrochemical battery cells (molten air batteries). The cells use air and a molten electrolyte, are quasi-reversible (rechargeable) and have the capacity for multiple electrons stored per molecule. The cells described herein have high intrinsic electric energy storage capacities and are useful in a range of electronic, transportation and power generation devices, such as greenhouse gas reduction applications, electric car batteries and increased capacity energy storage systems for the electric grid.

BACKGROUND OF THE INVENTION

High capacity, cost effective batteries are needed for a range of applications, including greenhouse gas reduction applications, overcoming the battery driven "range anxiety" of electric vehicles, and increased energy capacity storage for the electric grid.

A zirconia stabilized $VB_2$ air battery has been described. See, e.g., S. Licht et al., *Chem. Comm.*, 3257-3259, 2008; S. Licht et al., *Electrochem. Solid State Lett.* 14, A83-A85, 2011; and S. Licht et al., *Electrochem. Solid State Lett.* 15, A12-A14, 2012. This 11e$^-$ (eleven electron) per molecule, room temperature, aqueous electrolyte battery has the highest volumetric energy capacity for a battery, with an intrinsic capacity greater than that of gasoline and an order of magnitude higher than that of conventional lithium ion batteries. The challenge, however, is recharging the battery (i.e., electrochemically reinserting 11e– into the battery discharge products).

Several classes of molten electrolyte batteries have been investigated. A molten sulfur battery has been studied, particularly for electric car and grid applications, See, e.g., B. Dunn et al., *Science*, 334, 9280935, 2011; and J. B. Goodenough et al., *J. Solid State Electrochem.*, 16, 2019-2029, 2012. During discharge, the battery uses sulfur and sodium (or potassium) for the respective cathode and anode storage materials, and these high temperature molten components are kept from chemically reacting by a solid electrolyte beta alumina separator. Sulfur cells have moderately high capacity. Both the molten and room temperature class of sulfur cathode batteries are limited by the maximum intrinsic capacity of the 2e– per sulfur (2 Faraday/32 g sulfur).

Another class of molten metal electrolyte batteries utilizes an insoluble, dense, molten cathode during discharge situated below a (less dense) molten metal anode floating on a molten electrolyte. Unlike the molten sulfur battery, this class does not require a solid electrolyte separator; but to date has lower capacity. An example of this class of batteries is the magnesium-antimony battery with a molten halide electrolyte. See, e.g., D. J. Bradwell et al., *J. Amer. Chem. Soc.*, 134, 1895-1897, 2012.

Iron has been widely explored for battery storage due to its availability as a resource and its capability for multiple electron charge transfer. In the early 1900s, Edison developed rechargeable batteries based on the discharge of an iron anode (in an aqueous electrolyte at room temperature) to form iron oxide. See, e.g., U.S. Pat. Nos. 678,722 and 692,507. Retention of an even a small fraction of the intrinsic anodic storage capacity of these batteries has been a challenge, and room temperature iron batteries continue to be explored today. The 3e$^-$ cathodic capacity of iron oxides has also been explored. See, e.g., S. Licht et al., *Science*, 285, 1039-1042, 1999; .S. Licht et al., *Energies*, 3, 960-972, 2010; and M. Farmand et al., *Electrochem. Comm.*, 13, 909-912, 2011.

A molten carbonate electrolytic conversion of iron oxide to iron as a $CO_2$-free synthesis alternative to the conventional greenhouse gas intensive industrial production of iron metal has been described. The high solubility of iron oxide in lithiated molten carbonate electrolytes was demonstrated to lead to the facile splitting of iron oxide to iron metal with the concurrent release of oxygen. See e.g., S. Licht et al., *Advanced Materials*, 47, 5592-5612, 2011 and International Publication No. WO 2011/140209.

There is, however, a need for new rechargeable batteries that have the capacity for multiple electrons stored per molecule, have high intrinsic electric energy storage capacities and can operate at lower temperatures.

SUMMARY OF THE INVENTION

The present inventors have developed a rechargeable electrochemical battery cell that utilizes air and a molten electrolyte, is quasi-reversible (rechargeable) and has the capacity for multiple electrons stored per molecule. The cells described herein have high intrinsic electric energy storage capacities. Unlike previous rechargeable batteries, the batteries of the present invention are not burdened by the weight of the active cathode material. In contrast, the rechargeable molten cathode instead uses oxygen directly from the air to yield a high battery capacity. The cathode is compatible with multiple electron anodes. Additionally, for the batteries of the present invention, external carbon dioxide (which is disadvantageous to battery charging and discharging) is not required for discharge at the air electrode.

In one aspect, the present invention relates to a rechargeable battery cell comprising
a) an air electrode;
b) a metal electrode, or a nonmetal electrode that is capable of being oxidized; and
c) a molten electrolyte disposed between the air electrode and the metal electrode or non-metal electrode;
wherein
at the air electrode, the principle reaction is oxygen ($O_2$) reacted to form oxide during discharge, the principle reaction is not carbon dioxide ($CO_2$) and oxygen ($O_2$) being reduced to form carbonate ($CO_3^{2-}$) during discharge.

In one embodiment of any of the rechargeable battery cells described herein, external carbon dioxide is not required for discharge at the air electrode.

Thus, in one aspect, the present invention relates to a rechargeable battery cell comprising
a) an air electrode;
b) a metal electrode, or a nonmetal electrode that is capable of being oxidized; and
c) a molten electrolyte disposed between the air electrode and the metal electrode or non-metal electrode;
wherein
at the air electrode, the principle reaction is oxygen ($O_2$) reacted to form oxide during discharge, not carbon dioxide ($CO_2$) and oxygen ($O_2$) being reduced to form carbonate ($CO_3^{2-}$) during discharge and external carbon dioxide is not required for discharge at the air electrode.

In another aspect, the present invention relates to a rechargeable battery cell comprising
 a) an air electrode;
 b) a metal electrode, or a nonmetal electrode that is capable of being oxidized; and
 c) a molten electrolyte disposed between the air electrode and the metal electrode;
 wherein
  at the air electrode a reduction/oxidation reaction between oxygen and oxide ion takes place; and
  at the metal electrode or the nonmetal electrode that is capable of being oxidized, oxide interacts with the metal electrode or the nonmetal electrode that is capable of being oxidized for capturing/releasing oxide during discharging/charging, respectively.

In one embodiment of any of the rechargeable battery cells described herein, the metal electrode comprises a metal that generates more than one electron when oxidized. For example, in one embodiment of any of the rechargeable battery cells described herein, the metal electrode is selected from, but not limited to, iron, zinc, aluminum, magnesium, bismuth, vanadium, manganese, nickel, silver, barium, calcium, strontium, lead, mercury, cadmium, chromium, tin, titanium, and any combination thereof. In one embodiment of any of the rechargeable battery cells described herein, the metal electrode comprises iron.

In one embodiment of any of the rechargeable battery cells described herein, the non-metal electrode that is capable of being oxidized comprises a non-metal that generates more than one electron when oxidized. In one embodiment of any of the rechargeable battery cells described herein, the non-metal electrode is selected from carbons (such as, but not limited to, graphite, amorphous carbon, nanocarbons (e.g., fullerenes, nanorods, nanotubes), borides (such as, but not limited to, vanadium boride, titanium boride, tantalum boride, barium boride, magnesium boride, calcium boride, iron boride, cobalt boride, nickel boride, lanthanum boride, zirconium boride, molybdenum boride, tungsten boride, niobium boride), hydrides, carbides, and combinations thereof. In one embodiment of any of the rechargeable battery cells described herein, the non-metal electrode comprises carbon (C) or $VB_2$. In one embodiment of any of the rechargeable battery cells described herein, the non-metal electrode comprises carbon. In one embodiment of any of the rechargeable battery cells described herein, the non-metal electrode comprises vanadium boride ($VB_2$).

In one embodiment of any of the rechargeable battery cells described herein, the molten electrolyte is molten carbonate, or a mixture thereof. In a preferred embodiment, the molten metal carbonate comprises one or more alkali metal carbonates. In a further preferred embodiment, the molten metal carbonate comprises lithium carbonate, sodium carbonate, potassium carbonate, or any combination thereof.

In one embodiment, the molten electrolyte comprises $Li_2CO_3$. In one embodiment, the molten electrolyte comprises $Li_2CO_3$, $Na_2CO_3$, $K_2CO_3$, and any combination thereof. For example, in one embodiment, the molten electrolyte comprises $Li_2CO_3$ and $Na_2CO_3$. In another embodiment, the molten electrolyte comprises $Li_2CO_3$, $Na_2CO_3$ and $K_2CO_3$.

In one embodiment, the molten electrolyte is selected from $Li_{0.7}Na_{0.9}CO_3$, and $Li_{0.9}Na_{0.6}K_{0.5}CO_3$. In another embodiment, the molten electrolyte is selected from $Li_{0.7}Na_{0.93}CO_3$, $Li_{0.85}Na_{0.61}K_{0.54}CO_3$, and $Li_{0.87}Na_{0.63}K_{0.50}CO_3$. In a further embodiment, the molten electrolyte is $Li_{0.87}Na_{0.63}K_{0.50}CO_3$.

In one embodiment, the molten electrolyte comprises $CaCO_3$, $Na_2CO_3$, $K_2CO_3$, and any combination thereof.

In one embodiment, the molten electrolyte is selected from $Ca_{0.3}Na_{0.7}K_{0.8}CO_3$ and $Ca_{0.2}Na_{1.0}K_{0.7}CO_3$. In one embodiment, the molten electrolyte is selected from $Ca_{0.27}Na_{0.7}K_{0.73}CO_3$, $Ca_{0.27}Na_{0.70}K_{0.75}CO_3$ and $Ca_{0.16}Na_{1.03}K_{0.65}CO_3$.

In another embodiment, the molten electrolyte comprises one or more molten nonconductive salts (e.g., a molten oxide, such as, but not limited to, a non-metal oxide such as $B_2O_3$ (with a melting point of approximately 450° C. to 510° C.), or a metal oxide such as $V_2O_5$ (with a melting point of approximately 690° C.), or any combination thereof; and one or more inorganic salts that is conductive when dissolved, such as, but not limited to, a molten soluble metal oxide (e.g., $Li_2O$, $LiFeO_2$, $LiVO_3$, $Li_2B_4O_7$, $BaO$, and combinations thereof), a molten soluble metal carbonate, or a molten soluble halide (e.g., lithium chloride, lithium fluoride, vanadium chloride, vanadium fluoride, titanium chloride, titanium fluoride, and combinations thereof), or any combination of the foregoing, such that the electrolyte mix may form an insoluble, reduced metal or non-metal when electrochemically charged. In one embodiment, the dissolved inorganic salt comprises a conductive salt (e.g., a salt that helps to ensure that the electrolyte is electrochemical conductive, rather than a resistive molten glass). For further example, the inorganic salt may be selected from metal oxides (e.g., alkali metal oxides, alkali earth metal oxides), metal halides (e.g., alkali metal halides, alkali earth metal halides), metal sulfates (e.g., alkali metal sulfates, alkali earth metal sulfates), metal nitrates (e.g., alkali metal nitrates, alkali earth metal nitrates), metal halates (e.g., alkali metal halates, alkali earth metal halates), and any combination thereof.

In another embodiment, the molten electrolyte comprises vanadium oxide ($V_2O_5$), boron oxide ($B_2O_3$), lithium oxide ($Li_2O$), calcium oxide (CaO), or any combination thereof. In one embodiment, the molten electrolyte comprises vanadium oxide ($V_2O_5$), boron oxide ($B_2O_3$), lithium oxide ($Li_2O$) and calcium oxide (CaO) in a molar ratio of about 1:2:4:3. In one embodiment, the molten electrolyte comprises vanadium oxide ($V_2O_5$), boron oxide ($B_2O_3$), lithium oxide ($Li_2O$) and calcium oxide (CaO) in a molar ratio of about 1:2:2:0. In one embodiment, the molten electrolyte comprises vanadium oxide ($V_2O_5$), boron oxide ($B_2O_3$), lithium oxide ($Li_2O$) and calcium oxide (CaO) in a molar ratio of about 1:7:12:0. In one embodiment, the molten electrolyte comprises vanadium oxide ($V_2O_5$), boron oxide ($B_2O_3$), lithium oxide ($Li_2O$) in a ratio of about molar 1:2:0.67. In another embodiment, the molten electrolyte comprises $LiVO_3$ and $LiBO_2$.

In an additional embodiment, any of the molten electrolytes described herein further comprise one or more additional soluble additives that may, for example, extend the cycling life of the battery and/or modify the voltage of the cell. In one embodiment, the molten electrolyte further comprises additional additives selected from sulphates, halides, nitrates, carbonates, oxides, and any combination thereof (e.g., lithium oxide, barium carbonate, calcium carbonate, magnesium oxide, cesium carbonate, calcium oxide, and any combination thereof.)

In one embodiment, the melting point of the molten electrolyte is (i) between about 395° C. and about 900° C. (ii) between about 600° C. and about 900° C., (iii) between about 600° C. and about 900° C., (iv) between about 720° C. and about 900° C., (v) between about 700° C. and about 800° C., or (vi) between about 150° C. and about 500° C.

For example, in one embodiment, the melting point of the electrolyte is between about 395° C. and about 900° C., such as between about 600° C. and about 900° C., between about 720° C. and about 900° C. or between about 700° C. and about 800° C., for example, about 600° C., about 700° C., about 723° C., about 851° C. or about 891° C.

As a further example, in one embodiment, the melting point of the electrolyte is (i) between about 600° C. and about 900° C., (ii) about 600° C. and about 900° C., (iii) between about 720° C. and about 900° C., (iv) between about 700° C. and about 800° C., (v) about 600° C., (vi) about 700° C., (viii) about 723° C., (ix) about 851° C. or (x) about 891° C.

As another example, in another embodiment, the melting point of the electrolyte is between about 395° C. and about 900° C., for example, between about 395° C. and about 700° C., such as about 395° C., about 500° C. or about 600° C.

In another embodiment, the rechargeable battery cell operates at a temperature of between about 395° C. and about 900° C., for example, between about 395° C. and about 700° C. or between about 395° C. and about 600° C., such as about 395° C., about 500° C. or about 600° C.

In a further embodiment, the rechargeable battery cell operates at temperature of between about 150° C. and about 500° C. For example, the molten electrolyte may comprise one or more metal hydroxides, metal hydroxide eutectics, metal carbonates, and any combination thereof. For further example, the molten electrolyte may comprise one or more alkali metal hydroxides, alkali earth metal hydroxides, alkali earth metal hydroxide eutectics, alkali earth metal hydroxide eutectics, alkali metal carbonates, alkali earth metal carbonates and any combination thereof. For example, pure NaOH, KOH and LiOH become molten electrolytes at approximately 320° C., 400° C. and 471° C., respectively. A mole percent mixture containing 49% KOH and 51% NaOH melts at approximately 173° C.; a mole percent mixture containing 71% NaOH and 29% LiOH melts at approximately 216° C., while a mole percent mixture containing 59% KOH and 31% LiOH melts at approximately 225° C. A mole percent mixture containing 91% NaOH and 9% $Na_2CO_3$ melts at approximately 295° C.; a mole percent mixture containing 90 mol % KOH and 10% $K_2CO_3$ melts at approximately a360° C.; and a mole percent mixture containing 80% LiOH and 20% $Li_2CO_3$ melts at approximately 415° C. A carbonate eutectic such as $Li_{0.9}Na_{0.6}K_{0.5}CO_3$ has a melting point of approximately 400° C. When this carbonate eutectic is mixed with 10 wt % of NaOH, $NaNO_3$ or KCl, the resulting electrolyte melting point is about 388° C., 396° C. or 326° C., respectively. The rechargeable battery cells of the invention may comprise any of the molten electrolyte mixtures described herein. Thus, in one embodiment, the molten electrolyte comprises NaOH, LiOH, KOH, $Na_2CO_3$, $K_2CO_3$, $Li_2CO_3$, and any combination thereof, in any molar ratio. In one embodiment, the molten electrolyte comprises NaOH, LiOH, KOH, and any combination thereof, in any molar ratio. In another embodiment, the molten electrolyte comprises NaOH and $Na_2CO_3$ in any molar ratio. In another embodiment, the molten electrolyte comprises KOH and $K_2CO_3$ in any molar ratio. In another embodiment, the molten electrolyte comprises LiOH and $Li_2CO_3$ in any molar ratio.

In another embodiment of any of the rechargeable battery cells described herein, the overall electrolysis chemistry of the cell can be expressed by one of equations (1), (2) or (3):

$$Fe + 3/4 O_2 \rightleftharpoons 1/2 Fe_2O_3 \qquad (1)$$

$$C + O_2 \rightleftharpoons CO_2 \qquad (2)$$

$$VB_2 + 11/4 O_2 \rightleftharpoons B_2O_3 + 1/2 V_2O_5 \qquad (3)$$

In another aspect, the present invention relates to an electrical energy storage device comprising a rechargeable battery cell according to any of the embodiments described herein. In another aspect, the present invention relates to a plurality of rechargeable battery cells according to any of the embodiments described herein connected together to provide a bank of cells. Thus, the present invention also provides a bank of cells comprising comprising a plurality of rechargeable battery cells according to any of the embodiments described herein.

In another aspect, the present invention relates to the use of a rechargeable battery cell according to any of the embodiments described herein as a rechargeable energy storage device, for example, for automotive applications, power electronic applications, electric grid storage applications and/or energy storage applications.

In another aspect, the present invention relates to a method of cyclically storing and releasing energy comprising cyclically charging and discharging a rechargeable battery cell according to any of the embodiments described. In one embodiment, the charging/recharging is performed for 2 or more cycles, such as 5 or more cycles, 10 or more cycles, 15 or more cycles, 20 or more cycles, 25 or more cycles, or 30 or more cycles.

DETAILED DESCRIPTION OF THE INVENTION

The present invention relates to a rechargeable electrochemical battery cell (molten air battery) that utilizes air and a molten electrolyte. The cells include a metal, or a non-metal that that is capable of being oxidized as the anode.

The molten air batteries described herein use molten electrolytes that enhance current flow (improve the kinetics of charge transfer). The molten air batteries also have amongst the highest intrinsic storage capacity of any rechargeable battery as they use oxygen that is freely available from the air, and discharge using anodes that use multiple electrons per molecule storage. For example, one mole of electrons has a charge of 26801 milliampere hour (mAh). An increasing multiple of electrons ($e^{31}$) stored per molecule and a low formula weight can greatly increase the charge capacity of a battery. For example, when a silver anode releases 1 electron per silver molecule it has a maximum stored capacity of 248 mAh/g (1 mole of silver has a mass of 107.9 gram/mole). The anodic capacity of various materials based on their increasing electrons released per molecule and formula weight is zinc ($2e^-$/65.4 g/mol)=820 mAh/g, iron ($3e^-$/55.8 g/mol)=1450 mAh/g, carbon (4e⁻/12.0 g/mol)=8930 mAh/gr. $VB_2$ (72.6 g/mol) can release 11 electrons per molecule with a storage capacity of 4060 mAh/g. Volumetric storage capacity is also enhanced by higher density, and iron, carbon and $VB_2$, have several fold higher density than lithium. Lithium ion batteries do not use oxygen freely available from the air and have a much lower anode capacity. Hence, e.g., the iron, carbon and $VB_2$ molten air batteries described herein have an order of magnitude higher intrinsic capacity than Li-ion batteries.

In one embodiment, the rechargeable molten air batteries described herein have an operational temperature that is decreased from about 700-800° C., to about 600° C. or less by, e.g., the use of carbonate eutectics or carbonate/hydroxide mixtures which provide low melting point molten electrolytes (to below 200° C.) for the battery. Lower operational temperature battery chemistries provide greater functionality for molten air batteries in applications such as for electric vehicles.

Figure 1:
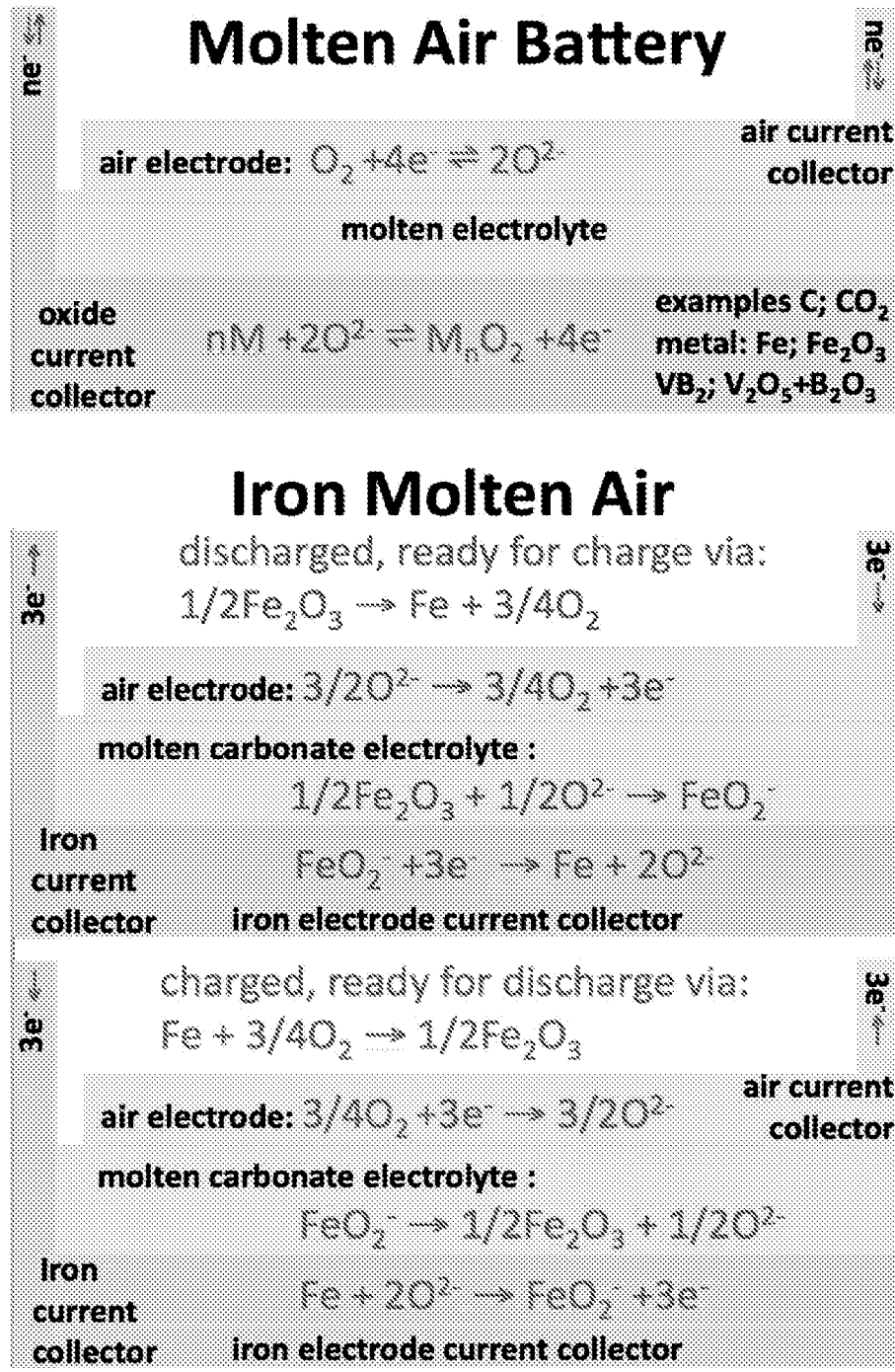
FIG. 1 shows the electrochemical storage of a generalized molten air rechargeable battery (top) and iron molten air rechargeable battery (bottom) of the present invention.

FIG. 1 shows the electrochemical storage of the rechargeable batteries described herein both generally and with respect to an exemplary iron molten air battery (discussed below) in molten lithium carbonate ($Li_2CO_3$). As illustrated in FIG. 1 for the iron molten air example of the battery, during charging, iron oxide is converted to iron metal, and $O_2$ is released to the air. During discharge, iron metal is converted back to iron oxide.

The Molten Electrolyte

The rechargeable batteries of the present invention utilize a molten electrolyte. In one embodiment, the molten electrolyte is a molten carbonate, or a mixture of molten carbonates.

Suitable molten carbonates include, but are not limited to, lithium carbonate, sodium carbonate, potassium carbonate, strontium carbonate, rubidium carbonate, cesium carbonate, barium carbonate, calcium carbonate, and any combination thereof. In additional embodiments, the molten electrolyte further comprises one or more alkali metal hydroxides, alkali earth metal hydroxides, or any combination thereof.

In one embodiment, the molten electrolyte is $Li_2O_3$. In another embodiment, the molten electrolyte is a eutectic molten electrolyte, e.g., a combination of one or more of lithium carbonate, sodium carbonate, potassium carbonate and calcium carbonate. In one embodiment, the molten electrolyte comprises $Li_2CO_3$. In one embodiment, the molten electrolyte comprises $Li_2CO_3$, $Na_2CO_3$, $K_2CO_3$, and any combination thereof. For example, in one embodiment, the molten electrolyte comprises a mixture of $Li_2CO_3$ and $Na_2CO_3$. In another embodiment, the molten electrolyte comprises a mixture of $Li_2CO_3$, $Na_2CO_3$ and $K_2CO_3$. In one embodiment, the molten electrolyte is selected from $Li_{0.7}Na_{0.9}CO_3$ and $Li_{0.9}Na_{0.6}K_{0.5}CO_3$. In one embodiment, the molten electrolyte is $Li_{0.7}Na_{0.93}CO_3$. In another embodiment, the molten electrolyte is $Li_{0.85}Na_{0.61}K_{0.54}CO_3$. In a further embodiment, the molten electrolyte is $Li_{0.87}Na_{0.63}K_{0.50}CO_3$ In one embodiment, the molten electrolyte comprises $CaCO_3$, $Na_2CO_3$, $K_2CO_3$, and any combination thereof. In one embodiment, the molten electrolyte is selected from $Ca_{0.3}Na_{0.7}K_{0.8}CO_3$ and $Ca_{0.2}Na_{1.0}K_{0.7}CO_3$. In one embodiment, the molten electrolyte is selected from $Ca_{0.27}Na_{0.7}K_{0.73}CO_3$, $Ca_{0.27}Na_{0.70}K_{0.75}CO_3$ and $Ca_{0.16}Na_{1.03}K_{0.65}CO_3$. In one embodiment, the molten electrolyte is $Ca_{0.27}Na_{0.7}K_{0.73}CO_3$. In a further embodiment, the molten electrolyte is $Ca_{0.27}Na_{0.70}K_{0.75}CO_3$. In a further embodiment, the molten electrolyte is $Ca_{0.16}Na_{1.03}K_{0.65}CO_3$.

Pure $Li_2O_3$ melts at 723° C., $Na_2CO_3$ melts at 851° C. and $K_2CO_3$ melts at 891° C. Therefore, mixtures of alkali carbonates can be advantageous due to lower melting points. For example $Li_{0.7}Na_{0.93}CO_3$ has a melting point of 499° C. and $Li_{0.85}Na_{0.61}K_{0.54}CO_3$ and $Li_{0.87}Na_{0.63}K_{0.50}CO_3$ have a melting point of 393° C.

In a further embodiment, the rechargeable battery cell operates at temperature of between about 150° C. and about 500° C. For example, the molten electrolyte may comprise low melting point alkali metal hydroxides, alkali earth metal hydroxides, alkali earth metal hydroxide eutectics, alkali earth metal hydroxide eutectics, alkali metal carbonates, alkali earth metal carbonates, and any combination thereof. For example, pure NaOH, KOH and LiOH become molten electrolytes at approximately 320° C., 400° C. and 471° C., respectively. A mole percent mixture containing 49% KOH and 51% NaOH melts at approximately 173° C.; a mole percent mixture containing 71% NaOH and 29% LiOH melts at approximately 216° C., while a mole percent mixture containing 59% KOH and 31% LiOH melts at approximately 225° C. A mole percent mixture containing 91% NaOH and 9% $Na_2CO_3$ melts at approximately 295° C.; a mole percent mixture containing 90 mol % KOH and 10% $K_2CO_3$ melts at approximately 360° C.; and a mole percent mixture containing 80% LiOH and 20% $Li_2CO_3$ melts at approximately 415° C. A carbonate eutectic such as $Li_{0.9}Na_{0.6}K_{0.5}CO_3$ has a melting point of approximately 400° C. When this carbonate eutectic is mixed with 10 wt % of NaOH, $NaNO_3$ or KCl, the resulting electrolyte melting point is about 388° C., 396° C. or 326° C., respectively. The rechargeable battery cells of the invention may comprise any of the molten electrolyte mixtures described herein. Thus, in one embodiment, the molten electrolyte comprises NaOH, LiOH, KOH, $Na_2CO_3$, $K_2CO_3$, $Li_2CO_3$, and any combination thereof, in any molar ratio. In one embodiment, the molten electrolyte comprises NaOH, LiOH, KOH, and any combination thereof, in any molar ratio. In another embodiment, the molten electrolyte comprises NaOH and $Na_2CO_3$ in any molar ratio. In another embodiment, the molten electrolyte comprises KOH and $K_2CO_3$ in any molar ratio. In another embodiment, the molten electrolyte comprises LiOH and $Li_2CO_3$ in any molar ratio.

In one embodiment, the molten electrolyte further comprises lithium oxide. Addition of lithium oxide ($Li_2O$) to the molten carbonate electrolyte (i) increases cell potential and (ii) prevents molten carbonate decomposition favoring reactant rather products in the equilibrium

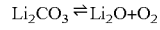

$$Li_2CO_3 \rightleftharpoons Li_2O+O_2$$

Lithiated iron oxide (e.g., lithiated $Fe_2O_3$ or $Fe_3O_4$) has dramatically increased solubility in molten carbonates compared to non-lithiated iron oxide, as well as the sodium and potassium equivalents of the lithiated iron oxide. The solubility of lithiated iron oxide in molten carbonates enables the use of molten carbonates as an electrolyte for the electrodeposition of iron. It is also contemplated that the lithium ions needed for the formation of the lithiated iron oxide may be provided by another lithium salt, such as lithium chloride, lithium sulphate and the like.

In another embodiment, the molten electrolyte comprises one or more of vanadium oxide ($V_2O_5$), boron oxide ($B_2O_3$), lithium oxide ($Li_2O$) and calcium oxide (CaO). In one embodiment, the molten electrolyte comprises vanadium oxide ($V_2O_5$), boron oxide ($B_2O_3$), lithium oxide ($Li_2O$) and calcium oxide (CaO) in a molar ratio of about 1:2:4:3. In one embodiment, the molten electrolyte comprises vanadium oxide ($V_2O_5$), boron oxide ($B_2O_3$), lithium oxide ($Li_2O$) in a molar ratio of about 1:2:2. In one embodiment, the molten electrolyte comprises vanadium oxide ($V_2O_5$), boron oxide ($B_2O_3$), lithium oxide ($Li_2O$) in a ratio of about molar 1:7:12. In one embodiment, the molten electrolyte comprises vanadium oxide ($V_2O_5$), boron oxide ($B_2O_3$), lithium oxide ($Li_2O$) in a molar ratio of about 1:2:0.67. In another embodiment, the molten electrolyte comprises $LiVO_3$ and $LiBO_2$.

Any of the molten electrolytes described herein (e.g., molten carbonate electrolyte) may further comprise additional additives, e.g., sulphates, carbonates or oxides, such as, but not limited to, barium carbonate ($BaCO_3$), cesium carbonate ($Cs_2CO_3$), calcium carbonate ($CaCO_3$), magnesium oxide ($Mg_2O$), calcium oxide ($CaO$), and any combination thereof. Additionally, any of the molten electrolytes described herein may also comprise an alkali metal nitrate (e.g., $NaNO_2$) an alkali metal halide (e.g., KCl), or any combination thereof.

In exemplary embodiments, the cells described herein comprise iron, carbon or $VB_2$ as a high capacity discharge anode. In one embodiment, electrochemical storage in these iron, carbon or $VB_2$ molten air batteries is in accord with the following equations:

Iron molten air battery (3e⁻ discharge/charge):
$$Fe + \tfrac{3}{4}O_2 \rightleftharpoons \tfrac{1}{2}Fe_2O_3 \qquad (1)$$

Carbon molten air battery (4e⁻ discharge/charge):
$$C + O_2 \rightleftharpoons CO_2 \qquad (2)$$

$VB_2$ molten air battery, (11e⁻ discharge/charge):
$$VB_2 + 11/4 O_2 \rightleftharpoons B_2O_3 + \tfrac{1}{2}V_2O_5 \qquad (3)$$

Table 1 shows the intrinsic energy storage capacity of the iron, carbon and $VB_2$ molten air batteries described herein:

TABLE 1

| Anode | Formula Weight kg mol⁻¹ | Electrons Stored | Charge Capacity Ah/kg | Density kg liter⁻¹ | E° versus $O_2$ | Energy Capacity (gravimetric) Wh kg⁻¹ | Energy Capacity (volumetric) Wh liter⁻¹ |
|---|---|---|---|---|---|---|---|
| Iron | 0.05585 | 3e⁻ | 1,440 | 7.2 | 1.0 | 1,400 | 10,000 |
| Carbon | 0.01201 | 4e⁻ | 8,930 | 2.1 | 1.0 | 8,900 | 19,000 |
| $VB_2$ | 0.07256 | 11e⁻ | 4,060 | 5.1 | 1.3 | 5,300 | 27,000 |

The electrolytic reactions described herein are typically conducted at a temperature greater than the melting point of the molten carbonate (or combination of carbonates) used as the electrolyte. In some embodiments, the temperature of the electrolytic reaction is 0 to 300 degrees greater than the melting point of the carbonate. Exemplary temperatures are 723 to 1000° C. when the molten carbonate is lithium carbonate.

In one embodiment, the melting point of the electrolyte, such as the carbonate electrolyte (i.e, the operating temperature of the rechargeable cell) is between about 395° C. and about 900° C., such as between about 600° C. and about 900° C., between about 720° C. and about 900° C. or between about 700° C. and about 800° C., for example, about 600° C., about 700° C., about 723° C., about 851° C. or about 891° C.

In another embodiment, the melting point of the electrolyte, such as the carbonate electrolyte (i.e, the operating temperature of the rechargeable cell) is between about 375° C. and about 900° C., such as between about 395° C. and about 600° C., for example, about 395° C., about 500° C. or about 600° C.

The Anode

As described herein, the term "anode" describes the air electrode (the electrode at which oxygen is released by electrochemical oxidation during the battery charging cycle). The anode can be made of any inert material which is stable under the operating conditions of the cell. Effective materials include metals, such as nickel, platinum or iridium, metal oxides such as nickel oxide, tin oxide and titanium oxide, metal alloys such as monel and inconel, and carbon based materials such as glassy carbon and graphite. Enhanced anode surface area, such as with screen or spongy materials, by physical roughening, by chemical or electrochemical etching, or as deposited on a conductive support, decreases electrolysis potential. Additionally, the anode may form part of a crucible, e.g., a nickel crucible. In one embodiment, the anode (air electrode) has a higher surface area than the cathode (thereby decreasing polarization).

Volumetric energy capacity ($E_{vol}$) is calculated from the number of electrons stored (n), the density (d), the Faraday constant (F=26.80 Ah mol⁻¹) the formula weight (FW) and E° in accord with Eqs. 1, 2 or 3 as $E_{vol}$=ndE° F./FW. The cell potential at unit activity, E°, is temperature dependent. For example, while constant over a wide temperature range at 1.0 V for the carbon anode, E° decreases for the iron anode from 1.2 to 0.9 V with temperature increase from 25° C. to 850° C. (see S. Licht et al., *J. Phys. Chem. C*, 113, 16283-16292, 2009).

As can be seen from Table 1, the intrinsic capacity of each battery is one to two orders of magnitude greater than that of the volumetric energy capacity of conventional Li ion batteries (6,200 Wh liter⁻¹). Lithium (metal) air batteries also have a lower volumetric energy capacity. While lithium's gravimetric charge capacity (3860 Ah/kg) is similar to that of $VB_2$ (4,060 Ah/kg), it has a lower 6,200 Wh liter⁻¹ volumetric capacity due to a low density (0.534 kg liter⁻¹), and single, rather than multiple, electron charge transfer.

The Cathode

As described herein, the term "cathode" describes the electrode at which the metal or non-metal is formed by electrochemical reduction during the battery charge cycle. The cathode can be made of any conductive material stable under the operating temperature of the cell. Effective materials include metals, such as steel, nickel, platinum or iridium. Enhancing the surface are of the cathode (for example, by using a screen or a spongy material, roughening the cathode surface, chemically or electrochemically etching the cathode surface, or depositing ion a conductive support) decreases the electrolysis potential. Additionally, the cathode may form part of a crucible, such as a steel crucible or a nickel crucible.

EXAMPLES

The present invention is now further illustrated by means of the following non-limiting examples.

Example 1

Iron Molten Air Rechargeable Battery

Iron metal synthesis in molten carbonates is conducted via constant current electrolyses. As shown in the the constant current electrolyses (left side) of FIG. 2, iron oxide (as hematite, $Fe_2O_3$, or magnetite, $Fe_3O_4$) readily electrolyzes to iron which forms on an iron or platinum cathode. See also, e.g., Licht et al., *Adv. Mat.*, 47, 5592-5612, 2011. Post electrolysis, iron deposited on an extracted cathode is shown with an overlay of electrolyte in the top left of FIG. 2. The deposit is easily peeled from the cooled cathode, and after peeling, the post electrolysis steel foil cathode is shown (middle photo of FIG. 2) ready for a repeat electrolysis. A cross-section of the cathode deposit is shown in the right photo of FIG. 2, in which the iron deposit is evident. The right side of FIG. 2 shows discharge polarization (following electrochemical charge to form iron) of the air electrode (planar Ni, a planar disk of wound Ni wire, or planar Ir yield similar results) and the iron electrode (planar steel shim or a planar disk of wound iron wire yield highly similar results) in 730° C. molten lithium carbonate with $LiFeO_2$ (formed by dissolution of equimolar $Fe_2O_3$ & $Li_2O$).

Figure 2:
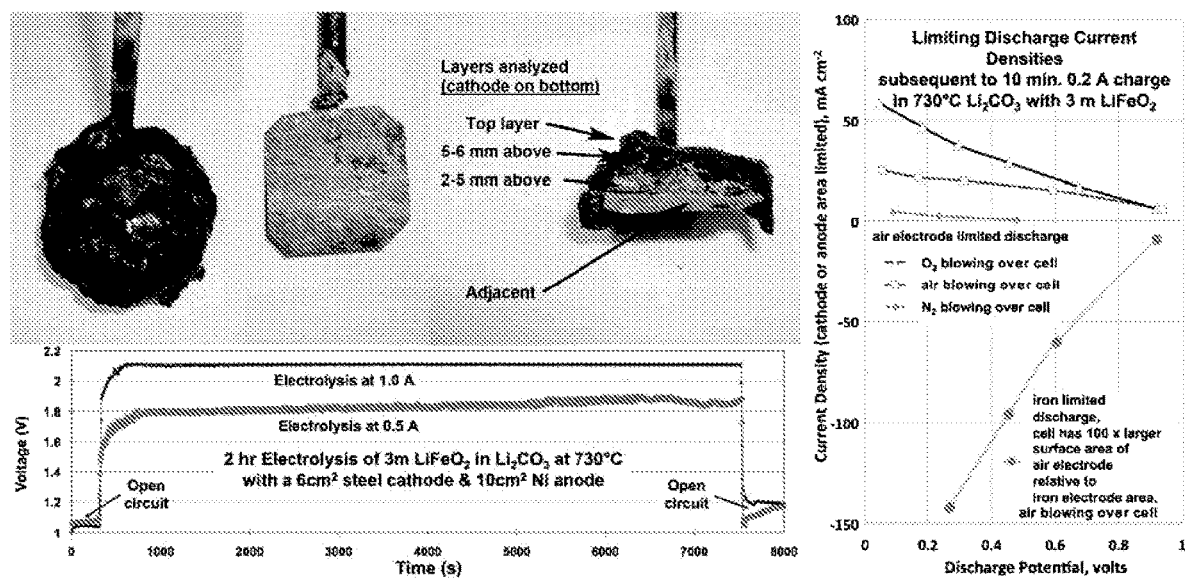
FIG. 2 shows the cathode and the sustainable charge (left) and discharge (right) rates for an exemplary iron molten air rechargeable battery of the present invention.

As evident in the left side of FIG. 2, a steel foil cathode (and an oxygen evolving nickel foil anode) is effective for iron oxide splitting. For this iron synthesis process, a wide range of temperature, concentration and carbonate composition domains in which nickel and iridium are effective air (anode) electrodes, and in which steel, iron and platinum are effective iron (cathode) electrodes is observed. These anodes and cathodes can sustain high (mA to A per $cm^{-2}$) current densities at low overpotential in molten lithium carbonate for the oxidation of oxides to oxygen (for either iron oxide, see e.g., Licht et al., *Adv. Mat.*, 47, 5592-5612, 2011) or carbon dioxide splitting (see, e.g., Licht et al., *J. Phys. Chem. Lett.*, 1, 2363-2368, 2010)). The same electrolysis shown in the lower portion of FIG. 2 can also represent charging of an iron molten air battery at high current density and low potential. Interestingly, as seen in the right side of FIG. 2, the reverse case, the reduction of oxygen to oxides, is also effective. Ni/air, and steel/iron electrodes are used. However, noble metals, such as iridium as the air electrode and platinum as the iron electrode, are also effective and exhibit similar polarization currents. As expected, the oxygen reduction electrode is rate limiting. That is, the oxygen reduction reaction occurs with a several fold higher overpotential (lower current density at equivalent electrolysis potentials) than the cathode iron oxidation discharge reaction. In the absence of oxygen (under nitrogen in FIG. 2), it is seen that the current density diminishes to insignificance, while pure $O_2$, rather than air, increases the current density establishing the basis for electrochemical discharge of the cell. A nickel air electrode, air or oxygen, and a lithium electrolyte are used in this study to demonstrate the simplicity and cost effectiveness of the cell, and the results are repeated with the noble metal iridium, to demonstrate that the air, and not the air cathode, reversibly stores charge. However, more exotic materials, such as a cerium oxide electrode, a cesium carbonate electrolyte additive, and a controlled (1:10) $CO_2$ to $O_2$ mix, have the potential to increase sustainable current densities at the air electrode to over 100 mA $cm^{-2}$ and decrease the cathode overpotential. See e.g., Smith et al., *Electrochem. Solid State Lett.*, 2, 207-209, 1999.

Figure 3:
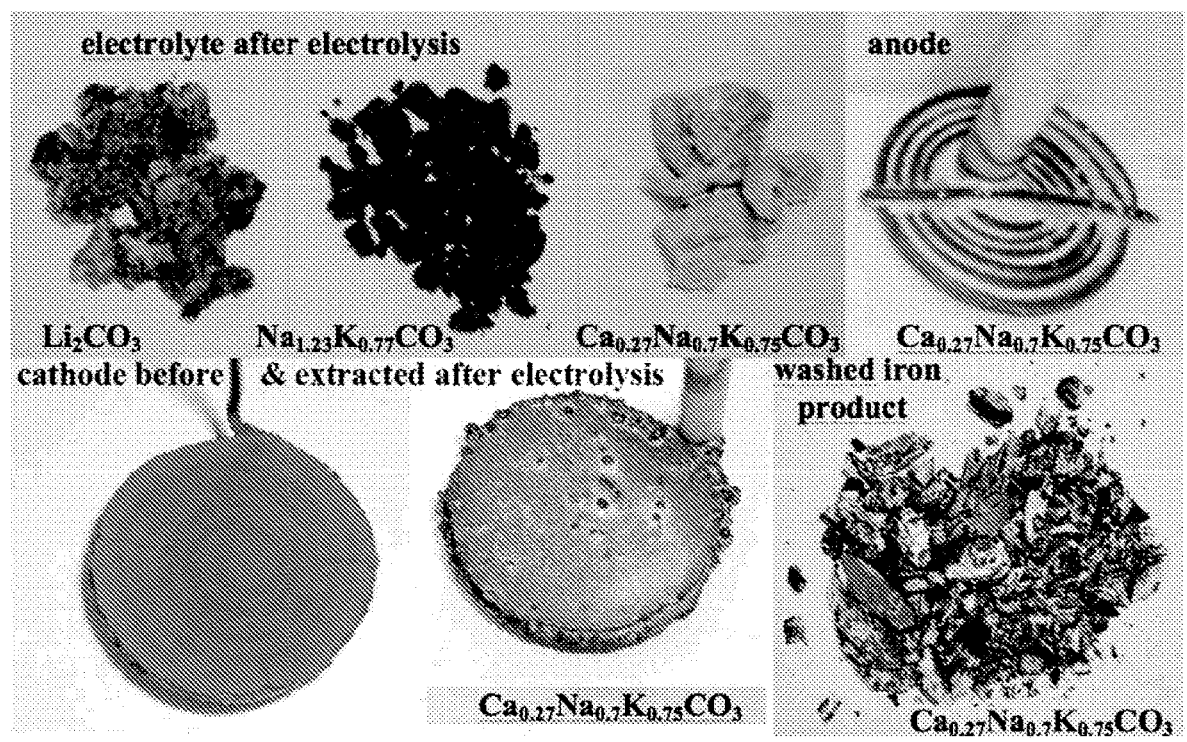
FIG. 3 (top row) shows various carbonate electrolytes, cooled and extracted after pressed iron oxide ($Fe_2O_3$) on a cathode current collector (a coiled steel wire) was reduced to iron. The bottom two photographs show the $Fe_2O_3$ before and after electrolytic reduction and conversion to iron metal.

The top row of FIG. 3 presents various carbonate electrolytes, cooled and extracted after pressed iron oxide ($Fe_2O_3$) on a cathode current collector (a coiled steel wire) was reduced to iron. The nickel air anode is highly stable and unaffected by the electrolysis (shown the right side of the top row of photographs as extracted subsequent to electrolysis, still with a small coating of solidified electrolyte). The bottom row of photos shows the $Fe_2O_3$ before and after electrolytic reduction and conversion to iron metal. The iron formation in the photograph of FIG. 3 represents charging of the iron molten air (iron/molten electrolyte/air) battery.

Figure 4:
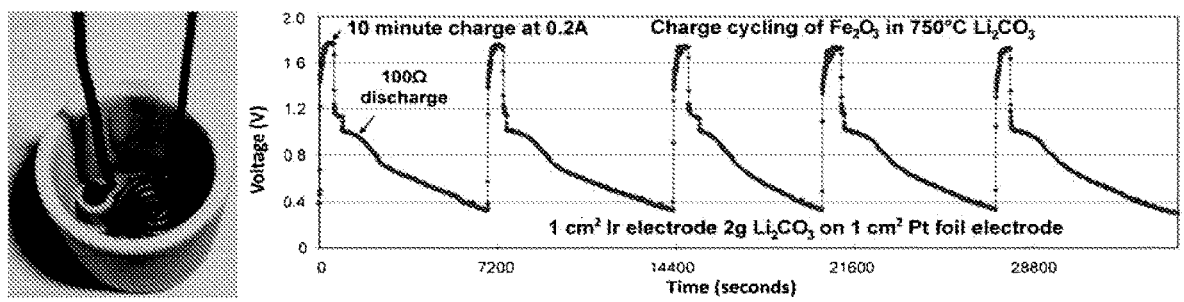
FIG. 4 shows the cell configuration and the charge cycling characteristics of a rechargeable iron molten air battery in a lithium carbonate (2 g $Li_2CO_3$) electrolyte containing 3 M $LiFeO_2$ and 1.5 M $Li_2O$.

FIG. 4 presents the charge cycling of the iron molten air battery in a lithium carbonate (2 g $Li_2CO_3$) electrolyte containing 3 M $LiFeO_2$ and 1.5 M $Li_2O$ (the excess $Li_2O$ is to prevent electrolyte loss as $Li_2CO_3$ decomposition). The battery characteristics are similar whether the respective air and counter electrodes are composed of iridium and platinum (as shown in FIG. 4 left) or equal surface areas of nickel and steel. The lithium carbonate electrolyte contains 3 M $Fe_2O_3$ and 3 M $Li_2O$. The battery cycling consists of repetition of a charge at a constant current of 0.2 A for 10 minutes, followed by discharge at a constant load of 100 ohm The photo in FIG. 4 shows the cell configuration with a wound wire air electrode (visible in the photo) above the iron counter electrode, prior to addition of the electrolyte. A space maintained between the electrodes and the crucible walls prevents trapping/splashing of air bubbles. Less than two grams of molten electrolyte is sufficient to cover the electrodes. Although cycling is evident, it is seen in FIG. 4 that this cell with equal surface area air and counter electrodes exhibits substantial hysteresis (significant losses of the charging compared to the discharge voltage, as well as a rapid decline in the discharge potential), The large hysteresis is consistent with the polarization losses of the air electrode during discharge seen on the right side of FIG. 1. Iridium is used as an air electrode in FIG. 4 and discharges to present what the inventor believes to be is the first quasi-reversible molten air battery with a noble metal air electrode. We have previously observed that during several hundred hours of oxygen evolution at an iridium electrode in molten carbonates, the iridium exhibits no evident physical changes, no visible coating, nor change in thickness. See Licht et al., *J. Phys. Chem., C*, 115, 25138, 2011. Iridium was used here (in the FIG. 4 battery results) rather than nickel (in the FIG. 5 battery results), to establish that this current collector for the air electrode is not consumed during charge cycling, but both Ni (wound wire, perforated foil or mesh) and Ir are effective as the air electrodes. We have previously quantified that nickel is highly stable as an air anode in a variety of lithium oxide containing electrolytes. A nickel oxide layer quickly forms and stabilizes the electrode. Replacement of the iridium with the same surface area of nickel results in a battery discharge highly similar to that seen with iridium in FIG. 4. Additionally, platinum was used in the discharged cell in FIG. 4 as the counter electrode, rather than steel, to establish that it is iron from $Fe_2O_3$, rather than iron from the current collector, that is deposited during charge and oxidized during discharge. However, replacement of the platinum by steel in the counter electrode does not result in a voltage loss during discharge, or a corrosion or change during repeated cycling of the battery.

Figure 5:
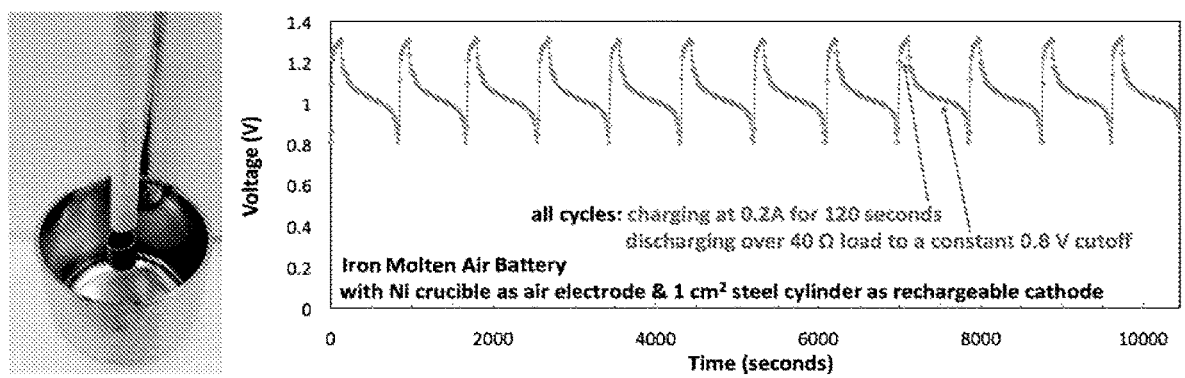
FIG. 5 shows the cell configuration and the charge cycling characteristics of a rechargeable iron molten air battery using a nickel crucible as the electrolyte case and air electrode.
Figure 6:
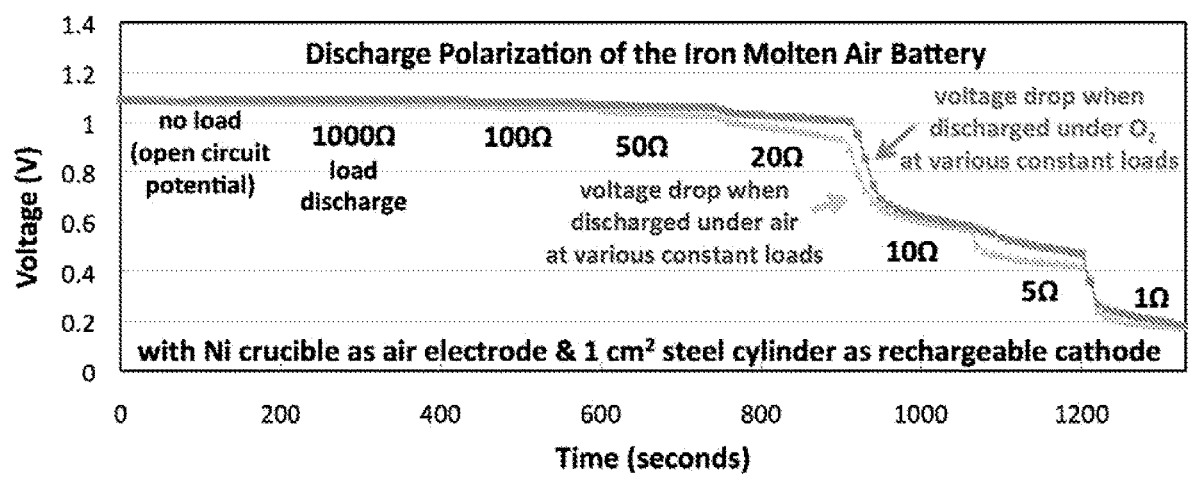
FIG. 6 shows the battery potential at open circuit and the discharge potential under load of a rechargeable iron molten air battery at 730° C. containing a lithium carbonate electrolyte with 3 M dissolved Fe (III) in a nickel crucible with a 1 $cm^3$ steel electrode.
Figure 7:
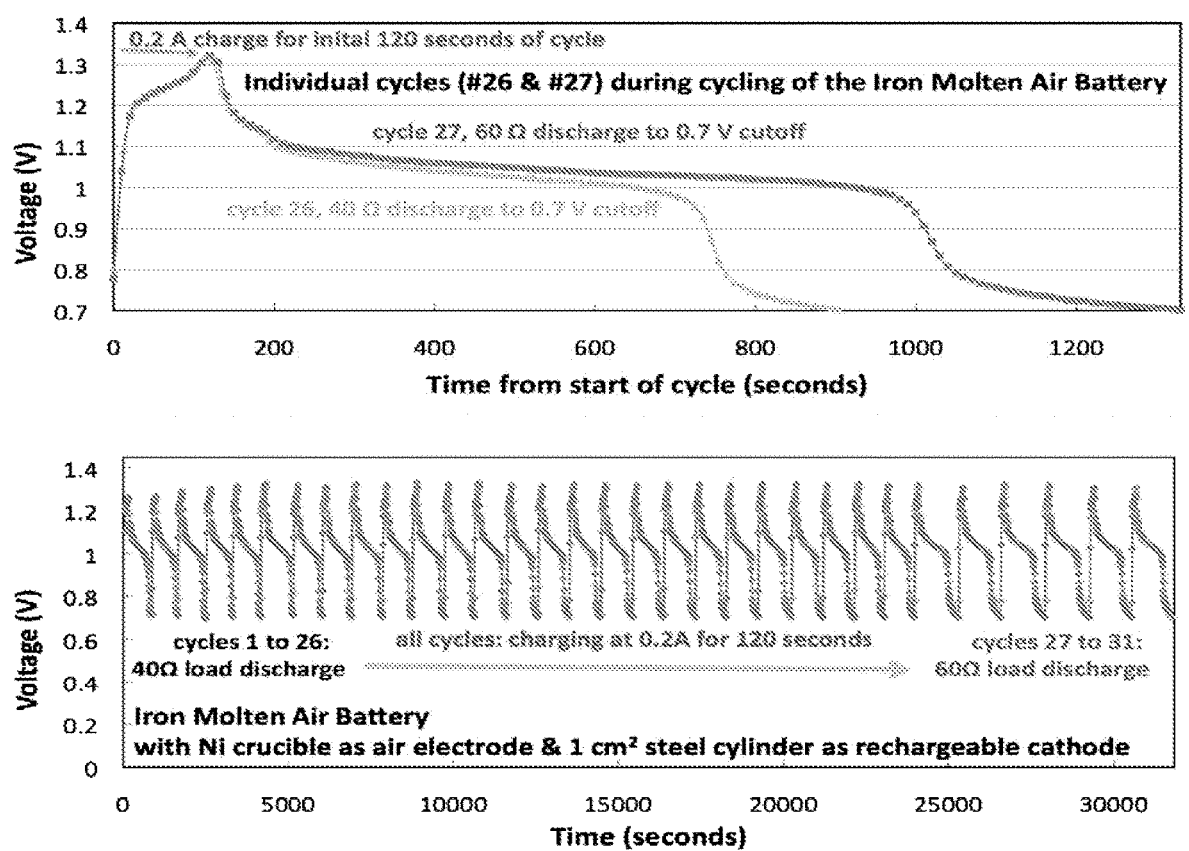
FIG. 7 shows the charge cycling characteristics of the rechargeable iron molten air battery shown in FIG. 5.

FIGS. 5-7 show the results of high surface area air electrode configurations that exhibit low hysteresis. The configurations utilize a nickel crucible, in lieu of the alumina crucible, to act not only as the electrolyte encasement, but also as a large surface area air electrode. The battery of FIG. 5 uses a 1 $cm^2$ steel (1.67 cm high cylinder with a circumference of 0.6 cm) chargeable counter. The right side of FIG. 5 shows cycling of this cell at 730° C. containing a $Li_2CO_3$ electrolyte with 3M dissolved Fe (II). The cell charge is 0.2 A for 120 seconds and the cell is discharged over 40Ω to 0.8 V cutoff. FIG. 6 shows the battery potential at open circuit, and the discharge potential under load, of the battery of FIG. 5. FIG. 7 shows the cycling characteristics of the battery of FIG. 5.

As seen in FIG. 6, the battery exhibits low polarization losses during discharge. Down to a 20 U load discharge is supported without significant potential drop when compared to the 1.1 V open circuit battery potential. That is, there is little polarization losses up to discharge current densities of 50 mA cm$^2$ (1 V/20Ω) through the (1 cm$^2$) steel electrode. At higher current densities, a significant potential drop occurs (at resistive loads of 10 U or less). As presented in FIG. 6, this configuration of the iron molten air battery exhibits substantially less hysteresis than was seen in FIG. 4, and as shown in FIG. 7 stable cycling behavior. The voltage efficiency of the cell is 84% (1.05 V discharge/1.25 V charge) and the coulombic efficiency is 75% (=18 coulombs discharge/the injected charge of 0.2 A×120 seconds) to a discharge cut-off voltage of 0.8 V. The coulombic efficiency increases to over 85% when the cell is discharged to a cut-off voltage of 0.7 V, as shown in FIG. 7 to include a portion of a second voltage plateau which is seen to occur at that potential. This lower voltage plateau discharge can be attributed to either the partial discharge of $Fe^{2+}$ to $Fe^{3+}$ or to a solid carbon discharge, as described for the carbon molten air rechargeable battery of Example 2.

Example 1A

Lower Temperature Iron Molten Air Rechargeable Battery

Figure 8:
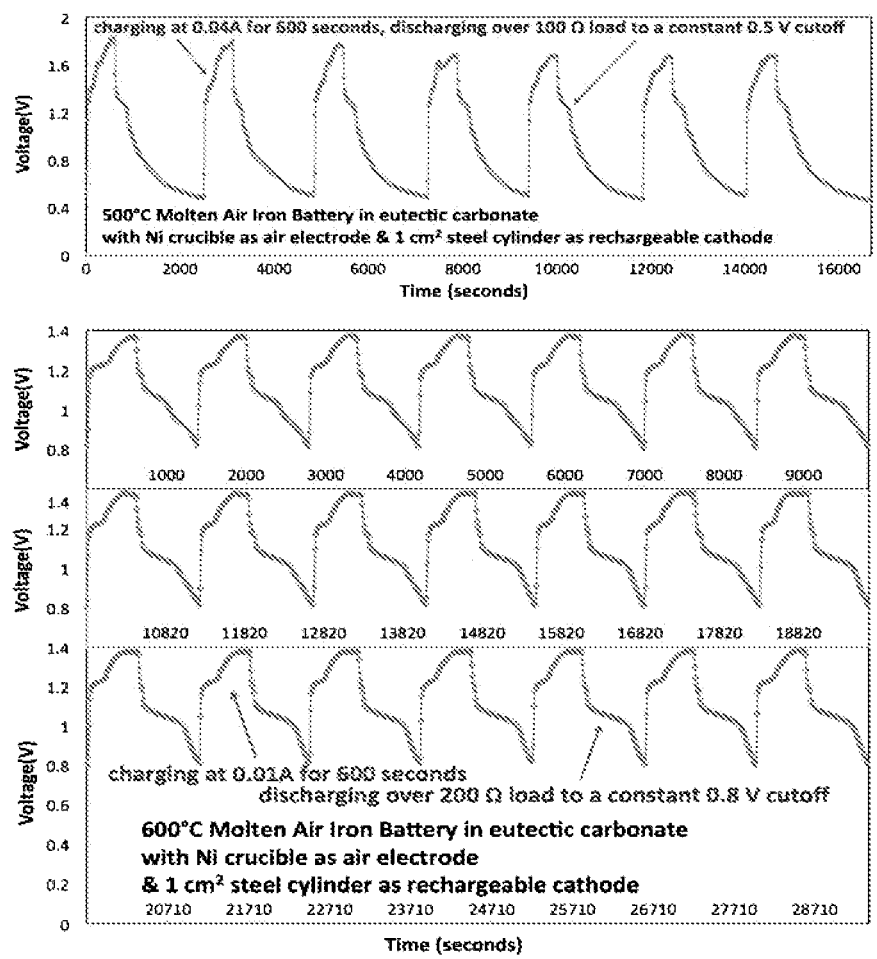
FIG. 8 shows the cycled charge/discharge behaviour of a eutectic $Li_{0.87}Na_{0.63}K_{0.50}CO_3$ molten electrolyte low temperature rechargeable iron molten air battery at 500° C. (top row) or 600° C. (bottom 3 rows).

FIG. 8 shows the cycled charge/discharge behaviour of a eutectic $Li_{0.87}Na_{0.63}K_{0.50}CO_3$ molten electrolyte low temperature iron molten air battery at 500° C. (top row) or 600° C. (bottom 3 rows). The 500° C. battery was cycled at 0.04 A charge and discharged at 100Ω, while the 600° C. battery was cycled at 0.01 A charge and discharged at 200Ω. The eutectic molten electrolyte contained 3 m $Li_2O$ with 0.05 m $Fe_2O_3$.

The top row of FIG. 8 presents the low relative discharge to charge voltage over 7 cycles at 500° C. It can seen that 4 cycles are required to reach a level charging potential. The 500° C. 100Ω discharge exhibits a small shoulder which develops at 0.8 V. At 600° C., this shoulder discharge is sustained at ~1 V, and increases further to ~1.1 V over a 200Ω load. At heavier load, the polarization is larger. Over a 10Ω constant load the discharge voltage is 0.1 V, 0.2 V or 0.5 V at 395° C., 500° C. and 600° C., respectively. At 600° C. and a lower constant current of 0.01 A, the charging voltage further decreases to 1.3 (±0.1) V.

In FIG. 8, the lower 3 rows present 21 cycles at 600° C. The ~1.1 V discharge voltage is high compared to the 1.3 (±0.1) V voltage at 0.01 A charge. The cell is discharged reproducibly to a 0.8 V cut-off yielding 60% coulombic efficiency of the injected charge. A separate 600° C. battery cycled to a 0.5 V discharge cut-off (not shown) discharged to 92% of injected charge by including the low voltage plateau transition. The eutectic electrolyte has, however two challenges: $Li_2CO_3$ is more conductive than electrolytes containing $Na_2CO_3$ or $K_2CO_3$ and $Li_2O$ is more stabilizing than $Na_2O$ or $K_2O$ in carbonates or chlorides. High voltage efficiency and cycling is observed at 600° C., but polarization is excessive at 395° C.

Example 2

Carbon Molten Air Rechargeable Battery

Carbon formation during molten carbonate electrolysis provides charging of the carbon molten air batteries described herein. Molten carbonate cells have been widely probed as robust fuel cells, and this, in combination with the reverse of this process (electrolysis for carbon capture) provide new opportunities for high capacity carbon molten air reversible battery storage.

Figure 9:
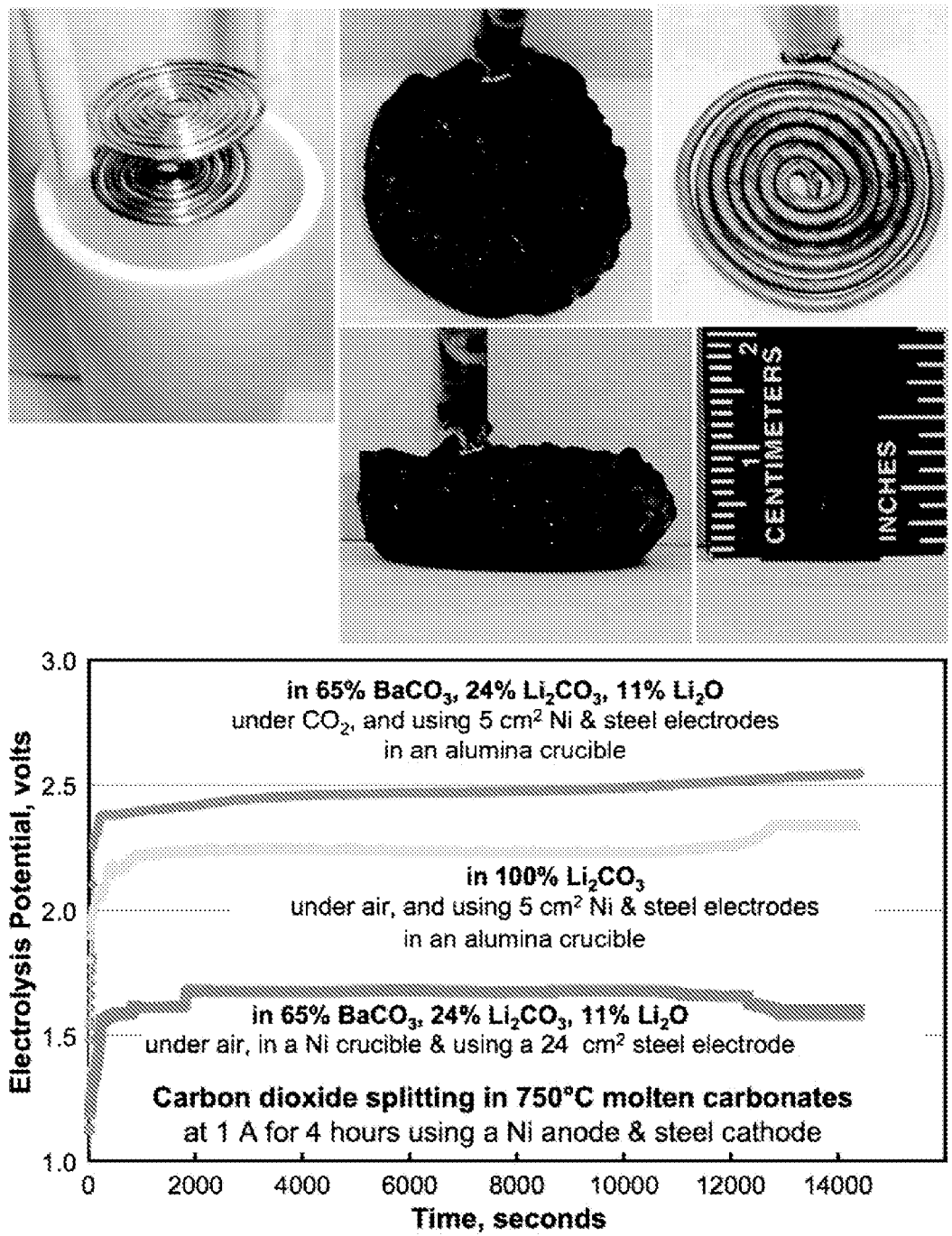
FIG. 9 shows a rechargeable carbon molten air battery and the electrolysis potential of carbonate electrolysis in various molten carbonates under various conditions.

FIG. 9 depicts charging the carbon molten air battery. The left hand photo shows coiled 5 cm$^2$ nickel (air) & 5 cm$^2$ steel (cathode) electrodes prior to electrode insertion (as used in the top and middle traces in the charge reactions shown below in FIG. 9. The left hand photo shows the post-electrolysis reusable air electrode. The middle photo shows the thick carbon layer formed on the 5 cm$^2$ steel cathode during a 4 hour 1 A charge in molten carbonate. The electrodes were photographed after extraction and without washing. The graph in FIG. 9 shows the electrolysis potential of carbonate electrolysis in various molten carbonates under various conditions.

As seen in the photos of FIG. 9, in a barium/lithium carbonate mix at 750° C., a thick layer of carbon forms on the steel cathode side facing the air electrode. When extracted, cooled washed and weighed, the carbon mass approaches the theoretical mass calculated by the 100% coulombic efficiency of the 4 electron reduction of carbonate. The photo is the cathode extracted after 4 hours of 1 A charge. An electrolysis in a barium mix electrolyte denoted as the top trace in the electrolysis potential versus time plot in FIG. 9. As seen in the bottom trace in the graph of FIG. 9, the charging potential falls to ~1.6 V when an oversized Ni air electrode (the Ni crucible) is used in the carbonate (to carbon) splitting. As summarized in FIG. 10, the charging potential decreases to ~1.2 V at low current densities (<100 mA cm$^2$) Similar carbon depositions are observed during a 4 A electrolysis in 1 hour (albeit at higher potential), and during an electrolysis in a pure $Li_2CO_3$, rather than in a Li—$BaCO_3$ mixed electrolyte.

As calculated from the temperature dependence of the thermochemical enthalpy and entropy of the constituent (see e.g., Chase, *J. Phys. Chem. Red. Data,* 9, 1, 1998), molten carbonates can be highly stable at elevated temperatures. Increasing the temperature above 800° C. in molten $Li_2CO_3$ favors CO via the Boudouard reaction (equation 4). If not collected, this CO gas, instead of solid carbon product, leads to a parasitic charge loss for the carbon battery via the evolution of carbon monoxide gas.

$$2CO \rightleftharpoons C + CO_2 \qquad (4)$$

Figure 11:
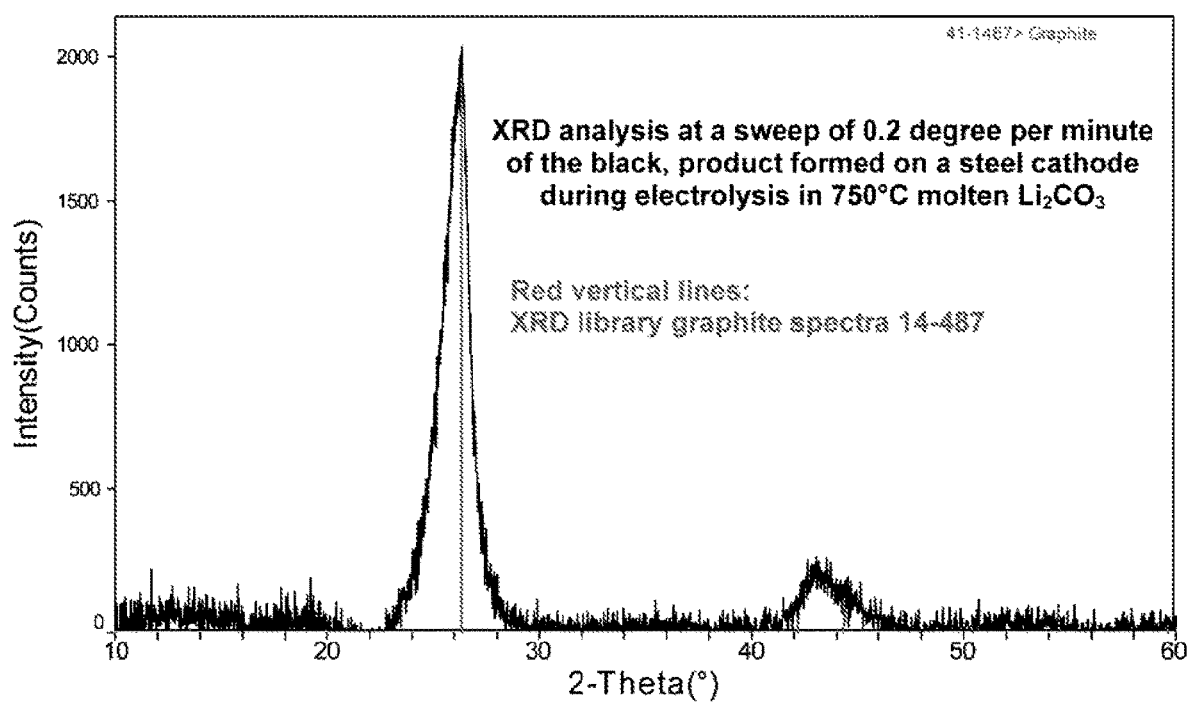
FIG. 11 shows the X-ray powder diffraction (XRPD) pattern of the post-electrolysis, black cathode product formed in a rechargeable carbon molten air cell (after washing to remove excess electrolyte).

An X-ray powder diffraction (XRPD) pattern of the post-electrolysis, black cathode product is shown in FIG. 11 (after washing to remove excess electrolyte). As can be seen, the measured XRPD pattern matches the library XRPD pattern of pure graphite. Graphite is deposited as the cathode product from molten lithium carbonate, molten alkali mixes, and molten lithium and alkali earth carbonate mixes, and at temperatures below 800° C. remains the carbon product, independent of current density, or whether the product is electrodeposited onto a steel or nickel cathode.

Figure 10:
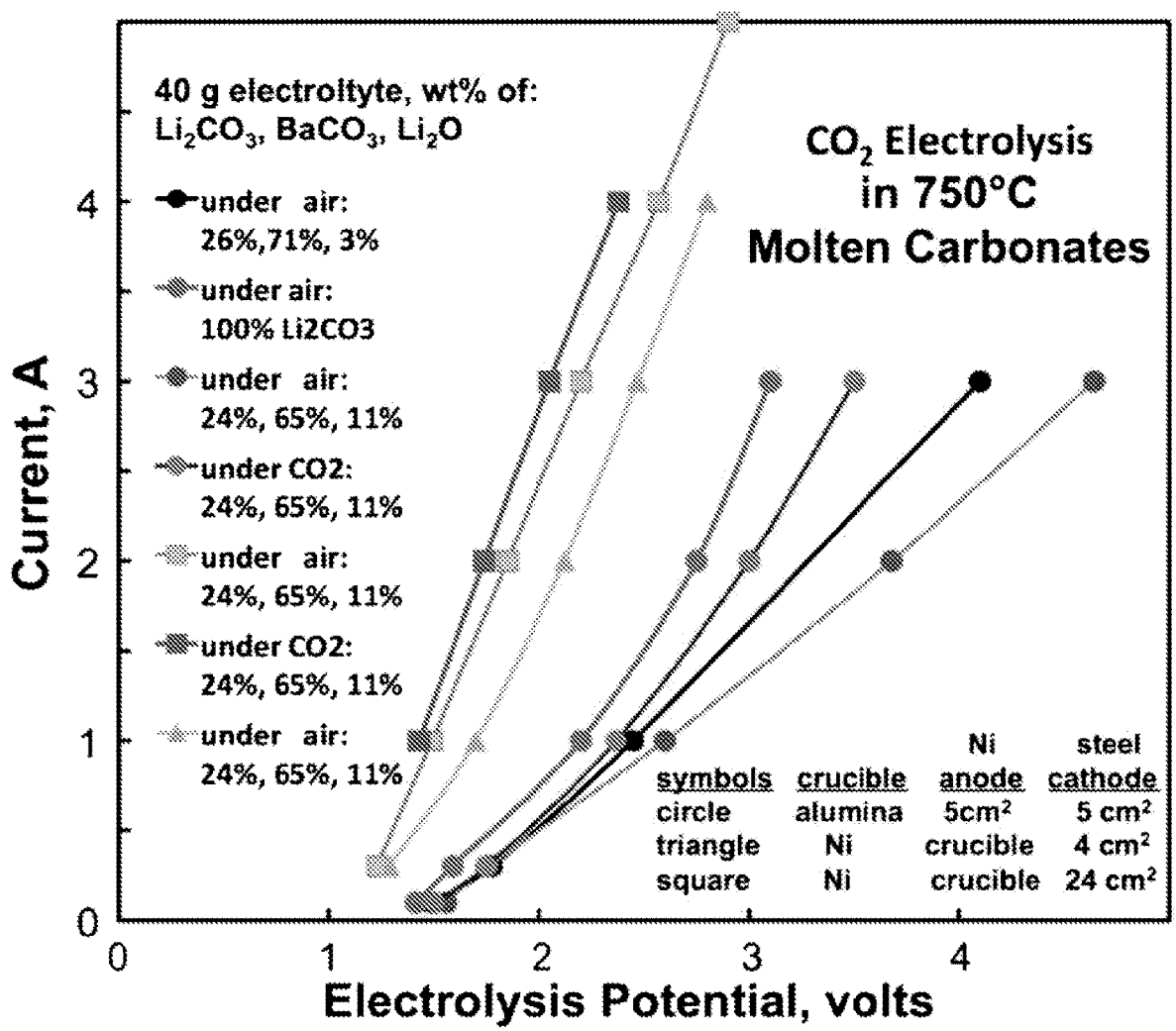
FIG. 10 depicts the carbon molten air electrolysis charging potential as a function of time in various carbonate electrolytes at 750° C. under either air or pure $CO_2$.

FIG. 9 summarizes the variation of charging potential in time at high current densities sustained by the carbon molten air battery using a variety of cell configurations and carbonate electrolytes (the middle trace in the lower graph is in pure $Li_2CO_3$, while the two other traces are in Ba/Li mixed electrolytes). FIG. 10 compares the polarization during charge with a variety of electrolyte and cell conditions. $BaCO_3$ is more facile in $CO_2$ uptake for carbon capture. However, pure $Li_2CO_3$, which also forms a robust carbon overlayer, is more conductive for batteries. Hence, for this carbon molten air battery example we focused on the latter, $Li_2CO_3$, electrolyte. As presented in the right side of FIG. 1, due to the large polarization of the air electrode during discharge in lithium carbonate, a substantial hysteresis when cycling a carbon molten air battery with the same sized air and counter electrodes may be expected. This is observed in FIG. 12 in which equal surface area sandwiched electrodes in a pure $Li_2CO_3$ molten electrolyte were used to demonstrate the rechargeable battery. This carbon molten air cell contains molten lithium carbonate with an upper, planar 1.0 $cm^2$ nickel electrode exposed to the air, and separated by the molten carbonate from a lower 1.0 $cm^2$ planar Pt electrode. Platinum was again used to demonstrate that the current collector metal is not involved in oxidation or reduction, but only as a conduit for charge transfer. Steel is also effective. The energy efficiency of this battery configuration is low, as the cell is charged at 2 V and discharged at only 0.5 V. However, the current extracted during discharge is similar to the current injected during charge, indicative of the high coulombic efficiency (albeit at low voltage efficiency using FIG. 12 cell configuration) of the carbon molten air battery. The ~300 coulombs of charge injected during the two charge cycles in the lower portion of FIG. 7 is approached by the 270 coulombs of discharge generated over the load, prior to depletion, during the two discharge cycles. Hence, the cell exhibits high coulombic efficiency (the coulombs generated during discharge is over 90% of the coulombs inject during charging).

Figure 12:
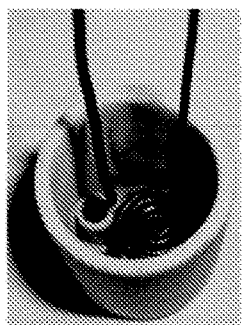
FIG. 12 shows the cell configuration and the charge cycling characteristics of a rechargeable carbon molten air cell containing an alumina crucible, a nickel air electrode and a platinum electrode immersed in 750° C. $Li_2CO_3$.
Figure 12:
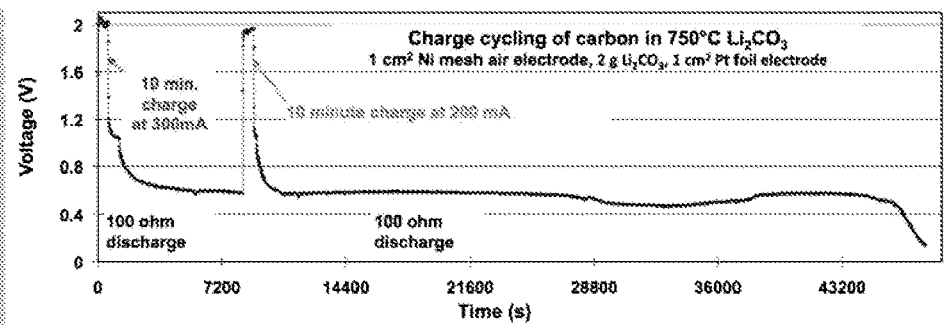
Figure 13:
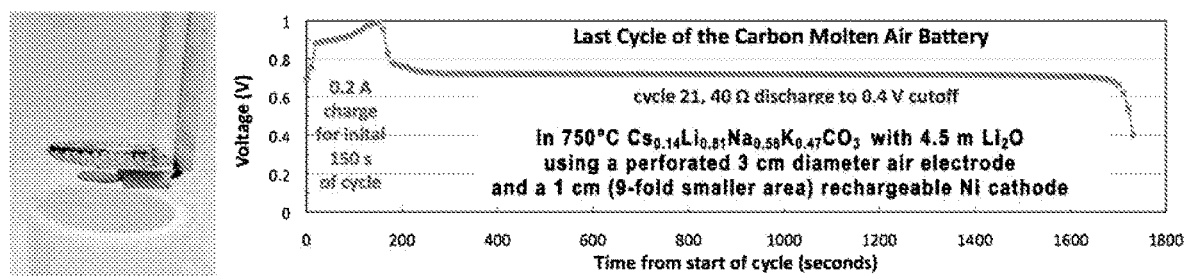
FIG. 13 shows the cell configuration and the charge cycling characteristics (last cycle, cycle number 21) of a rechargeable carbon molten air cell containing an alumina crucible, a nickel foil air electrode nine times larger than the nickel cathode immersed in 750° C. $Cs_{0.14}Li_{0.81}Na_{0.58}K_{0.47}CO_3$ electrolyte.

A carbon molten air battery that exhibits improved energy efficiency is shown in FIG. 13. The improvements (over the battery of FIG. 12) include the addition of $Li_2O$ to the electrolyte (to prevent carbonate decomposition), a larger surface area of air electrode relative to the rechargeable cathode (to minimize the hysteresis), an alkali mix carbonate electrolyte, and a cathode of nickel (rather than steel). The alkali mix electrolyte was a Li/Na/K carbonate eutectic, with 25 wt % cesium carbonate added. Cesium carbonate has been shown to improve oxygen solubility which can further decrease the air electrode polarization losses (see Smith et al., *Electrochem. Solid State Lett.*, 2, 207-209, 1999). Whereas a steel electrode tends to corrode in molten alkali mix carbonate, we find that nickel is stable. As with steel, the analyzed cathodic charging product on nickel is graphite, as determined by XRPD analysis.

As seen in FIG. 13, the improved carbon molten air battery of FIG. 12 exhibits good charge cycling, and low polarization (supporting current densities of over 50 mA cm_2). As measured in FIG. 12 to a 0.3 V discharge cutoff, the energy efficiency (average 0.7 V discharge/0.95 V charge) is 74%, and the coulombic efficiency (comparing 28 coulombs generated to 30 C injected) is over 90%.

Figure 14:
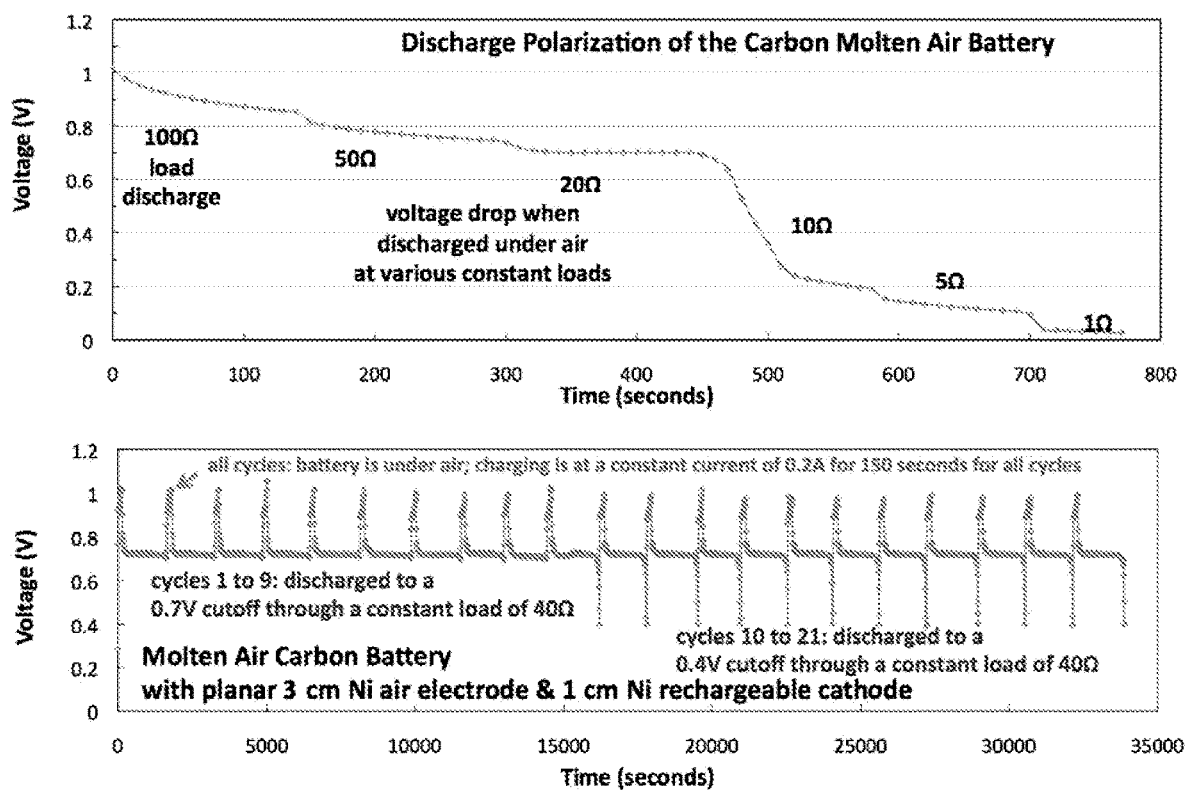
FIG. 14 shows the polarization and cycling characteristics of the cell shown in FIG. 13.

FIG. 14 shows the polarization and cycling characteristics of the carbon molten air battery presented in FIG. 13. High discharge potentials are maintained down to a load of 20Ω (through the 1 cm diameter cathode and 3 cm diameter air electrode), and reproducible charge/discharge cycles to either a 0.7 V or 0.4 V cut-off, in which the battery has been charged at a 0.2 A constant current for 150 seconds, followed by discharge over a 40Ω resistance load.

Example 3

$VB_2$ Molten Air Rechargeable Battery

The electrochemical discharge products of $VB_2$, ($B_2O_3$ (mpt. 450° C., white, melts clear) and $V_2O_5$ (mpt. 690° C., yellow/brown)) have a low melting point compared to $VB_2$ (mpt. 2450° C., black). Molten $B_2O_3$ and $V_2O_5$ salts are miscible, whereas the charged product, $VB_2$, does not appear to be soluble in the molten $B_2O_3/V_2O_5$ mix. Due to its higher density, $VB_2$ descends in the molten mixture. The $B_2O_3/V_2O_5$ molten phase is without significant ionic dissociation, and hence is an electrochemical insulator. Alone, the melt cannot be electrochemically charged. However, dissolution of an oxide such as $Li_2O$ into the $B_2O_3/V_2O_5$ melt provides adequate ionic conductivity for charging. The high temperature (molten) phase of the $Li_2O/B_2O_3/V_2O_5$ system has not been previously explored, but the ionic conductivity range of this system in the solid phase at temperatures up to 250° C. has been established (see, e.g., Lee et al., *Solid State Ionics*, 175, 687, 2005). At higher temperature, the simpler, binary system of $B_2O_3$ (mpt. 450° C.) and $Li_2O$ (mpt. 1438° C., white, dissolves clear) presents a complex phase diagram with an extensive homogenous liquid phase above 767° C. (see, e.g., Passierb et al., *Physica*, 304, 463-476, 2001; Ferreira et al., *J. Am. Ceram. Soc.*, 94, 3833, 2011).

Figure 15:
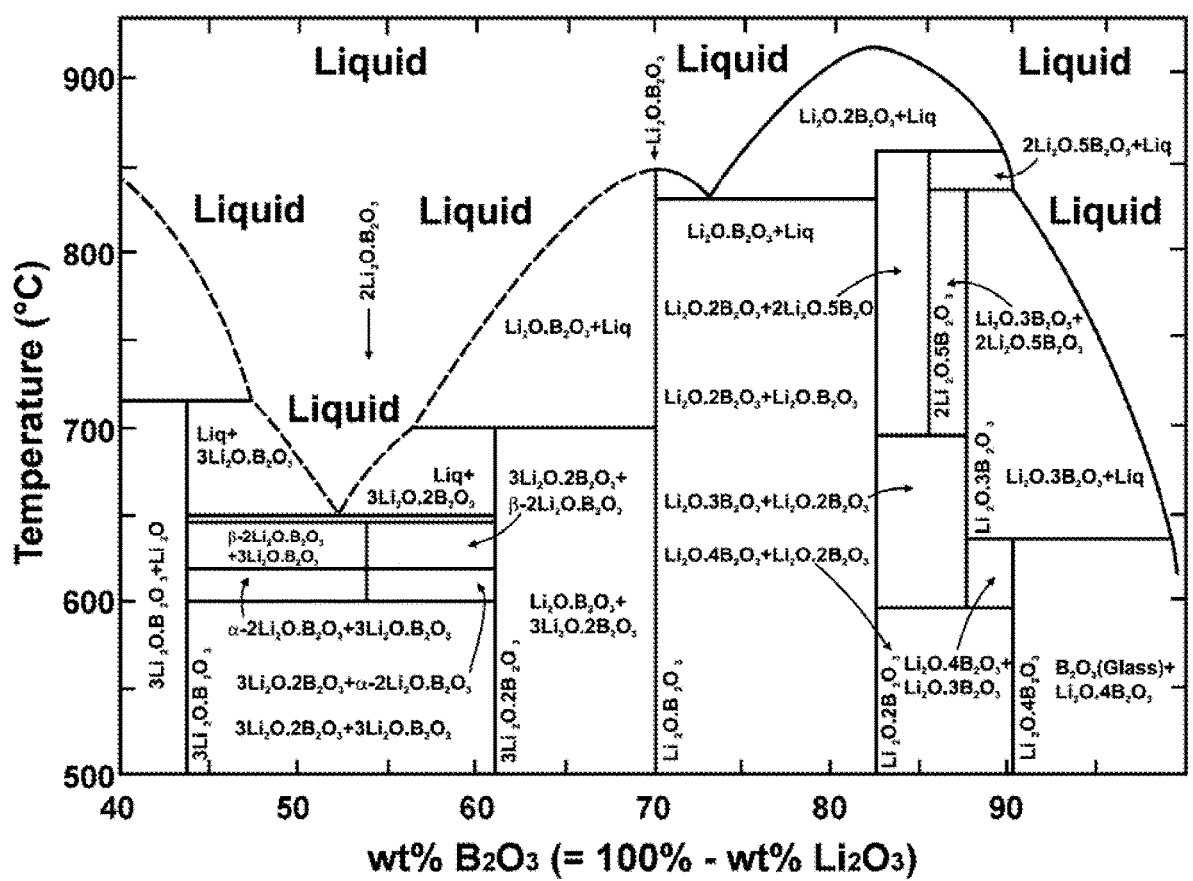
FIG. 15 shows the liquid component of a binary $Li_2O/B_2O_3$ (wt. %) system)

FIG. 15 presents the liquid domain and complexity of the binary $Li_2O/B_2O_3$ (wt. %) system. See Ferreira et al., *J. Am. Ceramics. Soc.*, 94, 3833, 2011. Domains of this diagram that we have probed are indicated by the "Liquid" sections in the top of the figure. A comparable phase diagram of the trinary system including $V_2O_5$, or the quaternary system also including CaO is not available. Each of the following electrolytes is liquid and appears to be homogeneous at 800° C.: the molar ratios of $V_2O_5:B_2O_3:Li_2O:CaO$ of 1:2:2:0, 1:7:12:0 and 1:2:4:3.

Figure 16:
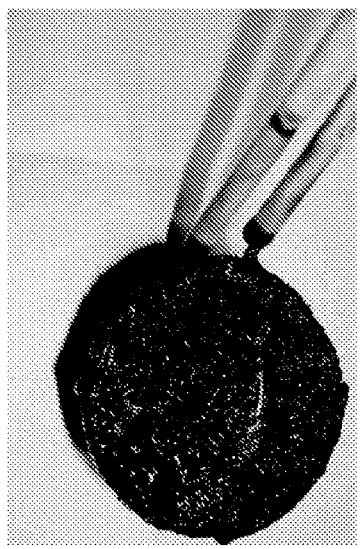
FIG. 16 shows $VB_2$ formed on the steel wire cathode of a rechargeable VB2 molten air battery and the 100 ohm discharge potential subsequent to a 0.2 A 10 minute charge in various vanadate/borate electrolytes.
Figure 16:
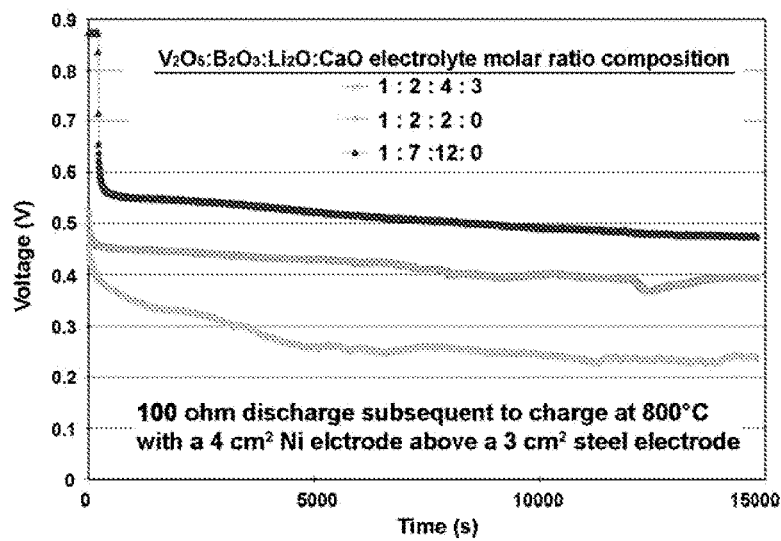

FIG. 16 includes a photo of an initially bare, coiled steel wire electrode, after electrolysis in the molten vanadate, borate, lithium mixture. The extracted electrode exhibits evidence of $VB_2$ on steel subsequent to charging (8.5 hour charges at 0.2 A) in a 767° C. 1:2:0.67 $V_2O_5:B_2O_3:Li_2O$ mix electrolyte. Charging was accomplished with a coiled nickel wire oxygen generating anode, situated above the coiled steel wire cathode, in an alumina crucible containing the electrolyte, and yielded a thick black deposit on the cathode. The charging product was examined by extraction, cooling, and acid wash of the cathode to remove soluble components. Fourier Transform Infra Red (FTIR) of the product exhibited absorption peaks at 1640 and 3470 $cm^{-1}$ that coincide with those of commercial $VB_2$ (obtained from NOAH high purity chemicals). A more extensive charge (2 A charge for 6 hours) resulted in a mass loss of 1.5 g, ~40% of the expected mass loss due to oxygen evolution via equation (3) (in the charging, reverse mode). Electrolytes prepared from mixtures of $LiVO_3$ and $LiBO_2$ (rather than non-lithiated salts mixed with Li2O) also yielded similar results.

Figure 17:
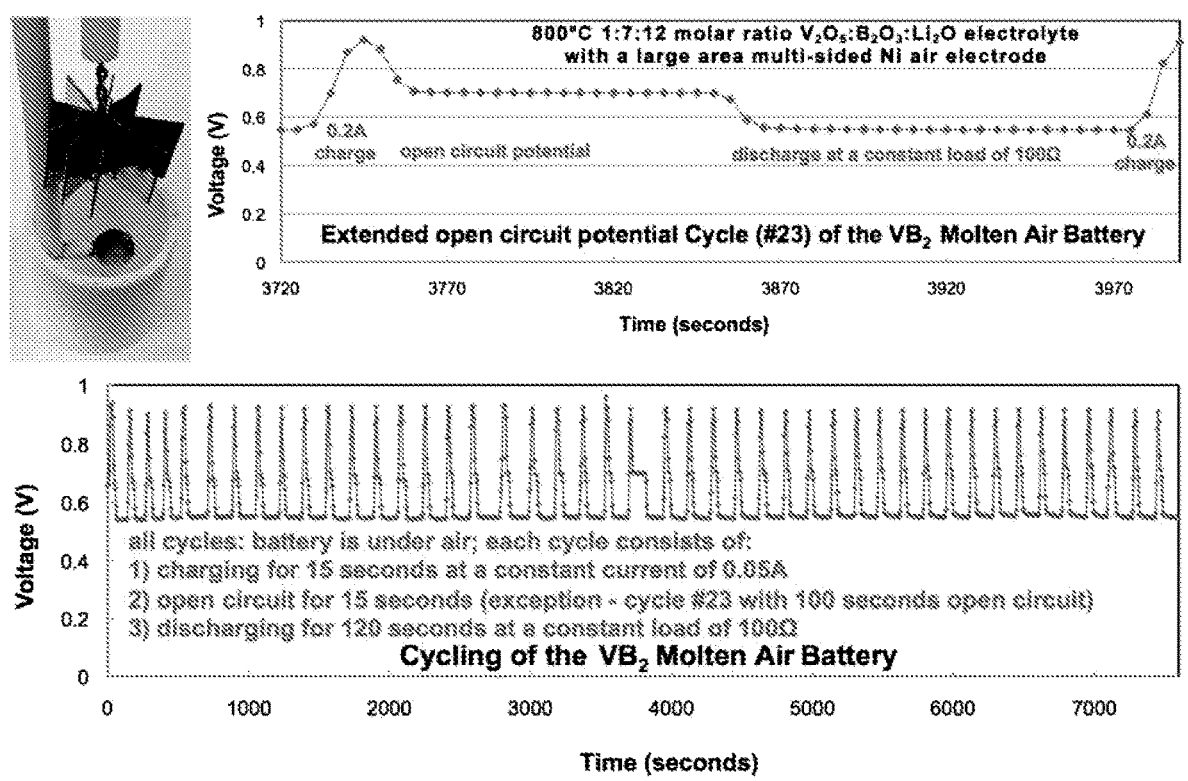
FIG. 17 shows the cell configuration and the charge cycling characteristics of a rechargeable $VB_2$ molten air battery using a large surface area nickel air electrode.

The right side of FIG. 16 includes the extended discharge of $VB_2$ molten air batteries containing other electrolytes composed to improve the cell discharge potential. The discharge is subsequent to a 0.2 A charge for 10 minutes. A higher fraction of added $Li_2O$ was added to improve ionic conductivity (and increase the discharge potential under load), while addition of CaO was added to observe its effect on potential. The middle trace represents 1:2:4:3 $V_2O_5:B_2O_3:Li_2O:CaO$. The bottom trace represents 1:2:2:0 $V_2O_5:B_2O_3:Li_2O:CaO$. The top trace represents 1:7:12:0 $V_2O_5:B_2O_3:Li_2O:CaO$. As can be seen, the electrolyte that after charging exhibited the highest discharge voltage is the top trace (1:7:12:0 ratio $V_2O_5:B_2O_3:Li_2O:CaO$). Further increases in the relative $B_2O_3$ or $Li_2O$ concentrations were observed to decrease the discharge voltage. Although a relatively light load (100 U) was utilized, and although the air electrode has a higher surface area (4 cm$^2$), in all three cases the discharge potential is significantly less than the charging potential. To present a demonstration of a $VB_2$ molten air battery with less hysteresis, a very large surface area (50 cm$^2$) air electrode was prepared by folding a 25 cm×2 cm Ni shim into a multiple sided configuration, as shown in FIG. 17. As can seen in the lower panel of FIG. 17, starting with a cell in the discharged (molten borate and vanadate) condition, the $VB_2$ molten air system can repeatedly inject and release charge The middle cycle includes n extended period at open circuit, and this cycle is expanded in the top panel of FIG. 17. The hysteresis is large, although not significantly different than observed in many hydrogen fuel cells. This is evident in the difference between charging (0.9 V at 0.2 A) and discharging (0.55 V over a 100 U load) voltages, but the discharge voltage is stable, and as can be seen in the middle cycle (cycle number 23 as expanded in the upper part of the figure), the open circuit potential is 0.7 V. It is evident in the repeated recharge cycles that electrochemical storage has been achieved.

Example 4

Optimization of the Iron Molten Air Rechargeable Battery

The experiments performed in this example detail various modifications to the physical chemistry components of the iron battery system that were performed in an attempt to increase the coulombic efficiency and minimize the requisite electrolysis potential of the iron molten air rechargeable battery.

Systematic Optimization of Electrolytic Iron Production in Molten Carbonate.

A systematic, variation of molten iron electrolysis can yield efficient iron production efficiency at low energy. General conditions of the first series of electrolyses are summarized in Table 2. The cathode in this first series of experiments was a thin planar 6.25 cm$^2$ steel sheet. This cathode lies under the anode, and the iron product is deposited on top of the cathode. This cathode surface is the active area exposed to short ion diffusion path between the electrodes.

TABLE 2

| | |
|---|---|
| Current of electrolysis | 1.0 amp |
| Time of electrolysis (1 h) | 3600 s |
| Theoretical max mass Fe$^0$ from electrolysis: $Fe^{3+} + 3e^- \rightarrow Fe^0$ | 1 A × 3600 ÷ 96485 ÷ 3 × 55.85 = 0.696 g |
| Anode: Ni wire tightly coiled, 1 = 16 cm, d = 2.0 mm, area: | 10 cm$^2$ |
| Cathode: Steel shim, 2.5 cm × 2.5 cm, area | 6.25 cm$^2$ |

Table 3 summarizes the effect of electrode spacing and electrolyte mass on electrolysis (1 hour electrolyses at 1 A in an 800° C. molten lithium carbonate electrolyte containing 1.5 m $Fe_2O_3$ and 3 m $Li_2O$ (to generate 3 m $LiFeO_2$ in solution). In this series of experiments the anode, a coiled pure nickel (McMaster 200 Ni) wire was situated 3 mm below the surface of the electrolyte to facilitate oxygen evolution in an attempt to minimize oxygen interaction with the cathode product.

In Table 3, the electrodes are delineated in Table 2. The electrolyte mass was changed as indicated below, to maintain electrolyte coverage in experiments with smaller or larger inter-electrode separations. Coulombic efficiency, particularly during the 0.25 cm separation electrolysis, may have been impacted by shorting as the iron deposit grew from the cathode towards the anode.

TABLE 3

| Temperature (° C.) | 800 | 800 | 800 | 800 |
|---|---|---|---|---|
| Anode/Cathode separation (cm) | 0.25 | 0.5 | 1.0 | 2.0 |
| Electrolyte Total mass (g): Electrolyte weighed from a mix of 200.0015 g Li$_2$CO$_3$, 47.8888 g Fe$_2$O$_3$ and 17.9286 g Li$_2$O, | 8.3193 | 16.6128 | 33.2174 | 66.4510 |
| Fe$^{3+}$ concentration (mol/kg Li$_2$CO$_3$) as Fe$_2$O$_3$ | 3.0 m | 3.0 m | 3.0 m | 3.0 m |
| Li$_2$O concentration (mol/kg Li$_2$CO$_3$) | 3.0 m | 3.0 m | 3.0 m | 3.0 m |
| Cathode: Steel shim, 2.5 cm × 2.5 cm | 6.25 cm$^2$ | 6.25 cm$^2$ | 6.25 cm$^2$ | 6.25 cm$^2$ |
| Fe$^0$ mass in product (g) | 0.135 | 0.328 | 0.381 | 0.249 |
| Coulombic efficiency (100% × Fe$^0$ mass experiment/theory) | 19.4 | 47.0 | 54.7 | 35.7 |

Figure 18:
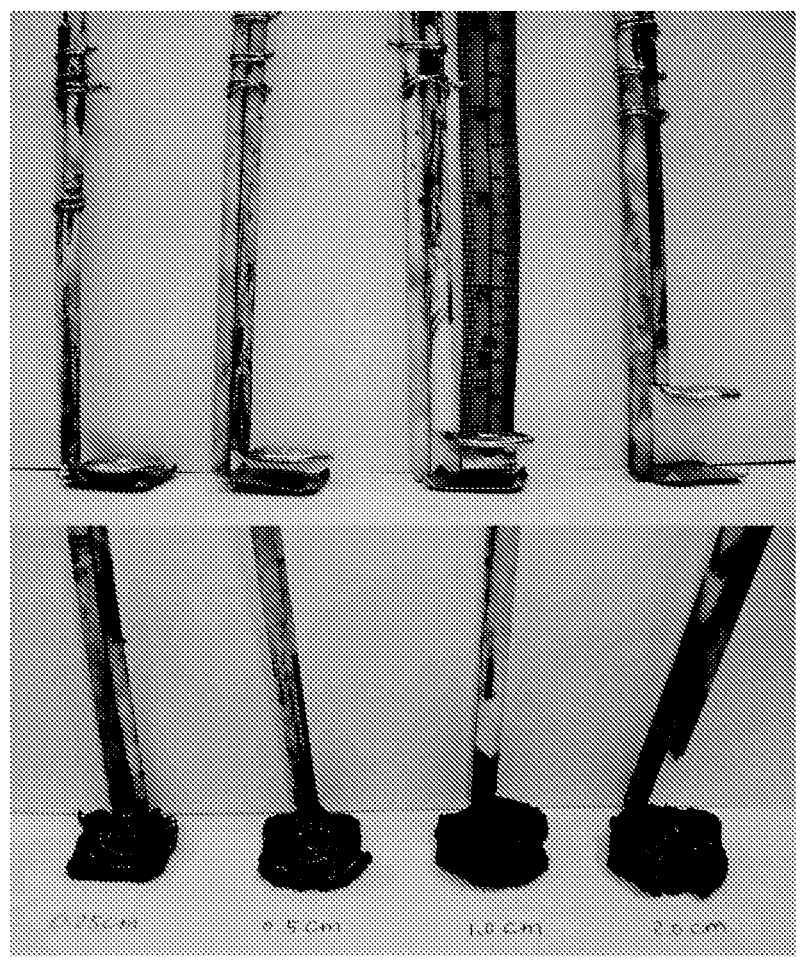
FIG. 18 shows the anode (upper electrode) and cathode (lower electrode) of a rechargeable iron molten air battery prior to electrolysis (top) and following electrolysis prior to removal of the cathode product (bottom).

In the first series of experiments, summarized in Table 3, the anode to inter-electrode spacing was varied, and the mass of electrolyte was changed to cover smaller or larger inter-electrode separations. The electrodes before and after electrolysis are shown in FIG. 18.

The lithium based electrolyte is highly conductive, and even at these relatively high current densities, electrolytic resistance losses are not significantly impacted by the variation of inter-electrode spacing. The electrolysis potentials at 1 A constant current are the same to within 0.1 V, independent of the 0.25 to 2.0 cm electrode separation. Coulombic efficiency, particularly during the 0.25 cm separation electrolysis may have been impacted by shorting as the iron deposit growing from the cathode approached the anode, and that a maximum of over 50% coulombic efficiency is achieved for an intermediate spacing of 1.0 cm.

Figure 19:
FIG. 19 shows the side view of a cathode with product following electrolysis in a rechargeable iron molten air battery.
Figure 20:
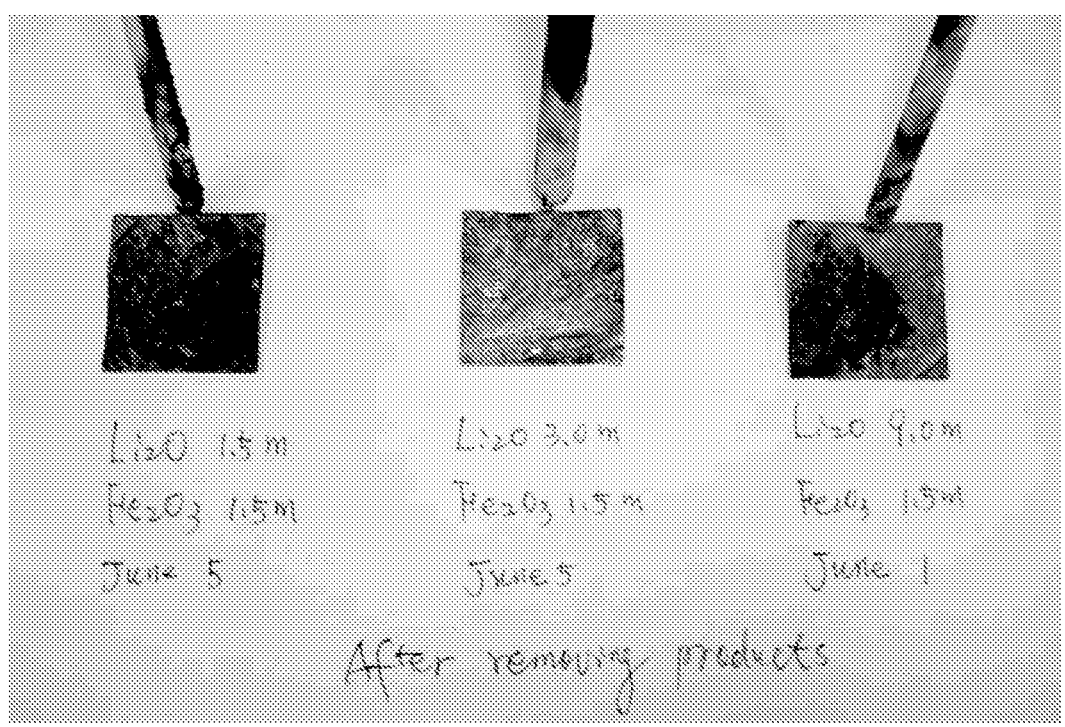
FIG. 20 shows various cathodes, after removal of the product following electrolysis in a rechargeable iron molten air battery.
Figure 21:
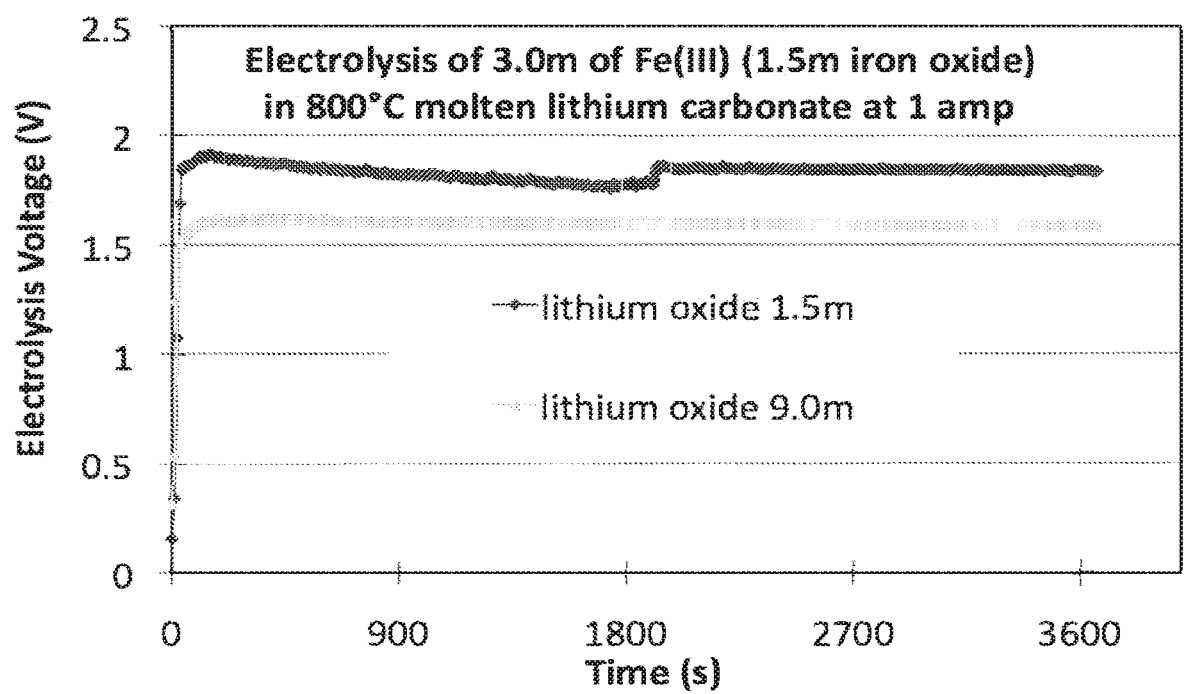
FIG. 21 shows the effect of $Li_2O$ concentration during electrolysis in a rechargeable iron molten air battery.

Table 4 summarizes iron electrolyses experiments in which the starting concentration of Li$_2$O was varied. The anode/cathode separation was 1.0 cm and the other electrolysis conditions were as given in Table 2. An intermediate Li$_2$O concentration (2 molal) conducted for double the electrolysis time and generated greater iron metal product. In each case, the initial ferric concentration (as added Fe$_2$O$_3$) was maintained constant at 3 molal Fe$^{3+}$ in Li$_2$CO$_3$. Fe$_2$O$_3$ is not soluble in carbonate unless Li$_2$O is added, and reacts to form LiFeO$_2$ in the molten solution. The Li$_2$O is not consumed in the electrolysis process, as when $LiFeO_2$ is reduced to form iron metal, $Li_2O$ is liberated to dissolve the next iteration of added iron ore ($Fe_2O_3$). As seen in the photo in FIG. 19, the iron is deposited directly on top of the cathode, followed by a black layer of partially reduced iron (magnetite), followed by a layer of the electrolyte containing the excess (brown) $Fe_2O_3$ dissolved in the electrolyte. The iron layer is easily separated from the cathode, and, as seen in FIG. 20, leaves behind a reusable cathode. As seen in Table 4, a 1:1 ratio of $Li_2O$ to $Fe_2O_3$ supports the maximum coulombic efficiency, although it is interesting to note, as shown in FIG. 21, that higher concentrations of $Li_2O$) significantly decrease the required electrolysis potential (as seen comparing the 1.5 m (top trace) and 9.0 m (bottom trace) $Li_2O$ electrolysis). Also evident in the FIG. 21, potential variations are occasionally observed during individual electrolyses, although average electrolysis potential trends are highly consistent.

TABLE 4

| Temperature (° C.) | 800 | 800 | 800 | 800 |
|---|---|---|---|---|
| Time of electrolysis (h) at 1.0 amp | 1 h | 2 h | 1 h | 1 h |
| Theoretical max mass $Fe^0$ from electrolysis: $Fe^{3+} + 3e^- \rightarrow Fe^0$ | 0.696 g | 1.389 g | 0.696 g | 0.696 g |
| Average Potential of electrolysis (V) | 1.84 | 1.80 | 1.69 | 1.57 |
| Carbonate Electrolyte: $Li_2CO_3$ (g) | 25.000 | 25.001 | 24.992 | 21.999 |
| $Fe^{3+}$ concentration (mol/kg $Li_2CO_3$) | 3.0 m | 3.0 m | 3.0 m | 3.0 m |
| $Fe_2O_3$ mass (g) | 5.9866 | 5.9868 | 5.9843 | 5.9167 |
| $Li_2O$ concentration (mol/kg $Li_2CO_3$) | 1.5 m | 2.0 m | 3.0 m | 9.0 m |
| $Li_2O$ mass (g) | 1.1200 | 1.4941 | 2.241 | 5.9167 |
| Electrolyte Total Weight (g) | 32.1138 | 32.4217 | 33.2174 | 33.1841 |
| $Fe^0$ mass in product (g) | 0.312 | 0.711 | 0.381 | 0.155 |
| Coulombic efficiency (100% × $Fe^0$ mass exper/theory) | 44.8 | 51.7 | 54.7 | 22.3 |

Figure 22:
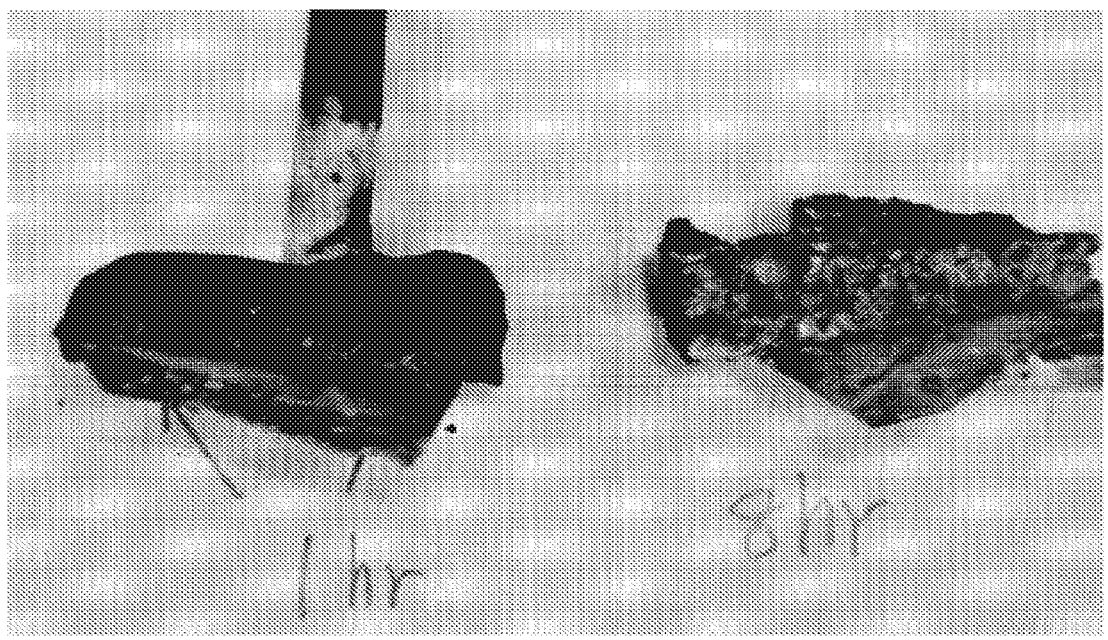
FIG. 22 shows the product removed and partially peeled from the cathode after 1 hour and 8 hours of electrolysis in a rechargeable iron molten air battery.

The next series of experiments utilizes the general conditions described in Table 3, at constant (1.0 A) current, but varies the electrolysis time. The anode/cathode separation was 1.0 cm As summarized in Table 5, whereas 1 hour of electrolysis should theoretically yield 0.7 g of iron (assuming 100% coulombic efficiency of the three electron reduction of dissolved $Fe^{3+}$), 8 hours of electrolysis would be expected to generate 5.6 g of iron metal. As summarized in Table 5, the experimental coulombic efficiency during electrolysis is approximately 50 percent and is not substantially affected by the electrolysis time. What is affected, as shown in the photos in FIG. 22, is the amount of salt that is removed with the product, and is enriched 5-fold in iron metal after the extended electrolysis. The amount of salt accompanying the cathode product is seen to be much lower after 8 hour electrolysis than after 1 hour electrolysis. In each case, the cathode product is washed prior to the iron (0) content analysis. Even subsequent to extended electrolysis time, each of the cathodes remains intact after the removal of product. As seen in FIG. 22, the 8 hour electrolysis cathode product does not exhibit the multiple layers evident, and instead has iron metal throughout the product (but the iron remains spatially diffuse intermingled with electrolyte).

TABLE 5

| Temperature (° C.) | 800 | 800 | 800 | 800 | 800 |
|---|---|---|---|---|---|
| Time of electrolysis (h) at 1.0 amp | 1 h | 1 h 20 m | 2 h | 4 h | 8 h |
| Theoretical max mass $Fe^0$ via: $Fe^{3+} + 3e^- \rightarrow Fe^0$ | 0.696 g | 0.926 g | 1.389 g | 2.778 g | 5.557 g |
| Average Potential of electrolysis (V) | 1.69 | 1.75 | 1.57 | 1.7 | 1.65 |
| $Fe^{3+}$ concentration (mol/kg $Li_2CO_3$) as $Fe_2O_3$ | 3.0 m | 3.0 m | 3.0 m | 3.0 m | 3.0 m |
| $Li_2O$ concentration (mol/kg $Li_2CO_3$) | 3.0 m | 3.0 m | 3.0 m | 3.0 m | 3.0 m |
| Electrolyte Total Weight (g) | 33.2174 | 33.0001 | 33.2163 | 33.2143 | 33.2177 |
| $Fe^0$ mass in product (g) | 0.381 | 0.529 | 0.732 | 1.493 | 2.553 |
| Coulombic efficiency (100% × $Fe^0$ mass exp/theory) | 54.7 | 57.1 | 52.7 | 53.7 | 45.9 |
| * anode contact broke just prior to completion | | * | * | | |

Figure 23:
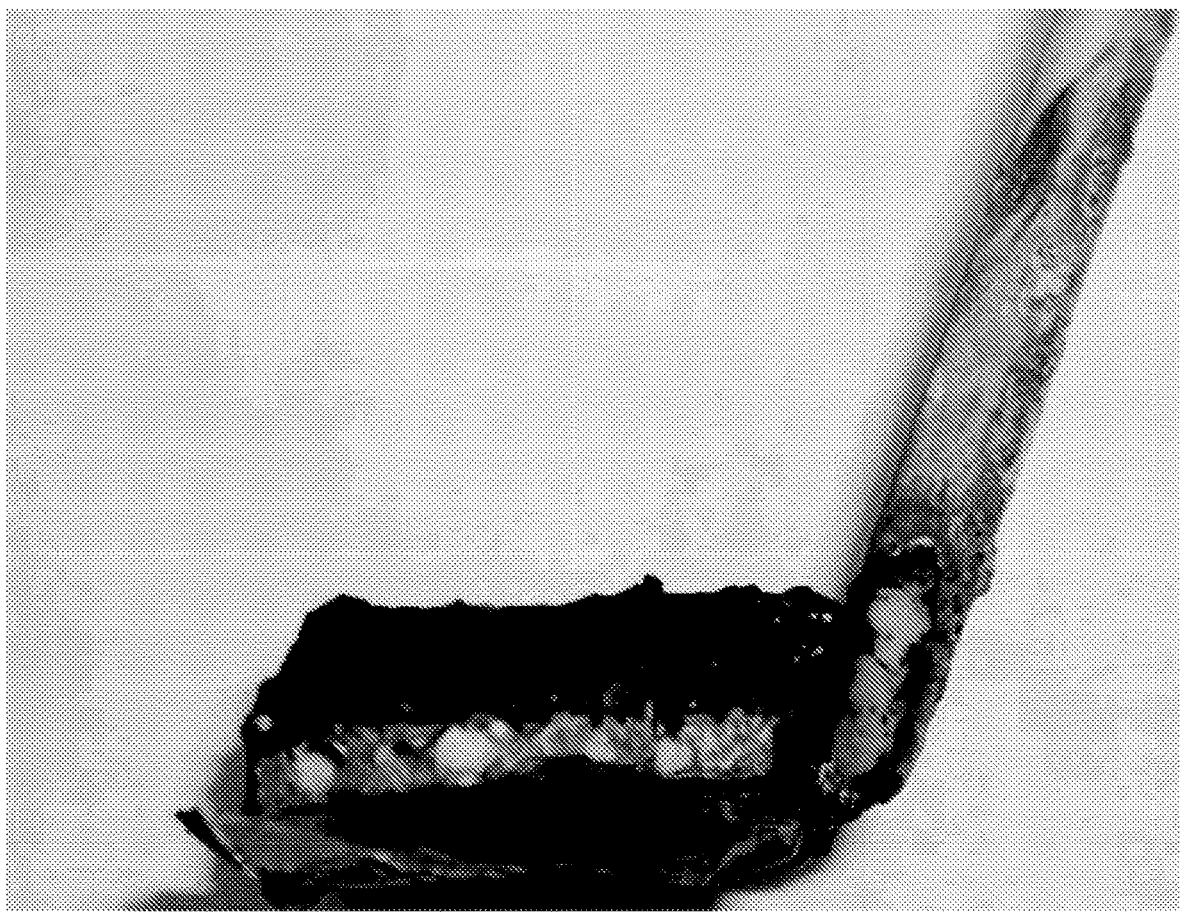
FIG. 23 shows the side view of a cathode with product following 1 hour electrolysis (750° C., $Li_{0.85}Na_{0.61}K_{0.54}CO_3$ electrolyte containing 3 m $LiFeO_2$) in a rechargeable iron molten air battery

Sodium carbonate (mpt. 851° C.) or potassium carbonate (mpt. 891° C.) both have higher melting points than lithium carbonate (mpt. 723° C.). However, a eutectic mix of the three carbonates, such as $Li_{0.85}Na_{0.61}K_{0.54}CO_3$, has melting point below 400° C., and provides an opportunity to explore iron electrolysis at lower temperatures. At these lower temperature conditions, the electrolysis potential would be expected to be considerably higher. The reaction of iron oxide to iron and oxygen is endothermic, with (i) an increase in rest potential with decrease in temperature. This will be exacerbated by (ii) a lower solubility of iron oxide in the eutectic at lower temperature and with lower lithium ion content, and (iii) higher overpotential due to the higher electrolyte resistance of a mixed alkali, compared to pure lithium, electrolyte. The general conditions of electrolysis are similar to those in Table 2. At the lower 500° C. temperature, only a lower concentration of iron oxide could be dissolved in the eutectic and the sustainable current at a reasonable electrolysis potential was only 0.4 A, rather than 1 A. Hence, the electrolysis time was increased from 1 to 2.5 hours to provide a constant total current during the experiment. As summarized in Table 6, even at the lower current, the lower temperature still requires a high (3.5 V) average electrolysis potential, and results in a poor coulombic efficiency. As seen in Table 6, by 750° C., the $Li_{0.85}Na_{0.61}K_{0.54}CO_3$ eutectic could readily accommodate the full 3 molal $Fe^{3+}$ used in the pure lithium carbonate electrolyte at 800 C. It is evident that in the eutectic at 750° C., a higher electrolysis potential was needed to accommodate the same 1 A current used in the pure lithium electrolyte. Interestingly, coulombic efficiencies are high in both cases, and as seen in FIG. 23, the cathode product contains a low fraction of removed salt, and a high fraction of iron.

Figure 24:
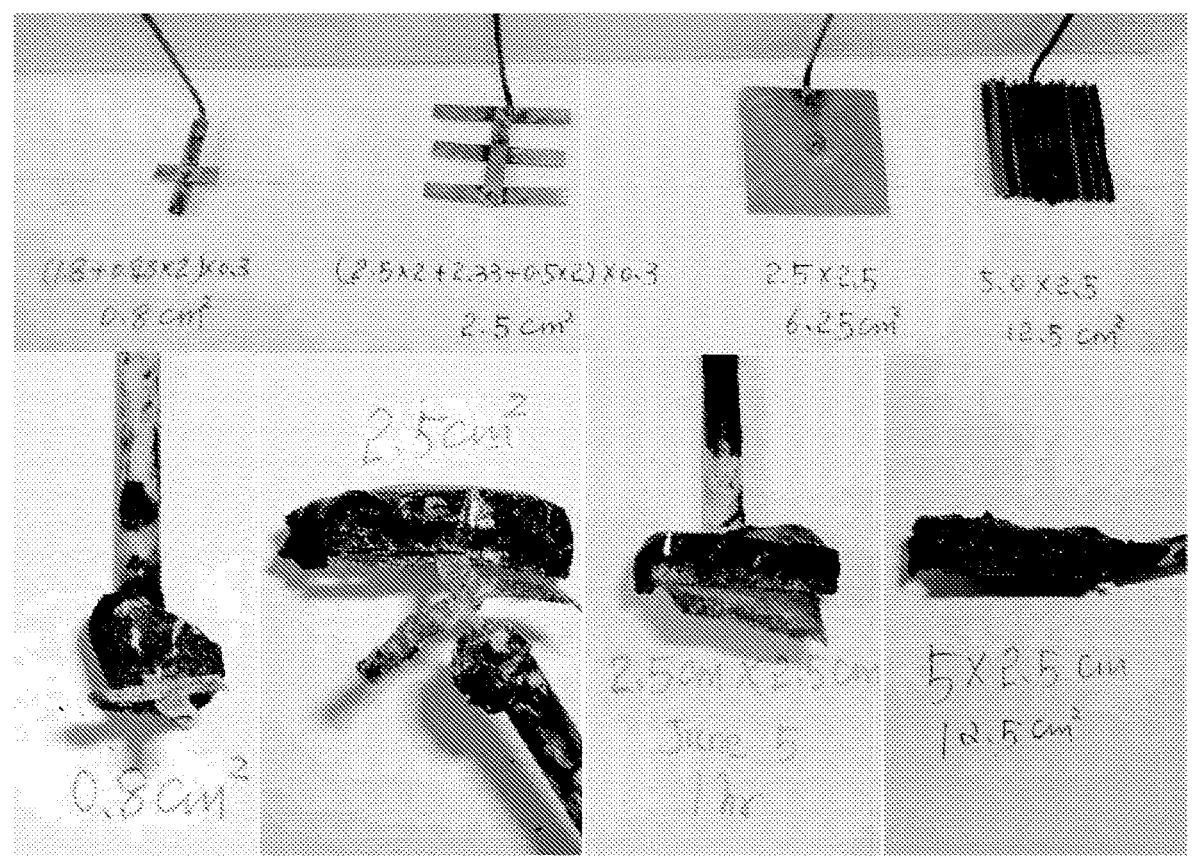
FIG. 24 shows solid steel foil cathodes of differing surface areas prior to electrolysis (top) and following electrolysis in a rechargeable iron molten air battery with partial removal of the cathode product (bottom).

Table 7 summarizes attempts to improve the coulombic efficiency of the planar iron foil cathode by increasing or decreasing its surface area. The electrolysis time, current, theoretical maximum mass of iron, and anode are as detailed in Table 2. The anode was a Ni coil, 16 cm length, 2.0 mm diameter, area 10 cm², and the anode/cathode inter-electrode separation was 1 cm. The cathodes were as described in Table 7. As seen in FIG. 24, two smaller surface area electrodes were compared, as well as a double surface area electrode folded in an accordion configuration to accommodate the double width of the electrode. As summarized in Table 7, while the larger surface area electrode did decrease the average electrolysis potential, the coulombic efficiency was maximum for the simpler planar, solid cathode.

TABLE 7

| | | | | |
|---|---|---|---|---|
| Temperature (° C.) | 800 | 800 | 800 | 800 |
| Average Potential of electrolysis (V) | 1.66 | 1.68 | 1.69 | 1.43 |
| Electrolyte Total Weight (g): Electrolyte weighed from a mix of 200.0015 g $Li_2CO_3$, 47.8888 g $Fe_2O_3$ and 17.9286 g $Li_2O$, | 33.2161 | 33.2093 | 33.2174 | 33.281 |
| $Fe^{3+}$ concentration (mol/kg $Li_2CO_3$) as $Fe_2O_3$ | 3.0 m | 3.0 m | 3.0 m | 3.0 m |
| $Li_2O$ concentration (mol/kg $Li_2CO_3$) | 3.0 m | 3.0 m | 3.0 m | 3.0 m |
| Cathode: Steel shim, 2.5 cm × 2.5 cm | 0.8 cm² | 2.5 cm² | 6.25 cm² | 12.5 cm² |
| $Fe^0$ mass in product (g) | 0.238 | 0.325 | 0.381 | 0.191 |
| Coulombic efficiency (100% × $Fe^0$ weight experiment/theory) | 34.2 | 46.7 | 54.7 | 27.5 |

Figure 25:
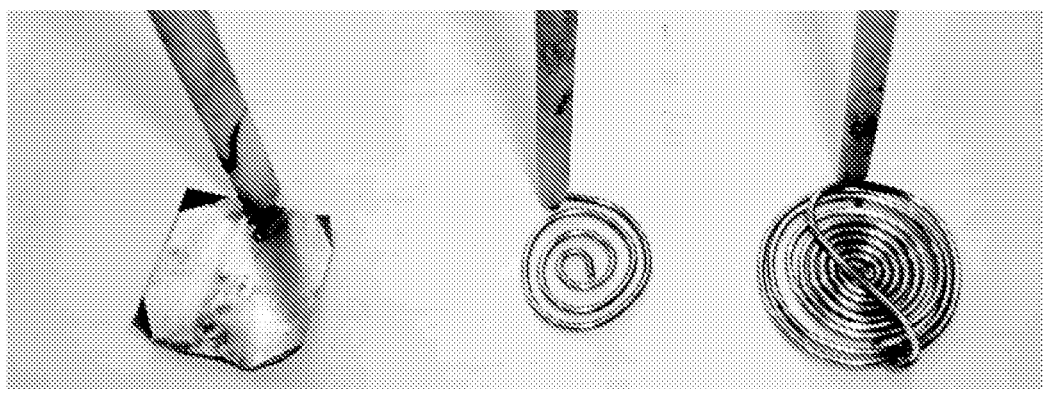
FIG. 25 shows the planar (6.25 $cm^2$) and coiled (5 or 20 $cm^2$) cathode configurations prior to electrolysis in a rechargeable iron molten air battery.

Table 8 summarizes attempts to modify the cathode configuration, which was accomplished by transitioning from a planar, to a coiled, steel cathode. The anode, with an anode/cathode separation of 1.0 cm, is detailed in Table 2. Cathodes are described in Table 8. Each electrolysis was at 1 A for 2 hours. FIG. 25 shows the planar and coiled cathode configurations. Not shown is the similar, intermediate 10 cm² coil, which appears to combine the advantages of a loose coil packing with a relatively high surface. Interpolating between the coulombic efficiencies of the 5 or 10 cm² coiled cathodes, it can be noted that the 6.25 cm² foil cathode exhibits similar efficiencies to the same surface area coiled wire electrode. A common impurity in iron ores is silicate. Another change in this experiment was addition of 10%, by mass of lithium silicate as an initial attempt to simulate the electrolysis of iron ore with silicate. As seen comparing Tables 7 and 7, the silicate marginally diminishes the coulombic efficiency at the planar, foil electrode to 51%. However, the coulombic efficiency at the 10 cm² coiled steel wire cathode is higher at 55%.

TABLE 6

| | | | |
|---|---|---|---|
| Temperature (° C.) | 500 | 750 | 800 |
| Time of electrolysis (h) | 2.5 h | 1 h | 1 h |
| Electrolysis current (A) | 0.4 | 1.0 | 1.0 |
| Average Potential of electrolysis (V) | 3.5 | 1.95 | 1.69 |
| Carbonate Electrolyte | $Li_{0.85}Na_{0.61}K_{0.54}CO_3$ | $Li_{0.85}Na_{0.61}K_{0.54}CO_3$ | $Li_2CO_3$ |
| Carbonate Electrolyte: $Li_2CO_3$ (g) | 30.0026 | 25.0002 | 24.9926 |
| $Fe^{3+}$ concentration (mol/kg $Li_2CO_3$) | 0.8 m | 3.0 m | 3.0 m |
| $Fe_2O_3$ weight (g) | 1.9156 | 5.9861 | 5.9843 |
| $Li_2O$ concentration (mol/kg $Li_2CO_3$) | 0.8 m | 3.0 m | 3.0 m |
| $Li_2O$ weight (g) | 0.7177 | 2.2416 | 2.241 |
| Electrolyte Total Weight (g) | 32.6468 | 33.2349 | 33.2174 |
| $Fe^0$ mass in product (g) | 0.026 | 0.388 | 0.381 |
| Coulomb effic – 100% × $Fe^0$ mass exp/theory | 3.73 | 55.8 | 54.7 |

TABLE 8

| Temperature (° C.) | 800 | 800 | 800 | 800 |
|---|---|---|---|---|
| Average Potential of electrolysis (V) | 1.636 | 1.759 | 1.787 | 1.738 |
| Carbonate Electrolyte: $Li_2CO_3$ (g) | 25.0 | 25.0 | 25.0 | 25.0 |
| $Fe^{3+}$ concentration (mol/kg $Li_2CO_3$) | 3.0 | 3.0 | 3.0 | 3.0 |
| $Fe_2O_3$ weight (g) | 5.9885 | 5.9886 | 5.9880 | 5.9883 |
| $Li_4SiO_4$ (g) (10 wt % $SiO_2$ content in $Fe_2O_3$) | 1.194 | 1.194 | 1.194 | 1.194 |
| Electrolyte Total Weight (g) | 33.9996 | 34.0005 | 34.4254 | 34.0002 |
| Cathode: Area ($cm^2$) | 6.25 | 5.0 | 10.0 | 20.0 |
| Size: length × width or diameter (cm) | 2.5 × 2.5 | 13.3 × 0.12 | 26.5 × 0.12 | 53 × 0.12 |
| Shape: foil or coiled wire | Fe foil | Fe wire | Fe wire | Fe wire |
| Current density ($mA/cm^2$) | 160 | 200 | 100 | 50 |
| $Fe^0$ mass in product (g) | 0.7049 | 0.2994 | 0.7693 | 0.6350 |
| Coulombic efficiency (100% × $Fe^0$ weight experiment/theory) | 51% | 22% | 55% | 46% |

In the absence of silicate, the improvement in coulombic efficiency with the larger surface area coiled, rather than smaller surface area planar, cathode is more evident.

Figure 26:
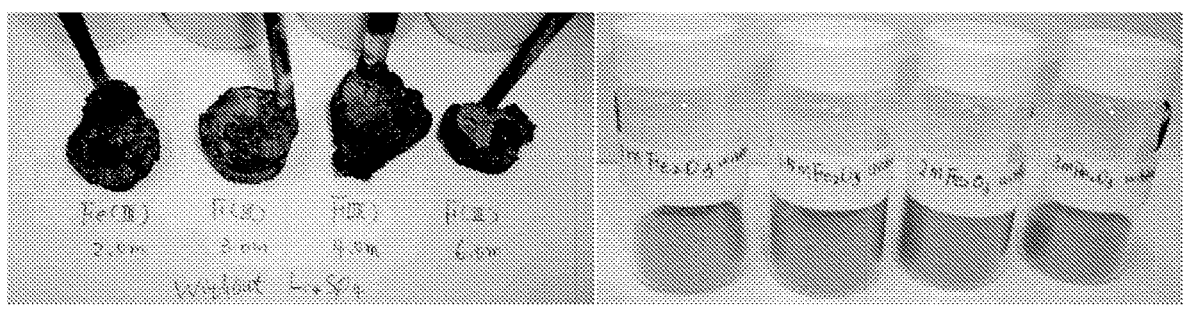
FIG. 26 shows 10 $cm^2$ coiled steel foil cathodes removed after the electrolysis described in Table 9 (left) and the ground cathode product (prior to washing).

Table 9 summarizes the effect of $Fe_2O_3$ concentration on the electrolytic formation of iron. The anode is as detailed in Table 2, with an anode/cathode separation of 1.0 cm. Cathodes are described in the table. Results shown are for electrolyses each using a 10 $cm^2$ coiled cathode, and with either 2, 3, 4 or 6 molal $Fe^{3+}$, and $Li_2O$ in 800° C. molten lithium carbonate. The coulombic efficiency is high and comparable in the 3 and 4 molal electrolytes, with the 3 molal electrolyte) exhibiting a modestly higher efficiency of 70%. In the presence of 10% wt. silicate ($SiO_2$), as seen in Table 10, and continuing with use of the preferred coiled cathode, the coulombic efficiency is somewhat higher in the 3, rather than 2 molal $Fe^{3+}$, and higher when a 1:1 equivalent ratio, rather than a 2:1 equivalent ratio of $Li_2O$ is used. In all cases the presence of the silicate decreases the measured coulombic efficiency. FIG. 26 shows the 10 $cm^2$ coiled steel foil cathodes removed after the electrolysis described in Table 9 (left) and the ground product from the electrodes, prior to washing (right).

TABLE 9

| Temperature (° C.) | 800 | 800 | 800 | 800 |
|---|---|---|---|---|
| Average Potential of electrolysis (V) | 1.6645 | 1.826 | 1.847 | 1.584 |
| Carbonate Electrolyte: $Li_2CO_3$ (g) | 26.9996 | 25.0006 | 23.0006 | 21.0003 |
| $Fe^{3+}$ concentration (mol/kg $Li_2CO_3$) | 2.0 | 3.0 | 4.0 | 6.0 |
| $Fe_2O_3$ weight (g) | 4.3117 | 5.9881 | 7.3460 | 10.0603 |
| $Li_2O$ concentration (mol/kg $Li_2CO_3$) | 2.0 | 3.0 | 4.0 | 6.0 |
| $Li_2O$ weight (g) | 1.6134 | 2.2413 | 2.7485 | 3.7643 |
| Electrolyte Total Weight (g) | 32.9352 | 33.2002 | 33.0226 | 34.8159 |
| Cathode: Fe coil, 26.5 cm length, 1.2 mm diameter, area | 10 $cm^2$ | 10 $cm^2$ | 10 $cm^2$ | 10 $cm^2$ |
| $Fe^0$ mass in product (g) | 0.7229 | 0.9710 | 0.9496 | 0.4111 |
| Coulombic efficiency (100% × $Fe^0$ weight experiment/theory) | 52% | 70% | 68% | 30% |

TABLE 10

| Temperature (° C.) | 800 | 800 | 800 | 800 |
|---|---|---|---|---|
| Average Potential of electrolysis (V) | 1.639 | 1.791 | 1.791 | 1.745 |
| Carbonate Electrolyte: $Li_2CO_3$ (g) | 26.9992 | 24.9994 | 22.9998 | 20.9994 |
| $Fe^{3+}$ concentration (mol/kg $Li_2CO_3$) | 2 | 3 | 2 | 3 |
| $Fe_2O_3$ mass (g) | 4.3115 | 5.9886 | 7.3468 | 10.0603 |
| $Li_2O$ concentration (mol/kg $Li_2CO_3$) | 2 | 3 | 4 | 6 |
| $Li_2O$ weight (g) | 1.6132 | 2.2411 | 2.7485 | 3.7648 |
| $Li_4SiO_4$ (g) (10 wt % $SiO_2$ content in $Fe_2O_3$) | 0.8605 | 1.1942 | 1.4659 | 2.0068 |
| Electrolyte Total Weight (g) | 33.7870 | 34.4254 | 34.5667 | 36.8151 |
| Cathode: Fe coil, 26.5 cm length, 1.2 mm diameter, area | 10 $cm^2$ | 10 $cm^2$ | 10 $cm^2$ | 10 $cm^2$ |
| $Fe^0$ mass in product (g) | 0.6708 | 0.7693 | 0.4784 | 0.5899 |
| Coulombic efficiency (100% × $Fe^0$ weight experiment/theory) | 48% | 55% | 34% | 42% |

Table 11 summarizes the effect of temperature on iron electrolysis (1 A, 2 hour) in a pure lithium carbonate electrolyte (but containing silicate, and 3 molal $Fe^{3+}$ and $Li_2O$). The anode, detailed in Table 2, was separated from the cathode by 1.0 cm. While the electrolysis potential decreases with increasing temperature, the electrolysis efficiency is lowest (23%) at the highest electrolysis temperature (900° C.) and highest (58%) at the lowest electrolysis temperature (750° C.). The lower efficiencies, at higher temperature, may be associated with the greater reactivity and diffusivity of the oxygen produced at the anode, which can back react with iron to form a parasitic iron oxide loss.

TABLE 11

| Temperature (° C.) | 750 | 800 | 900 |
|---|---|---|---|
| Average Potential of electrolysis (V) | 1.801 | 1.788 | 1.522 |
| Carbonate Electrolyte: $Li_2CO_3$ (g) | 25 | 25 | 25 |
| $Fe^{3+}$ concentration (mol/kg $Li_2CO_3$) | 3 | 3 | 3 |
| $Li_2O$ concentration (mol/kg $Li_2CO_3$) | 3 | 3 | 3 |
| $Li_4SiO_4$ (g | 1.194 | 1.194 | 1.194 |
| Electrolyte Total Weight (g) | 33.9999 | 34.4254 | 33.9998 |
| Cathode: Fe coil, 26.5 cm length, 1.2 mm diameter. area | 10 $cm^2$ | 10 $cm^2$ | 10 $cm^2$ |
| $Fe^0$ mass in product (g) | 0.8067 | 0.7693 | 0.3183 |
| Coulombic efficiency (100% × $Fe^0$ weight experiment/theory) | 58% | 55% | 23% |

Table 12 further probes the silicate effect on iron electrolysis (1 A, 2 hour, anode/cathode separation is 1.0 cm). Higher $SiO_2$ contents (ranging from 10 to 30%-added as a percentage of the iron oxide mass to simulate an impurity in the iron ore), tends to decrease the average electrolysis potential, but also decreases the coulombic efficiency of iron production.

TABLE 12

| Temperature (° C.) | 800 | 800 | 800 |
|---|---|---|---|
| Average Potential of electrolysis (V) | 1.794 | 1.812 | 1.672 |
| Carbonate Electrolyte: $Li_2CO_3$ (g) | 24.9994 | 25.0000 | 24.9996 |
| $Fe^{3+}$ concentration (mol/kg $Li_2CO_3$) | 3 | 3.0 | 3.0 |
| $Fe_2O_3$ weight (g) | 5.9886 | 5.9880 | 5.9883 |
| $Li_2O$ concentration (mol/kg $Li_2CO_3$) | 3.0 | 3.0 | 3.0 |
| $Li_2O$ weight (g) | 2.2411 | 2.241 | 2.2410 |
| $Li_4SiO_4$ (g) = $Fe_2O_3$ weight × $SiO_2$ content/60.08 ($SiO_2$) × 119.84 ($Li_4SiO_4$) | 1.1942 | 1.7940 | 3.5883 |
| $SiO_2$ content in $Fe_2O_3$ (wt %) | 10% | 15% | 30% |
| Cathode: Fe coil, 26.5 cm length, 1.2 mm diameter, area | 10 $cm^2$ | 10 $cm^2$ | 10 $cm^2$ |
| $Fe^0$ mass in product (g) | 0.7693 | 0.7282 | 0.5668 |
| Coulombic efficiency (100% × $Fe^0$ weight experiment/theory) | 55% | 52% | 41% |

In the next series of experiments the anode stability was improved by raising the anode, from 3 mm below the electrolyte surface (a configuration used in all prior experiments), up to the surface of electrolyte. Prior to this surface anode configuration, anodes occasionally spontaneously broke during the course of the electrolysis. However the surface anodes appear to be fully stable, that is, there is no case of anode discontinuity occurring with the surface anodes in the next 30 experiments, independent of electrolysis conditions, and the anode always appeared to be unaffected by the electrolysis (no corrosion was evident).

Figure 27:
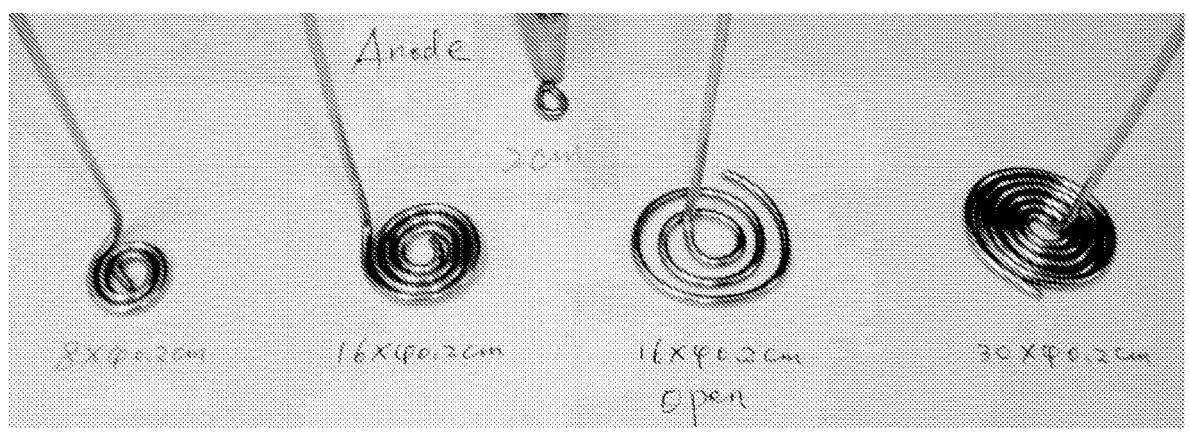
FIG. 27 shows coiled nickel wire anodes removed prior to the electrolysis described in Table 13.

In Table 13, two anode parameters were varied, the surface area, and whether the anode wire was loosely or tightly coiled, as illustrated in the photographs of FIG. 27. The anode was situated at the surface (the interface between the molten electrolyte and the gas above the melt). As seen in Table 13, the electrolysis potential decreases with increasing anode surface area, and its overpotential decreases by 300 mV as the surface area is increased from 1.3 to 19 $cm^2$. With the exception of the largest anode surface cell (which may be an outlier and exhibited an unstable electrolysis potential), the coulombic efficiency increases with increasing anode surface area, and the tightly coiled anode configuration leads to higher efficiency than the loosely coiled anode configuration. Finally, the surface anode in Table 13, while more stable operates at lower coulombic efficiency than its 10 $cm^2$ tightly coiled counterpart in Table 10.

TABLE 13

| Temperature (° C.) | 800 | 800 | 800 | 800 | 800 |
|---|---|---|---|---|---|
| Anode: | | | | | |
| Ni wire, 2.0 mm diameter, length: | 2 cm | 8 cm | 16 cm | 16 cm | 30 cm |
| surface area: | 1.3 $cm^2$ | 5 $cm^2$ | 10 $cm^2$ | 10 $cm^2$ | 18.8 $cm^2$ |
| coil configuration: | tight | tight | tight | loose | tight |
| Cathode: Fe coil, l = 26.5 cm, d = 1.2 mm, area: | 10 $cm^2$ | 10 $cm^2$ | 10 $cm^2$ | 10 $cm^2$ | 10 $cm^2$ |
| Average Potential of electrolysis (V) | 1.96 | 1.91 | 1.89 | 1.83 | 1.66 |
| $Fe^{3+}$ concentration (mol/kg $Li_2CO_3$) as $Fe_2O_3$ | 3.0 m | 3.0 m | 3.0 m | 3.0 m | 3.0 m |
| $Li_2O$ concentration (mol/kg $Li_2CO_3$) | 3.0 m | 3.0 m | 3.0 m | 3.0 m | 3.0 m |
| Electrolyte total mass (g) | 33.2176 | 33.2167 | 33.2172 | 33.2172 | 33.2161 |
| $Li_4SiO_4$ (g) | 0 | 0 | 0 | 0 | 0 |
| $Fe^0$ mass in product (g) | 0.490 | 0.826 | 0.808 | 0.563 | 0.655 |
| Coulombic efficiency (100% × $Fe^0$ mass exp/theory) | 35.2 | 59.3 | 58.0 | 40.4 | 47.0 |

$CO_2$ is disadvantageous to battery charging and discharging. Table 14 shows the effect of the gas above the electrolysis (1 A, 2 hour) on the iron production, when the gas is changed from air, to carbon dioxide, or nitrogen. As can be seen from Table 14, pure $CO_2$ significantly increases the iron charging potential to 1.95 V. A higher battery charging voltage is disadvantageous. Under the same conditions air (containing 21% oxygen and 78% nitrogen) or pure nitrogen lower the charging voltage to 1.71 V and 1.61 V, respectively. As can also be seen from Table 14, nitrogen significantly lowers the electrolysis potential and both nitrogen and carbon dioxide can improve the coulombic efficiency. Pure $CO_2$ will be absorbed in the electrolyte according to the back reaction of the lithium carbonate decomposition/reformation equilibrium. Air contains (0.03%) $CO_2$, and molten situated $Li_2CO_3$ below a blanket of air will be relatively stable, while pure $N_2$, without $CO_2$, will slowly decompose in accord with the equilibrium equation: $Li_2CO_3 \rightarrow CO_2 + Li_2O$. Nitrogen above the electrolysis is seen to decrease the electrolysis potential, and has only a marginal impact on coulombic efficiency. As also summarized in Table 14, additional $Li_2O$ added to the molten lithium carbonate electrolyte (above 3 molal) decreases coulombic efficiency, but sustains the electrolysis at a lower potential.

Iron molten air batteries, each containing a pure molten lithium carbonate electrolyte with a steel shim cathode and a nickel wire anode were discharged at 750° C., when the gas above the electrolyte contains only (i) a 2 to 1 volume flow ratio of pure $CO_2$ to pure $O_2$, (ii) a 1 to 10 ratio of $CO_2$ to $O_2$, or (iii) pure $O_2$. In each case, the gas mixture is flowed above the battery to ensure that a constant gas composition is maintained throughout the example. In case (i), the flow rates of $CO_2$ and $O_2$ are 75 ml/min and 35.5 ml/min, respectively. In case (ii) the flow rates of $CO_2$ and $O_2$ are 10 ml/min and 100 ml/min, respectively. In case (iii), no $CO_2$ is injected and the pure flow rate of $O_2$ is 100 ml/min In case (i), the battery discharge voltages at constant ohmic load are: $V(1000\Omega)=0.93$ V, $V(100\Omega)=0.41$ V, $V(50\Omega)=0.34$ V, $V(20\Omega)=0.26$ V, and $V(10\Omega)=0.18$ V. In case (ii), the battery discharge voltages at constant ohmic load are: $V(1000\Omega)=1.14$ V, $V(100\Omega)=0.54$ V, $V(50\Omega)=0.40$ V, $V(20\Omega)=0.27$ V and $v(10\Omega)$,0.17V. In case (iii) the battery discharge voltages at constant ohmic load are: $V(1000\Omega)=1.16$ V, $V(100\Omega)=1.02$ V, $V(50\Omega)=0.76$ V, $V(20\Omega)=0.43$ V and $V(10\Omega)=0.22$ V. The battery containing the highest $CO_2$ content (case i) has the lowest battery discharging voltage. A lower battery discharging voltage is disadvantageous.

TABLE 14

| Temperature (° C.) | 800 | 800 | 800 | 800 | 800 |
|---|---|---|---|---|---|
| Gas above electrolyte | air | air | $CO_2$ | $N_2$ | air |
| Anode: | | | | | |
| Ni wire, 2.0 mm diameter, length: | 16 cm | 16 cm | 16 cm | 16 cm | 16 cm |
| surface area: | 10 cm$^2$ | 10 cm$^2$ | 10 cm$^2$ | 10 cm$^2$ | 10 cm$^2$ |
| coil configuration: | tight | tight | tight | tight | tight |
| Cathode: Fe coil, l = 26.5 cm, d = 1.2 mm, area: | 10 cm$^2$ | 10 cm$^2$ | 10 cm$^2$ | 10 cm$^2$ | 10 cm$^2$ |
| Average Potential of electrolysis (V) | 1.87 | 1.80 | 1.95 | 1.62 | 1.71 |
| $Fe^{3+}$ concentration (mol/kg $Li_2CO_3$) as $Fe_2O_3$ | 3.0 m | 3.0 m | 3.0 m | 3.0 m | 3.0 m |
| $Li_2O$ concentration (mol/kg $Li_2CO_3$) | 2.0 m | 3.0 m | 3.0 m | 3.0 m | 4.0 m |
| Electrolyte total mass (g) | 32.5140 | 33.2172 | 33.2153 | 33.2131 | 33.9994 |
| $Fe^0$ mass in product (g) | 0.880 | 0.808 | 0.871 | 0.833 | 0.708 |
| Coulombic efficiency (100% × $Fe^0$ mass exp/theory) | 63.17 | 58.0 | 62.5 | 62.8 | 50.8 |

TABLE 15

| Temperature (° C.) | 750 | 750 | 750 | 800 |
|---|---|---|---|---|
| Gas above electrolyte | $N_2$ | $N_2$ | $N_2$ | $N_2$ |
| Anode: Ni wire, d = 2.0 mm, l = 16 cm, coil, area: | 10 cm$^2$ | 10 cm$^2$ | 10 cm$^2$ | 10 cm$^2$ |
| Cathode: Fe coil, 1.2 mm diameter, length: surface area: | 20 cm 7.5 cm$^2$ | 26.5 cm 10 cm$^2$ | 33 cm 12.5 cm$^2$ | 26.5 cm 10 cm$^2$ |
| Average Potential of electrolysis (V) | 1.90 | 2.1 | 2.0 | 1.62 |
| Coulombic efficiency (100% × $Fe^0$ mass exp/theory) | 75.4 | 86.7 | 84.7 | 62.8 |

TABLE 16

| Temperature (° C.) | 750 | 750 | 750 | 750 |
|---|---|---|---|---|
| Gas above electrolyte | $N_2$ | $N_2$ | $N_2$ | $N_2$ |
| Anode: Ni wire, d = 2.0 mm, l = 16 cm, coil, area: | 10 cm$^2$ | 10 cm$^2$ | 10 cm$^2$ | 10 cm$^2$ |
| Cathode: Fe coil, l = 26.5 cm, d = 1.2 mm, area: | 10 cm$^2$ | 10 cm$^2$ | 10 cm$^2$ | 10 cm$^2$ |
| Time of electrolysis (h) at 1.0 amp | 1 h | 2 h | 3 h | 4 h |
| Coulombic efficiency (100% × $Fe^0$ mass exp/theory) | 79.6 | 86.7 | 69.6 | 57.4 |

Figure 28:
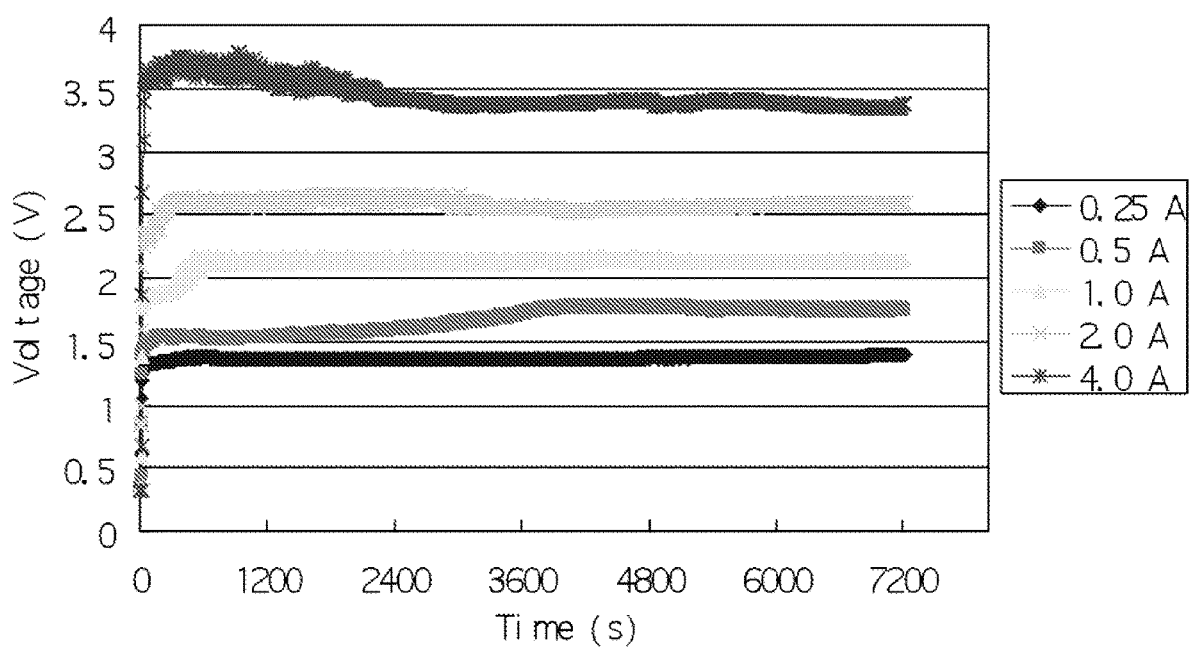
FIG. 28 shows the variation of electrolysis potential with electrolysis current in a rechargeable iron molten air battery.
Figure 29:
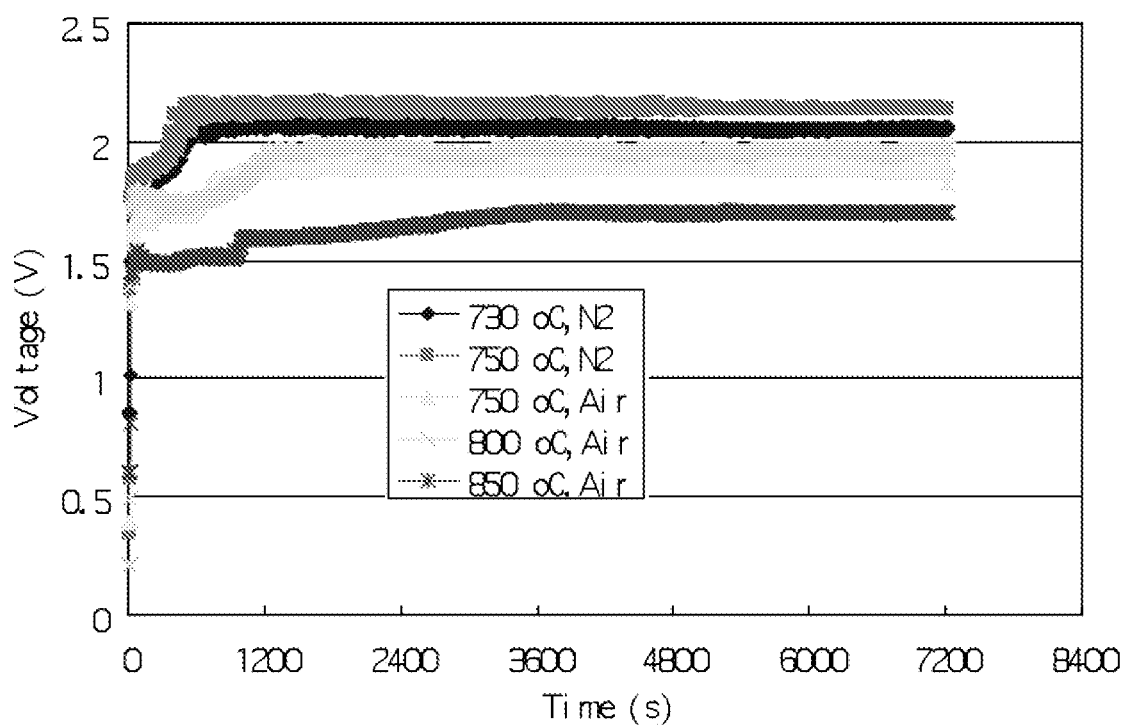
FIG. 29 shows the variation of electrolysis potential at 1.0 A with electrolysis temperature in a rechargeable iron molten air battery.

As can be seen from Table 17, current density substantially effects the electrolysis with a maximum coulombic efficiency of 93% observed at 0.5 A, and as seen in FIG. 28 (top trace=4.0 A, $2^{nd}$ trace=2.0 m A, $3^{rd}$ trace=1.0 A, $4^{th}$ trace=0.5 A, bottom trace=0.25 A), a substantial decrease of the electrolysis potential at lower currents; a lowering of 2 volts between the electrolyses at 4.0 A compared to 0.25 A. A further increase in coulombic efficiency of the electrolytic formation of iron at 1 A occurs at even lower temperature (730° C.) as shown in Table 18 (1 A, 2 hour electrolysis using a lithium carbonate electrolyte and coiled horizontal nickel anode and coiled horizontal iron cathode. This temperature (730° C.) approaches the 723° C. melting point of pure $Li_2CO_3$. While the efficiency falls rapidly at high temperature, the electrolysis potential is lower as seen in FIG. 29 (top trace=750° C., $2^{nd}$ trace=730° C., $3^{rd}$ trace=800° C., $4^{th}$ trace=750° C., bottom trace=850° C.). Electrolyte decomposition (from lithium carbonate to lithium oxide and carbon dioxide) occurs more rapidly at higher temperature. There is little decomposition at 750° C., and the decomposition which occurred at higher temperatures may be controlled or eliminated by increasing the lithium oxide concentration within the electrolyte, or increasing the concentration of carbon dioxide in the atmosphere above the electrolysis. Hence, flowing air (0.03%

Lowering the electrolysis temperature and decreasing the cathode current density can improve coulombic efficiency. As seen in Table 15, (for a 1 A, 2 hour electrolytic formation of iron with coiled iron cathodes and an electrolyte of 3.0 m in $Fe^{3+}$ and $Li_2O$) the columbic efficiency is increased by over 20%, that is to ~85%, by simultaneously decreasing the electrolysis temperature from 800° C. to 750° C., and/or by increasing the cathode surface area. This is not observed when the temperature is held constant and the cathode surface area is decreased to 7.5 cm$^2$.

Tables 15-21 are presented in an abbreviated format. In each case, the electrolyte total mass is ~33 g. In each case the electrolyte is 3.0 m in $Fe^{3+}$ and $Li_2O$ without silicates. The coulombic efficiency also depends on when the electrode is removed from the electrolysis chamber (electrolysis time, Table 16) and the electrolysis current (Table 17). As seen in Table 16, removing the electrode after 1 hour negatively impacts the efficiency, although this effect presumably may be mitigated if iron oxide is fed into the electrolysis chamber as iron is produced.

$CO_2$), rather than nitrogen (0% $CO_2$), above the electrolysis will decrease the rate of electrolyte loss at higher temperature, even though as seen in Table 18, this nitrogen may marginally improve the coulombic efficiency compared to the electrolysis in air.

TABLE 17

| Temperature (° C.) | 750 | 750 | 750 | 750 | 750 |
|---|---|---|---|---|---|
| Gas above electrolyte | $N_2$ | $N_2$ | $N_2$ | $N_2$ | $N_2$ |
| Anode: Ni wire, d = 2.0 mm, l = 16 cm, coil, area: | 10 cm² | 10 cm² | 10 cm² | 10 cm² | 10 cm² |
| Cathode: Fe coil, l = 26.5 cm, d = 1.2 mm, area: | 10 cm² | 10 cm² | 10 cm² | 10 cm² | 10 cm² |

TABLE 17-continued

| Electrolysis current (A) during a 2 hour electrolysis | 0.25 | 0.5 | 1.0 | 2.0 | 4.0 |
|---|---|---|---|---|---|
| Coulombic efficiency (100% × Fe⁰ mass exp/theory) | 53.7 | 93.1 | 86.7 | 50.3 | 25.6 |

TABLE 18

| Temperature (° C.) | 730 | 750 | 750 | 800 | 850 |
|---|---|---|---|---|---|
| Gas above electrolyte | $N_2$ | $N_2$ | air | air | air |
| Anode: Ni wire, d = 2.0 mm, l = 16 cm, coil, area: | 10 cm² | 10 cm² | 10 cm² | 10 cm² | 10 cm² |
| Cathode: Fe coil, l = 26.5 cm, d = 1.2 mm, area: | 10 cm² | 10 cm² | 10 cm² | 10 cm² | 10 cm² |
| Coulombic efficiency (100% × Fe⁰ mass exp/theory) | 89.9 | 86.7 | 84.7 | 58.0 | 34.5 |

Table 19 shows the effect of the cathode location on the electrolytic formation of iron in molten 730° C. lithium carbonate, and includes even higher coulombic efficiency iron electrolysis configurations. The first column contains the same anode on the surface separated by 1 cm from a cathode near the bottom of the cell. As seen in the second column, the use of a smaller (half) diameter nickel or iron wire for the anode and cathode decreases, rather than increases, the coulombic efficiency. As can be seen from Table 19, at the lower temperature of 730° C. in molten lithium carbonate, an opposite, inverted electrode configuration (i.e., cathode above the anode) is not only functional, but can exhibit both improved coulombic efficiency and lower electrolysis potential. The coulombic efficiency of these inverted cells is at least 94 to 95% (and this may be considered a lower limit if any iron metal drops into the electrolyte during the cathode removal).

Figure 30:
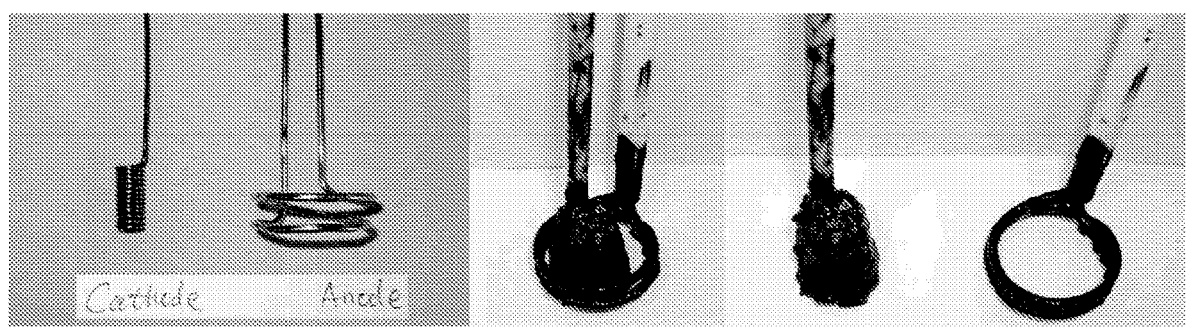
FIG. 30 shows vertical cylindrical configured electrodes (cathode inside anode) used in a rechargeable iron molten air battery: left: prior to electrolysis; middle: after electrolysis: right after separation of the cathode form the anode.
Figure 31:
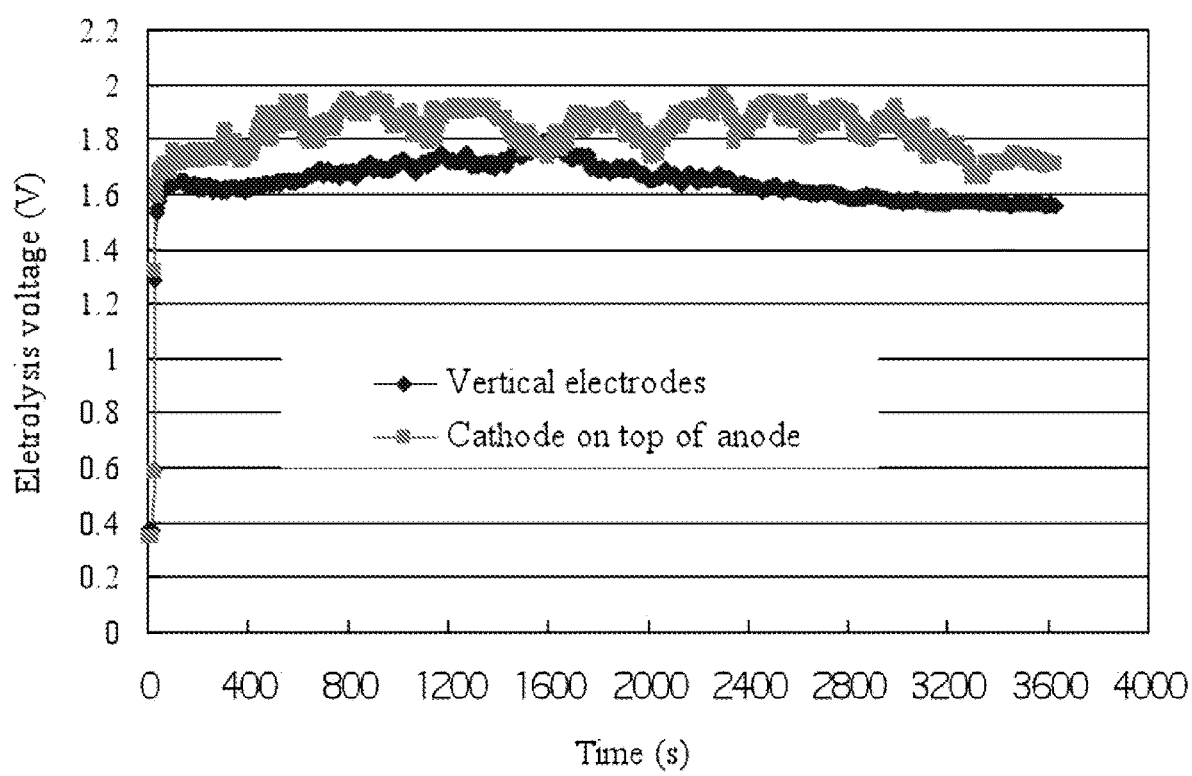
FIG. 31 shows the variation of electrolysis potential using vertical or inverted anode/cathode configurations in a rechargeable iron molten air battery (730° C., lithium carbonate electrolyte).

Photos of a vertical cathode inside the anode configuration are presented in FIG. 30. The potential during electrolysis of these inverted electrode configurations is presented in FIG. 31 (top trace=cathode on top of anode, bottom trace=vertical electrodes). The random oscillations during the cathode on top configuration may be related to a temporary partial blockage of the cathode as anode gas evolved below, passes through this upper electrode. The electrolyte is 3.0 m in $Fe^{3+}$ and $Li_2O$.

TABLE 19

| Temperature (° C.) | 730 | 730 | 730 | 730 |
|---|---|---|---|---|
| Gas above electrolyte | $N_2$ | $N_2$ | $N_2$ | air |
| Time of electrolysis (h) at 1.0 A | 2 h | 2 h | 1 h | 1 h |
| Cathode, tight coiled steel wire: Area (cm²) | 10 cm² | 10 cm² | 10 cm² | 10 cm² |
| Size: Length × diameter (cm) | 26.5 × 0.12 | 53 × 0.06 | 26.5 × 0.12 | 26.5 × 0.12 |
| Coil shape: horizontal (plate) or vertical (cylinder) | plate | plate | plate | vertical |
| Cathode above, below, or inside the anode | below | below | above | inside |
| Anode: Ni coiled wire: Area (cm²) | 10 cm² | 10 cm² | 10 cm² | 10 cm² |
| Size: wire length × diameter (cm), prior to coiling | 16 × 0.20 | 32 × 0.10 | 16 × 0.20 | 16 × 0.20 |
| Coil shape: horizontal (plate) or vertical (cylinder) | plate | plate | plate | cylinder |
| Anode above, below, or outside the cathode | above | above | below | outside |
| Average Potential of electrolysis (V) | 1.87 | 1.80 | 1.62 | 1.95 |
| Coulombic efficiency (100% × Fe⁰ mass exp/theory) | 89.9 | 71.8 | 94.4 | 94.8 |

Figure 32:
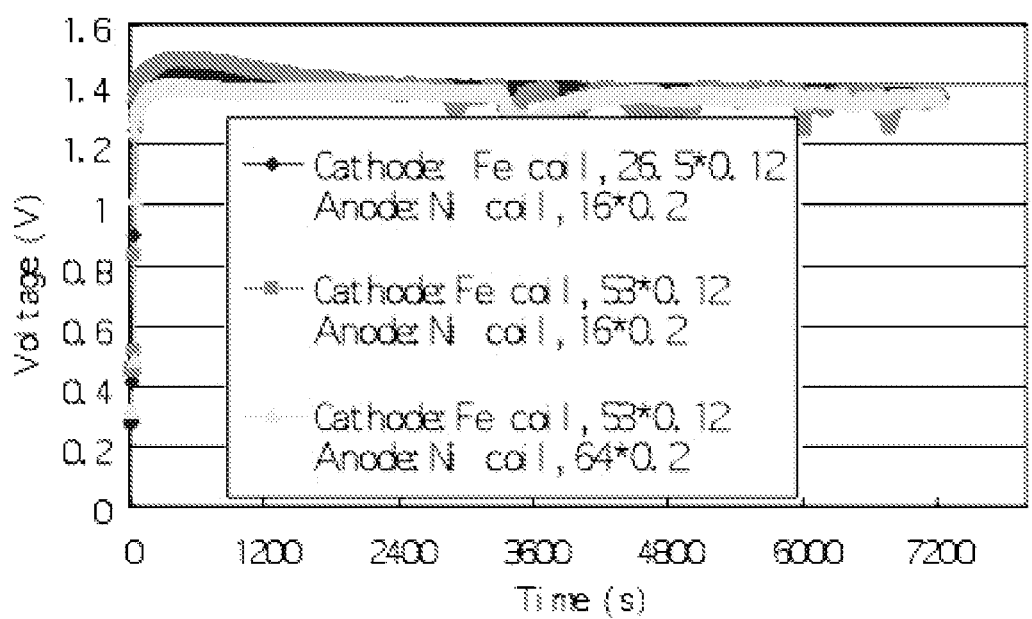
FIG. 32 shows the variation of electrolysis potential (using a vertical inner coiled cathode configuration) with different electrode surface areas in a rechargeable iron molten air battery (730° C., lithium carbonate electrolyte).
Figure 33:
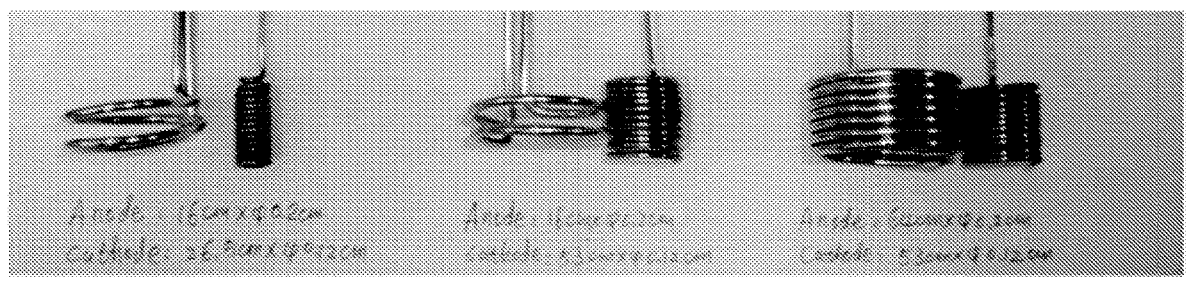
FIG. 33 shows various vertically cylindrical configured coiled electrodes (with surface area varied by changing the length and coil diameter of the nickel outer anode or steel inner cathode) used in a rechargeable iron molten air battery

The iron electrode electrolysis data presented in Table 20 (vertical anode situated outside the cathode configuration in molten 730° C. $Li_2CO_3$ containing 3.0 m $Fe^{3+}$ and $Li_2O$) and Table 21 (vertical anode inside cathode configuration in molten 730° C. $Li_2CO_3$ with 3.0 m $Fe^{3+}$ and $Li_2O$) are each at 730° C. for 2 hours, but are conducted at 0.5 A, rather than 1.0 A, to probe a path to lower electrolysis potentials, while preserving, or further increasing the high coulombic efficiencies of iron production. Photographs of these electrodes with various surface areas of the inner, vertical cathode and outer anode coiled electrodes are shown in FIG. 33. As seen compared to FIGS. 31 and 32, the lower current substantially decreases the electrolysis potential, and as seen in Table 20, retains over 90% the coulombic efficiency. For the same 0.5 A current, a substantially larger surface area electrodes (20 cm² cathodes and 40 cm² anodes, providing lower current density conditions), lowers the electrolysis potential to less than 1.4 V as seen in FIG. 32 but also decreases the coulombic efficiency in the last column of Table 20.

Figure 34:
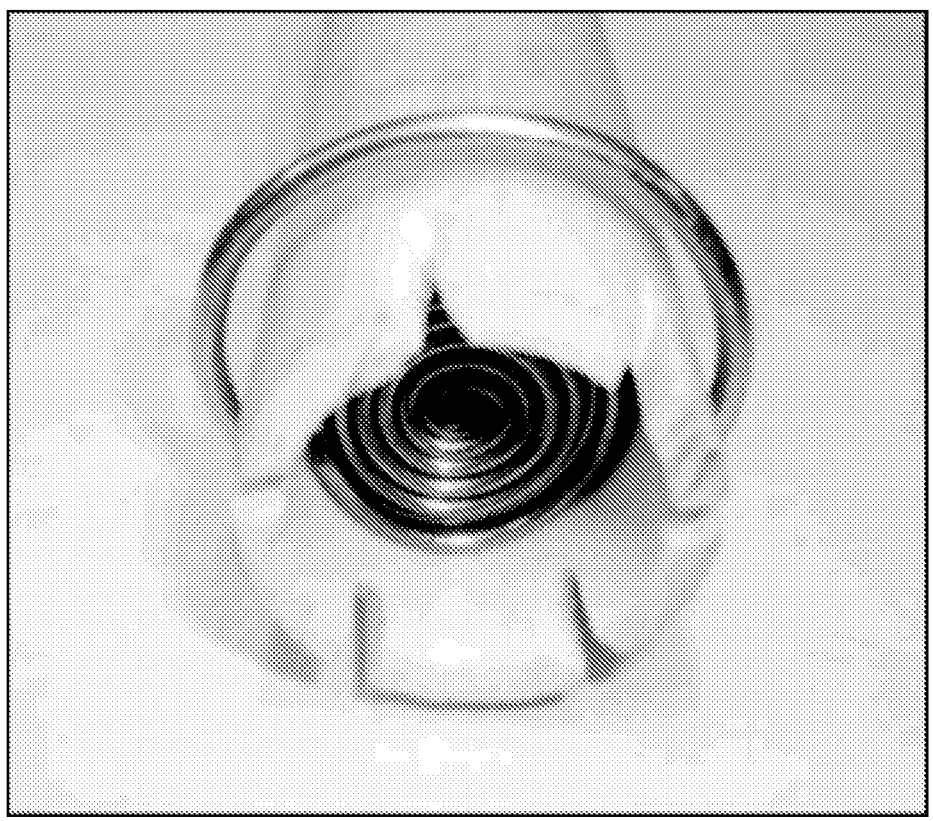
FIG. 34 shows the configuration of an outer nickel anode shielded by an alumina tube from an inner coiled steel wire cathode used in a rechargeable iron molten air battery.
Figure 35:
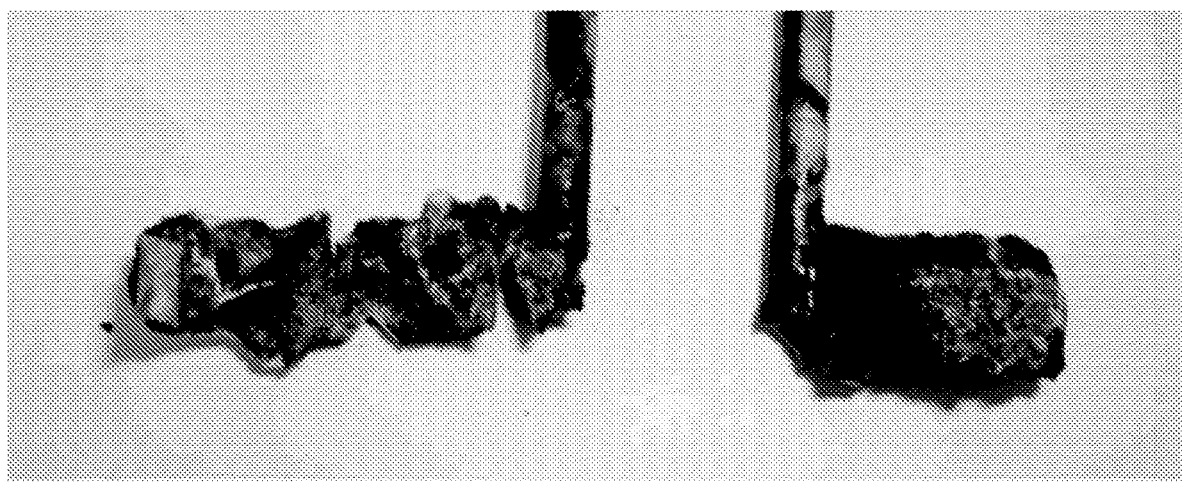
FIG. 35 shows the iron product at the uncoiled shim and still coiled wire cathodes after removal from the electrolyte described in the last two columns of Table 20.

In an attempt to further prevent any parasitic reaction of the anode and cathode products, the next configuration places an alumina tube between the outer (anode) and inner vertical, coiled electrodes. This configuration is shown in FIG. 34, and although the average electrolysis potential is high at 1.98 V, as seen in the second column of Table 21, the efficiency does improve. A return to the horizontal, coiled anode (above the cathode and with an alumina separator) retains very high coulombic efficiencies but creates high electrolysis potential. Compared to an average of 1.4 V electrolysis in the FIG. 33 series of experiments, the next two electrolyses occur at an average higher electrolysis potential of 1.81 V and 1.78 V respectively. In each case a 10 cm² cathode having a horizontal configuration is located below the coiled horizontal anode. The first utilizes a coiled steel wire and the second a coiled shim (4.8×0.65 cm foil) steel cathode. Reflecting the high columbic efficiencies summarized in the last two columns of Table 19, the high iron content of the product is evident, in FIG. 35 both at the (uncoiled) shim cathode and still coiled wire cathode.

TABLE 20

| Temperature (° C.) | 730 | 730 | 730 |
|---|---|---|---|
| Gas above electrolyte | air | $N_2$ | $N_2$ |
| Current & time of electrolysis | 1.0 A, 1 h | 0.5 A, 2 h | 0.5 A, 2 h |
| Cathode, tight coiled steel wire: Area ($cm^2$) | 10 $cm^2$ | 10 $cm^2$ | 20 $cm^2$ |

TABLE 20-continued

| Size: Length × or diameter (cm) | 26.5 × 0.12 | 26.5 × 0.12 | 53.5 × 0.12 |
|---|---|---|---|
| Coil shape: vertical (cylinder), inside the anode | | | |
| Anode: Ni coiled wire: Area ($cm^2$) | 10 $cm^2$ | 10 $cm^2$ | 40 $cm^2$ |
| Size: wire length × diameter (cm), prior to coiling | 16 × 0.20 | 16 × 0.20 | 64 × 0.20 |
| Coil shape: vertical (cylinder), outside the cathode | | | |
| Coulombic efficiency (100% × $Fe^0$ mass exp/theory) | 94.8 | 91.2 | 72.8 |

TABLE 21

| Temperature (° C.) | 730 | 730 | 730 | 730 |
|---|---|---|---|---|
| Gas above electrolyte | $N_2$ | $N_2$ | $N_2$ | $N_2$ |
| Current & time of electrolysis | 0.5 A, 2 h | 0.5 A, 2 h | 0.5 A, 2 h | 0.5 A, 2 h |
| Cathode, tight coiled steel wire: Area ($cm^2$) | 10 $cm^2$ | 7.5 $cm^2$ | 6.25 $cm^2$ | 10 $cm^2$ |
| Wire or shim (foil) | wire | wire in tube (FIG. S-18) | shim | wire |
| Size: Length × wire diameter or shim height (cm) | 26.5 × 0.12 | 20 × 0.12 | 4.8 × 0.65 | 26.5 × 0.12 |
| Coil shape: horizontal (plate) or vertical (cylinder) | vertical | vertical | vertical | vertical coil id × h: 1.3 × 0.65 |
| Wire Cathode above, below, or inside the anode | inside | below | below | below |
| Anode: Ni coiled wire: Area ($cm^2$) | 10 $cm^2$ | 5.7 $cm^2$ | 10 $cm^2$ | 10 $cm^2$ |
| Size: Length × diameter (cm) | 16 × 0.20 | 9 × 0.20 | 32 × 0.10 | 32 × 0.10 |
| Coil shape: horizontal (plate) or vertical (cylinder) | cylinder | coil | horizontal | horizontal |
| Anode above, below, or outside the cathode | outside | outside | above | above |
| Coulombic effic. (100% × $Fe^0$ mass exp/theory) | 91.2 | 96.3 | 98.0 | 98.6 |

Figure 36:
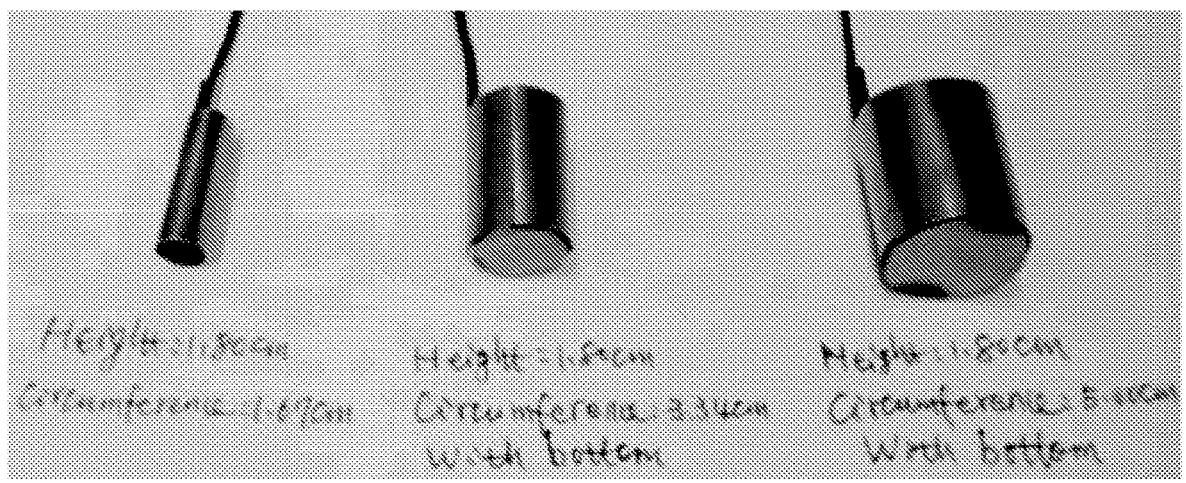
FIG. 36 shows the vertical steel shim electrodes places inside the anode used in the iron electrolysis described in Table 22.
Figure 37:
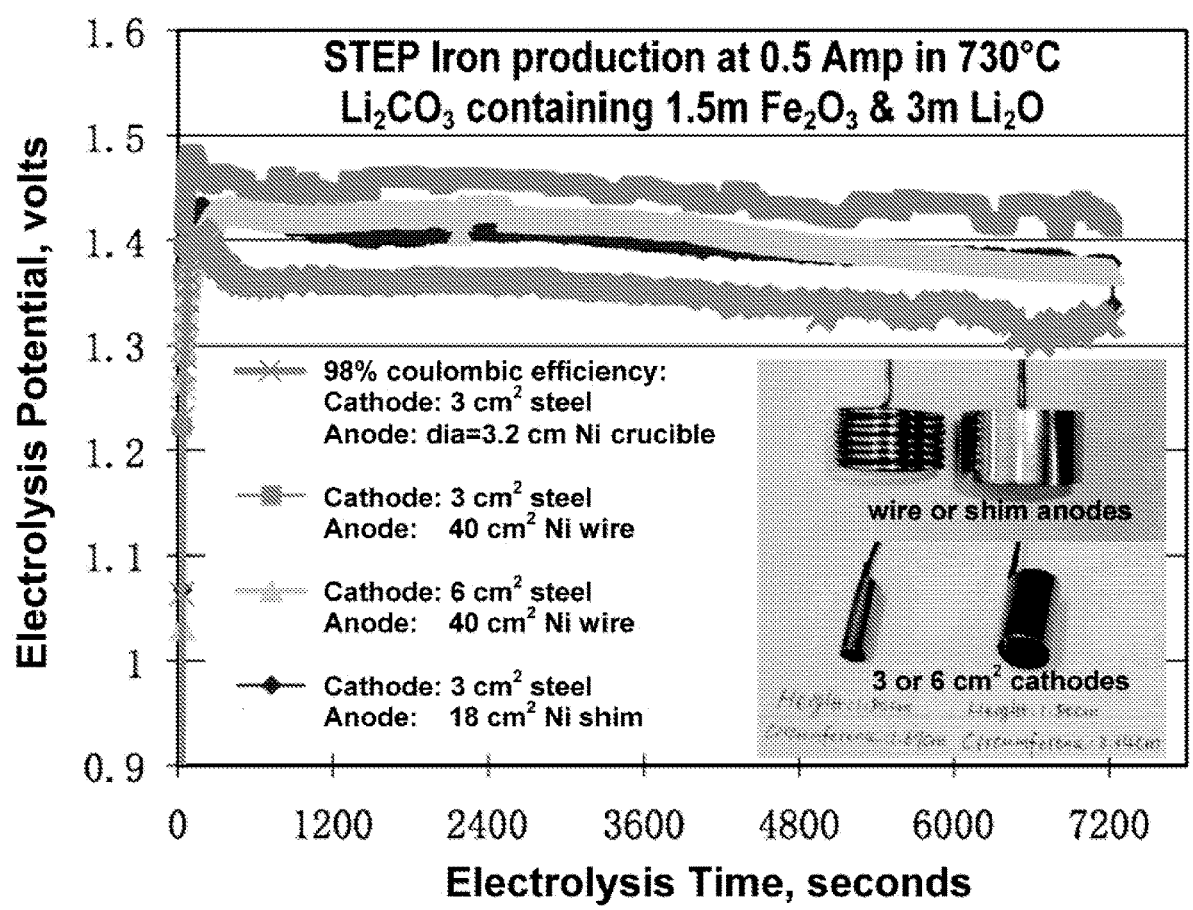
FIG. 37 shows the variation of the electrolysis potential for the electrolytic production of iron. Photos: anodes (top) and cathodes (bottom).

Further increases in coulombic efficiency and decrease in the energy needed to drive the iron electrolysis may be achieved with relatively small changes to the cathode. As seen in Table 22, replacement of the vertical inner coiled wire cathode with a similar shaped, steel shim (foil) cathode increases the coulombic efficiency. Furthermore, an increase in anode surface area (40 $cm^2$, compared to the 10 $cm^2$ in the first column of Table 21), decreases the electrolysis potential to 1.4 V. Further increases in the cathode diameter of these shim electrodes, with or without a "bottom" on the cathode (as pictured in FIG. 36), decrease the electrolysis potential to less than 1.4 V (FIG. 37), but results in a decrease in the coulombic efficiency (Table 22). The time variation of the electrolysis potential for the high columbic efficiency is shown in FIG. 37 and compared to similar configurations for the production of iron at 730° C. in lithium carbonate containing 1.5 m in $Fe_2O_3$ and $Li_2O$.

TABLE 22

| Temperature (° C.) | 730 | 730 | 730 | 730 | 730 |
|---|---|---|---|---|---|
| Gas above electrolyte | $N_2$ | $N_2$ | $N_2$ | $N_2$ | $N_2$ |
| Current & time of electrolysis | 0.5 A, 2 h | 0.5 A, 2 h | 0.5 A, 2 h | 0.5 A, 2 h | 0.5 A, 2 h |
| cathode (inside), vertical cylinder, area ($cm^2$) | 10 $cm^2$ | 3 $cm^2$ | 6 $cm^2$ | 9 $cm^2$ | 3 $cm^2$ |
| coiled steel wire or shim (foil) | wire | shim | shim | shim | shim |
| Length × wire diameter or shim height (cm) | 26.5 × 0.12 | 1.67 × 1.80 | 3.34 × 1.80 | 5 × 1.80 | 1.67 × 1.80 |

TABLE 22-continued

| open or with solid bottom | open | open | bottom | bottom | bottom |
|---|---|---|---|---|---|
| anode: Ni vertical wire coil or Ni crucible | 10 cm² coil | 40 cm² coil | 40 cm² coil | 40 cm² coil | crucible |
| Ni wire prior to coiling: length × diam (cm) | 16 × 0.20 | 64 × 0.20 | 64 × 0.20 | 64 × 0.20 | — |
| coil or crucible diameter: | 4.0 cm | 4.0 cm | 4.0 cm | 4.0 cm | 3.2 cm |
| Coulomb. effic. (100% × Fe⁰ mass exp/theory) | 91.2 | 100.0 | 97.5 | 47.6 | 98.2 |

Figure 38:
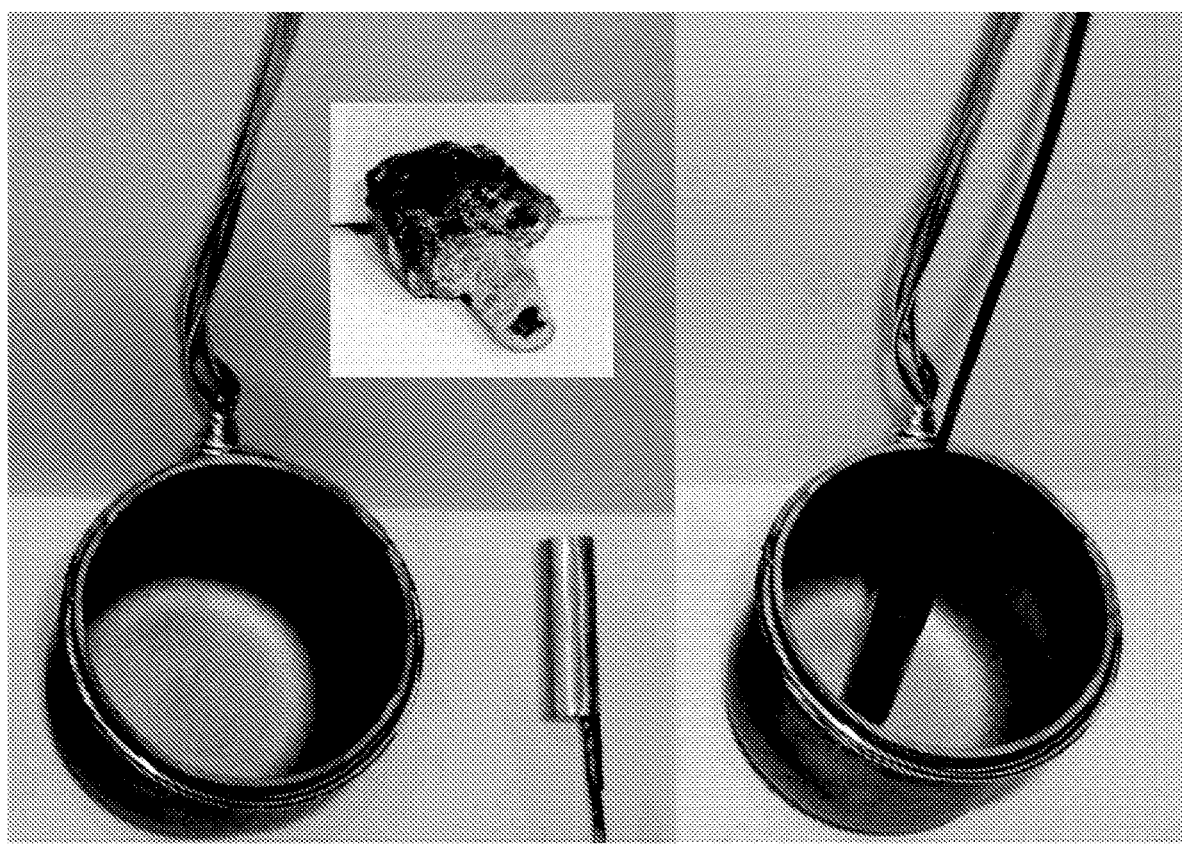
FIG. 38 shows the configuration of the iron electrolyte cell used in the electrolysis described in Table 22. Also shown is a depiction of the cathode after the electrolysis.

The electrolysis configuration is simplified when the electrolysis is conducted in a nickel crucible which comprises both the anode and the cell body in one piece, and can further decrease the electrolysis potential. This configuration of the iron electrolyte cell is presented in FIG. 38. A vertical steel cylinder cathode was placed inside the crucible for the electrolysis described in Table 22. Included in FIG. 38 (inset, top left) are the electrodes (cathode top left, anode top right, with the product attached and including some solidified electrolyte. The iron electrolysis product is easy to remove and readily detaches from the cathode. As shown in FIG. 37, the electrolysis potential is 1.35 V.

Alternative Carbonate Electrolytes

A more cost effective solution to the corrosivity of the sodium/potassium carbonate melt (other than the use of iridium which is stable as an air electrode during 5 hours of electrolysis in 750° C. $Na_{0.23}K_{0.77}CO_3$, as compared to nickel air electrodes which corrode) may be found by the addition of calcium carbonate or barium salts to the sodium/potassium, lithium-free, carbonate melt. The addition of calcium carbonate can decrease the melting point of a carbonate mix. The sodium/lithium carbonate mix $Li_{1.07}Na_{0.93}CO_3$, has a melting point of 499° C., but decreases to below 450° C. if 2 to 10 mol % equimolar $CaCO_3$ and $BaCO_3$ is added.

Figure 39:
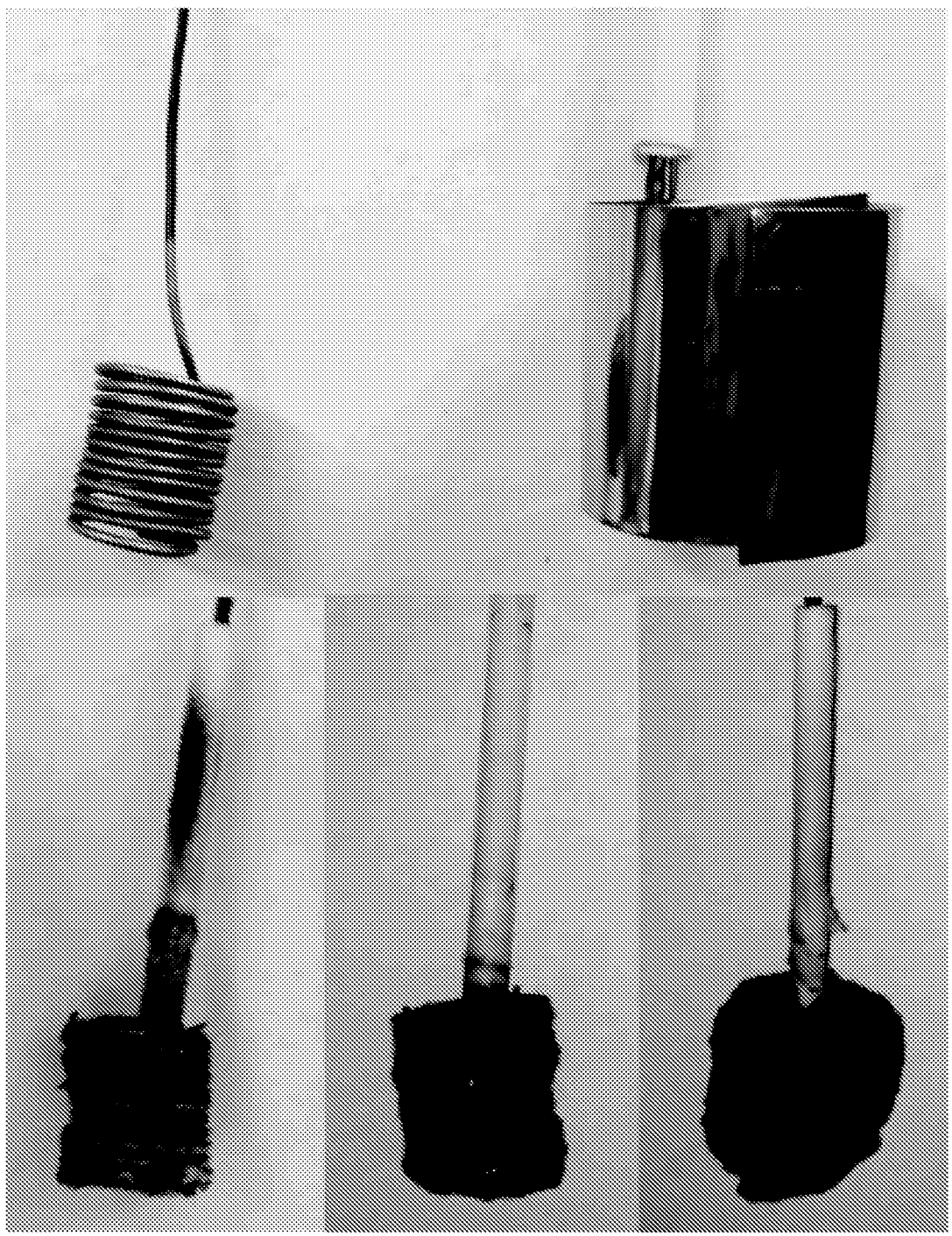
FIG. 39 shows electrodes before and after electrolysis (0.5 A, 5 hour, 750° C.) in various lithium free electrolytes containing differing concentrations of calcium carbonate: prior to electrolysis (cathode top left, anode top right): following electrolysis ($Na_{1.23}K_{0.77}CO_3$ electrolyte (lower left) $Ca_{0.16}Na_{1.03}K_{0.65}CO_3$ electrolyte (lower middle) and $Ca_{0.27}Na_{0.70}K_{0.75}CO_3$ electrolyte (lower right)).
Figure 40:
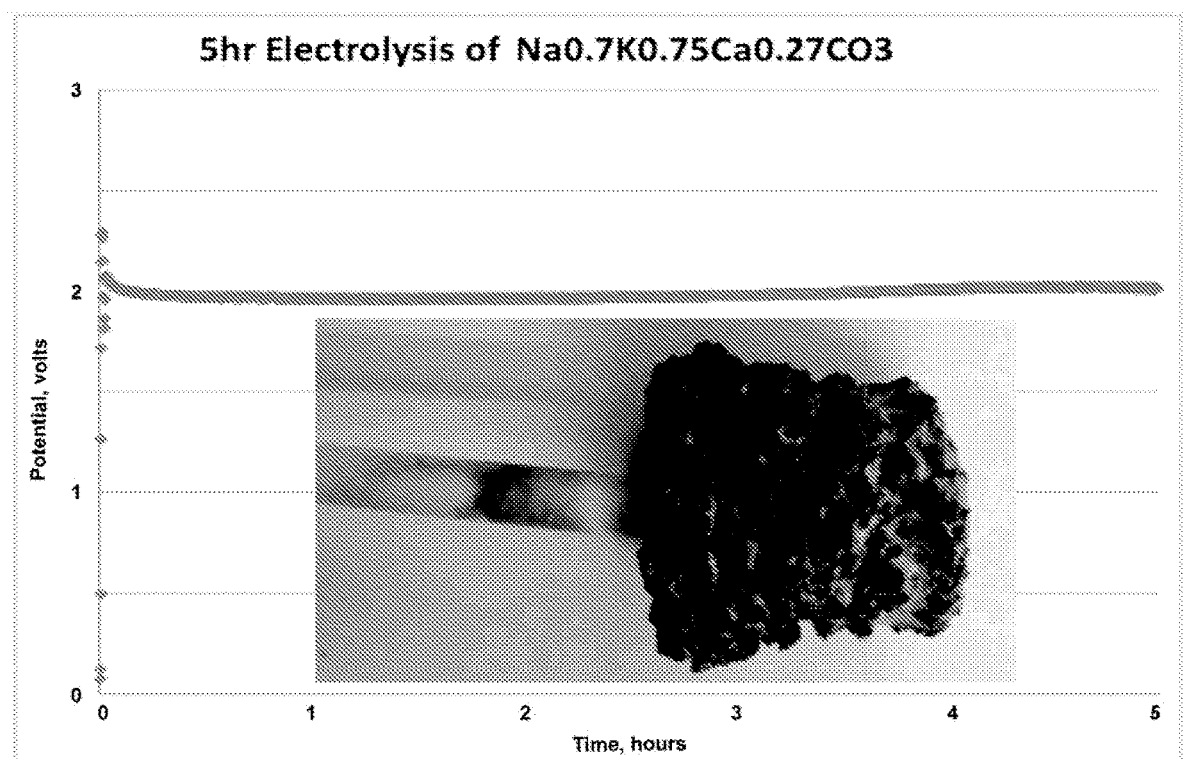
FIG. 40 shows the electrolysis potential and subsequent cathode product ($Ca_{0.27}Na_{0.70}K_{0.75}CO_3$ electrolyte, constant electrolysis current of 1 A utilizing a 21 $cm^2$ (55 cm coiled steel wire) cathode).

In addition to the sodium-potassium carbonate electrolytes, electrolyses were also conducted in calcium/sodium/potassium electrolytes ranging up to a calcium fraction of $Ca_{0.27}Na_{0.70}K_{0.75}$. Electrodes used are shown in FIG. 39. A nickel oxygen anode appears to be fully stable during extended (five hour) 0.5 A electrolyses at 750° C. in this melt, using a 30 cm² nickel foil anode and a 7.0 cm² steel wire cathode, and the electrolysis proceeds at between 1.9 to 2.2 V. Unlike the electrolyses conducted in the calcium free (sodium/potassium) carbonate melt, carbon forms and remains on the cathode during electrolysis, and the steel cathode remains the same diameter, as measured subsequent to the electrolysis. As shown subsequent to the electrolyses, in the cathode photographs at the bottom of FIG. 39, electrolyses conducted in either $Ca_{0.16}Na_{1.03}K_{0.65}CO_3$ or $Ca_{0.27}Na_{0.7}K_{0.75}CO_3$ electrolytes exhibit a thick carbon product on the cathode, while this is not the case following electrolysis without calcium carbonate in $Na_{1.23}K_{0.77}CO_3$. The electrolysis potential and subsequent cathode product, during a repeat of the $Ca_{0.27}Na_{0.7}K_{0.75}CO_3$ electrolysis, but at a constant electrolysis current of 1 A, rather than 0.5 A, and utilizing a 21 cm² (55 cm coiled steel wire) cathode is shown in FIG. 40.

Materials and Methods

Lithium carbonate ($Li_2CO_3$, Alfa Aesar, 99%), ferric oxide ($Fe_2O_3$, 99.4%, JT Baker), $Li_2O$ (Alfa, 99.5%), 1 mm and 2 mm Ni wire (Alfa, 99.5%), Ni foil (McMaster, pure Ni 200 shim), iron wire (Anchor, dark annealed), steel foil (McMaster, 75 μm 316 steel), crucibles: nickel (VWR AA35906-KY), high purity alumina (AdValue Technology AL-2100), silicon dioxide ($SiO_2$, Spectrum, 325 mesh), lithium orthosilicate ($Li_4SiO_4$, Alfa Aeasar, 99.9%, Pflatz & Bauer, 99%), boron oxide ($B_2O_3$, 99.98%, Alfa Aesar 89964), vanadium (V) oxide ($V_2O_5$, 99.6%, Alfa Aesar 89964), lithium vanadium oxide ($LiVO_3$, 99.9%, Alfa Aesar 39358) and anhydrous lithium metaborate ($LiBO_2$, 99.9%, Alfa Aesar 12591).

Electrolyses

Electrolysis conditions and the systematic variation of the electrolysis cell components are described in Example 4. The theoretical maximum mass of iron that can be produced from the ferric salt during the electrolysis is calculated as electrolysis current (A)×electrolysis time (s)×atomic weight Fe/(3 e⁻×96,485 As).

Analysis

Iron metal is produced by electrolysis in molten carbonate at the cathode. The cathode product was analyzed for iron metal content based on, and improved from the method of Xu et al. (*J. Min. Mat. Characterization & Eng.*, 2, 65, 2003) in which iron metal replaces copper sulfate, and the ferrous sulfate product is analyzed. The procedure was further modified by (i) washing the electrolysis product with deionized water, and (ii) replacement of the previous UV/Vis evaluation, which was used at the end of the procedure, with a more quantitative (less prone to colorimetric interference) titration by dichromate. The initial rinse removes $Li_2CO_3$ and $Li_2O$ to prevent reaction of Fe⁰ to form $Fe(OH)_2$ or $Fe(OH)_3$.

In addition to the relative valence state composition of iron, the mass percent of total iron in the sample (including the solidified electrolyte) is shown in the $Fe_{total}$ of column in Table 2, and the last two columns are measured water soluble and water insoluble mass percent of each sample. The washed, dried insoluble component consists primarily of iron (iron metal and iron oxides). The iron analysis of weighed samples from each layer yields the concentrations: [$Fe_{total}$], [Fe⁰], [$Fe^{2+}$] and [$Fe^{3+}$] (the latter concentration is determined from the difference of [$Fe_{total}$]−[Fe⁰]−[$Fe^{2+}$]). A separate, weighed sample from each layer is washed, followed by subtraction of the mass of the dried insoluble (filtered, dried) component. This yields the mass of the remaining soluble components. The water soluble salts components consist of $Li_2CO_3$ and $Li_2O$. The $Li_2O$ dissolves as LiOH, including $Li_2O$ stripped from lithiated iron oxides when brought in contact with the wash water (e.g. $LiFeO_2$+ $H_2O$ liberates soluble LiOH), and the 105° C. dried components are weighed as the insoluble salts).

Analysis Procedure for Iron Metal

1) The cathode product is ground in a mortar and pestle until it can be sifted and dispersed through a 70 mesh (212 μm) sieve.

2) The ground product is washed with deionized water, then extracted by suction filtration and the precipitate is rinsed with deionized water until the pH is near 7. The precipitates, residue and filter paper are collected to react with $CuSO_4$.

3) 50 ml of 0.5 M $CuSO_4$ is added to 0.5 g of the ground product to form:

$$Fe+CuSO_4 \rightarrow FeSO_4+Cu \qquad (5)$$

4) After boiling this stirred solution for 1 hour, it is immediately filtered (to prevent the reaction of $O_2$ with $Fe^{2+}$) with a GF/A (Whatman glass microfiber) filter paper into a 250 ml volumetric flask, and the filter paper is washed with double deionized (18 MSΩ) water also into the flask, and diluted to 250 ml.

5) 25 ml of the 250 ml filtrate is sampled by pipette into a 250 ml Erlenmeyer flask, and the following solutions are added to the flask: 20 ml of "A", 20 ml of "B", 50 ml of water, and 3 drops of indicator solution "C", where A: a mix of 50 ml of water with 10 ml concentrated $H_2SO_4$ B: 700 ml of water with 150 ml concentrated $H_2SO_4$, 150 ml $H_3PO_4$ (binds colored $Fe^{3+}$, which is colored, as colorless $Fe(HPO_4)_2^-$, to improve clarity of the endpoint)

C: an indicator solution consisting of 0.2% aqueous diphenylamine 4-sulfonic acid sodium salt D: a titrant consisting of 0.004167 M (6× dilution of 0.025 M) $K_2Cr_2O_7$ which tritrates as 1 equivalent $K_2Cr_2O_7$ per $FeSO_4$; each ml of solution D=1.3962 mg of $Fe^\circ$ metal.

$$6FeSO_4+K_2Cr_2O_7+H_2SO_4 \rightarrow 3Fe_2(SO_4)_3+K_2SO_4+Cr_2(SO_4)_3+7H_2O \qquad (6)$$

The endpoint is observed as a color change from light blue (initial) to the endpoint's purple.

This titration analysis is also confirmed by weighing the mass of magnetically removed iron product that was washed & dried to remove oxide. The reliability of the analysis during the titration is improved when solutions are stirred slowly in step 2, rather than rapidly, to prevent significant errors (underestimating the $Fe^\circ$ content of the product with increasing speed of stirring) due to the introduction of oxygen, which can convert ferrous to ferric prior to the titration. The need to switch to a lower stirring speed for the $Fe^\circ$ analysis was discovered and applied to the latter half of the experiments in this study. Under this latter condition replicate analyses of $Fe^\circ$ metal mass from are reproducible to within ±2%.

Analysis Procedure for Total Fe

In accord with the method of Shi et al. (*Rock and Mineral Analysis*, 28, 197, 2009), a 0.1 g sample was placed in a 250 ml flask and 20 ml of 1:1 diluted HCl was added. The sample was placed on a mixer hot plate at about 90° C. (to prevent volatile loss of $FeCl_3$ at higher temperature) until completely dissolved. 20 ml water was added under $N_2$ (99.999%). Aluminum powder was added in three 0.1 g portions (in large excess of the theoretical amount to reduce $Fe^{3+}$ to $Fe^{2+}$). With a minimum of stirring, the Al quickly reacts with $Fe^{3+}$ and $H^+$ to form $Al^{3+}$, and $Fe^{3+}$ is reduced to $Fe^{2+}$. A color change from yellow to light yellow was observed until the solution was transparent. The analysis occurs in accord with the following equations:

$$Al+Fe^{3+} \rightarrow Al^{3+}+Fe \qquad (7)$$

$$Fe+2H^+ \rightarrow Fe^{2+}+H_2 \qquad (8)$$

100 ml of $H_2O$ was added and the solution was cooled to room temperature. 20 ml of sulfuric-phosphoric acid solution and 5 drops of the diphenylamine indicator were added after which the solution was titrated with a standard $K_2Cr_2O_7$ solution (0.0250 mol ⅙$K_2Cr_2O_7$/L).

Total Fe (%)=(V×N×FW Fe)/(1000/S)

V standard $K_2Cr_2O_7$ solution volume (ml)
N standard $K_2Cr_2O_7$ solution concentration (mol/L)
FW Fe 55.85 g/mol
S specimen weight (g)
Analysis Procedure for $Fe^{2+}$ This procedure is based on the methods disclosed in Shi et al., *Rock and Mineral Analysis*, 28, 197, 2009), as modified by (i) ASTM Designation: D8372-86, Standard Test Method for Ferrous Iron in Iron Oxides, *Annual Book of ASTM Standards*, 1, 1999; and (ii) Xu et al., *J. Min. Mat. Characterization & Eng.*, 2, 65, 2003.

In this analysis, 0.5 g of the sample to be analyzed was added to a 250 ml flask and 20 ml of 1:1 diluted HCl was added. This solution was mixed on a hot plate under 99.999% $N_2$ at 90° C. until completely dissolved. 100 ml $H_2O$ was added and the solution was allowed to cool to room temperature. 20 ml sulfuric-phosphoric acid solution (prepared by adding 600 ml concentrated $H_2SO_4$ to 800 ml stirred DI water, then adding 600 ml of 86% phosphoric acid) and 5 drops of the diphenylamine indicator were added and titrated with a standard $K_2Cr_2O_7$ solution (0.0250 mol ⅙$K_2Cr_2O_7$/L) to a sharp endpoint color change from green to purple.

$Fe^{2+}$(%)=(V×N×FW Fe)/(1000/S)

V standard $K_2Cr_2O_7$ solution volume (ml)
N standard $K_2Cr_2O_7$ solution concentration (mol/L)
FW Fe 55.85 g/mol
S specimen weight (g)

The analysis procedure for $Fe^{3+}$ is the straightforward difference from the known total iron, the sum of the iron metal and ferrous species as: $Fe^{3+}$(%)=Total Fe (%)–$Fe^\circ$(%)–$Fe^{2+}$(%)

Analysis Procedure for the Aqueous Soluble Components

Filters were dried in an oven at 105° C. for 1 hour, then cooled in a desiccator and weighed. After weighing, samples (~0.3 g) to be analyzed were stirred one hour in 100 ml of DI water (18 MΩ) in a 250 ml flask at room temperature, then filtered using suction. The filtrate was washed on the filter with three 20 mL volumes of DI water. The filter was then transferred onto a glass weighing dish, and dried at 105° C. for a minimum of 1 hour until a minimum mass was measured (after cooling to room temperature in the desiccator).

Water soluble substances (wt %)=(A–B)×100/A

A Specimen weight (g)
B Residue on the filter paper weight (g).

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as described above. It is intended that the appended claims define the scope of the invention and that methods and structures within the scope of these claims and their equivalents be covered thereby.

All publications, patents and patent applications cited in this application are herein incorporated by reference to the same extent as if each individual publication, patent or patent application was specifically and individually indicated to be incorporated herein by reference.

What is claimed is:

1. A rechargeable battery cell comprising:
a) a rechargeable air electrode;
b) a rechargeable non-metal electrode that is capable of being oxidized; and
c) a molten electrolyte disposed between the air electrode and the non-metal electrode;
wherein at the air electrode, the principal reaction is oxygen ($O_2$) being reduced during discharge, the principal reaction is not carbon dioxide ($CO_2$) and oxygen ($O_2$) being reduced to form carbonate ($CO_3^{-2}$) during discharge, and
wherein the molten electrolyte comprises one or more metal carbonates,
wherein external carbon dioxide ($CO_2$) is not required for discharge at the air electrode.

2. The rechargeable battery cell according to claim 1, wherein the melting point of the molten electrolyte is (i) between about 395° C. and about 900° C. (ii) between about 600° C. and about 900° C., (iii) between about 600° C. and about 900° C., (iv) between about 720° C. and about 900° C., (v) between about 700° C. and about 800° C., or (vi) between about 150° C. and about 500° C.

3. The rechargeable battery cell according to claim 1, wherein the melting point of the molten electrolyte is about 395° C., about 500° C., about 600° C., about 700° C., or about 723° C.

4. The rechargeable battery cell according to claim 1, wherein the melting point of the molten electrolyte is between about 395° C. and about 600° C.

5. The rechargeable battery cell according to claim 1, wherein the cell operates at a temperature between about 395° C. and about 600° C.

6. The rechargeable battery cell according to claim 1, wherein the molten electrolyte is selected from lithium carbonate, sodium carbonate, potassium carbonate, strontium carbonate, rubidium carbonate, cesium carbonate, barium carbonate, calcium carbonate, or any combination thereof.

7. The rechargeable battery cell according to claim 1, wherein the molten electrolyte is selected from lithium carbonate, sodium carbonate, potassium carbonate, or any combination thereof.

8. The rechargeable battery cell according claim 1, wherein the molten electrolyte comprises lithium carbonate.

9. The rechargeable battery cell according to claim 1, wherein the molten electrolyte comprises a binary mixture of lithium carbonate, potassium carbonate or sodium carbonate.

10. The rechargeable battery cell according to claim 1, wherein the molten electrolyte is $Li_{0.7}Na_{0.9}CO_3$.

11. The rechargeable battery cell according to claim 1, wherein the molten electrolyte comprises lithium carbonate, sodium carbonate and potassium carbonate.

12. The rechargeable battery cell according to claim 11, wherein the molten electrolyte is $Li_{0.9}Na_{0.6}K_{0.5}CO_3$.

13. The rechargeable battery cell according to claim 1, wherein the molten electrolyte comprises $CaCO_3$, $Na_2CO_3$, $K_2CO_3$, or any combination thereof.

14. The rechargeable battery cell according to claim 13, wherein the molten electrolyte is selected from $Ca_{0.3}Na_{0.7}K_{0.7}CO_3$, $Ca_{0.3}Na_{0.7}K_{0.8}CO_3$ or $Ca_{0.2}Na_{1.0}K_{0.7}CO_3$.

15. The rechargeable battery cell according to claim 1, wherein the molten electrolyte further comprises one or more alkali metal hydroxides, alkali earth metal hydroxides, alkali metal hydroxide eutectics, alkali earth metal hydroxide eutectics, or any combination thereof.

16. The rechargeable battery cell according to claim 15, wherein the molten electrolyte further comprises NaOH, LiOH, KOH, $Na_2CO_3$, $Li_2CO_3$, $K_2CO_3$, or any combination thereof.

17. The rechargeable battery cell according to claim 15, wherein the cell operates at a temperature between about 150° C. and about 500° C.

18. The rechargeable battery cell according to claim 1, wherein the molten electrolyte further comprises a molten nonconductive salt and an inorganic salt, the inorganic salt conductive when dissolved.

19. The rechargeable battery cell according to claim 18 wherein the conductive when dissolved inorganic salt is selected from metal oxides, metal halides, metal sulfates, metal nitrates, metal palates, or any combination thereof.

20. The rechargeable battery cell according to claim 18 wherein the conductive when dissolved inorganic salt is selected from alkali metal oxides, alkali earth metal oxides, alkali metal halides, alkali earth metal halides, alkali metal sulfates, alkali earth metal sulfates, alkali metal nitrates, alkali earth metal nitrates, alkali metal halates, alkali earth metal halates, and any combination thereof.

21. The rechargeable battery cell according to claim 1, wherein the molten electrolyte further comprises lithium oxide, magnesium oxide, calcium oxide, or any combination thereof.

22. The rechargeable battery cell according to claim 1, wherein the chemistry of the cell can be expressed by equation (1):

$$C + O_2 \rightleftharpoons CO_2 \tag{1}$$

23. The rechargeable battery cell according to claim 1, wherein the non-metal electrode that is capable of being oxidized comprises a carbon, a hydride, a carbide, or any combination thereof.

24. The rechargeable battery cell according to claim 23, wherein the carbon is selected from graphite, amorphous carbon or nanocarbon.

25. The rechargeable battery cell according to claim 24, wherein the nanocarbon is selected from fullerenes, nanorods or nanotubes.

26. The rechargeable battery cell according to claim 23, wherein the non-metal electrode that is capable of being oxidized comprises carbon.

27. An electrical energy storage product comprising a rechargeable battery cell according to claim 1.

28. A bank of cells comprising a plurality of rechargeable battery cells according to claim 1.

29. A rechargeable energy storage device incorporating the rechargeable battery cell according to claim 1.

30. A method of cyclically storing and releasing energy comprising cyclically charging and discharging a rechargeable battery cell according to claim 1.

* * * * *